(12) United States Patent
Dueweke

(10) Patent No.: US 10,388,462 B2
(45) Date of Patent: Aug. 20, 2019

(54) TUNABLE REACTANCE DEVICES, AND METHODS OF MAKING AND USING THE SAME

(71) Applicant: Michael J. Dueweke, Campbell, CA (US)

(72) Inventor: Michael J. Dueweke, Campbell, CA (US)

( * ) Notice: Subject to any disclaimer, the term of this patent is extended or adjusted under 35 U.S.C. 154(b) by 234 days.

(21) Appl. No.: 15/204,247

(22) Filed: Jul. 7, 2016

(65) Prior Publication Data

US 2017/0019086 A1  Jan. 19, 2017

Related U.S. Application Data

(60) Provisional application No. 62/192,969, filed on Jul. 15, 2015.

(51) Int. Cl.
  *H01G 5/18* (2006.01)
  *H01F 21/04* (2006.01)
  *H01G 5/38* (2006.01)

(52) U.S. Cl.
  CPC .............. *H01G 5/18* (2013.01); *H01F 21/04* (2013.01); *H01G 5/38* (2013.01)

(58) Field of Classification Search
  CPC . H01G 5/18; H01G 5/38; H01F 21/04; H03H 2007/008; H03H 2009/155; H03H 2015/005
  USPC ......................................................... 333/186
  See application file for complete search history.

(56) References Cited

U.S. PATENT DOCUMENTS

| 5,959,516 A | 9/1999 | Chang et al. |
| 6,356,149 B1 | 3/2002 | Stengel et al. |
| 6,480,110 B2 | 11/2002 | Lee et al. |
| 6,573,822 B2 | 6/2003 | Ma et al. |

(Continued)

FOREIGN PATENT DOCUMENTS

WO  2013108705 A1  7/2013

OTHER PUBLICATIONS

Jaber Merrikhi Ahangarkolaei and Mir Majid Teymoori; "The Design of a New Linear MEMS Variable Inductor"; 6 pgs.; International Journal of Innovative Research in Electrical, Electronics, Instrumentation and Control Engineering; Dec. 2013; vol. 1 Issue 9.

(Continued)

*Primary Examiner* — Robert J Pascal
*Assistant Examiner* — Jorge L Salazar, Jr.
(74) *Attorney, Agent, or Firm* — Andrew D. Fortney; Central California IP Group, P.C.

(57) ABSTRACT

A tunable reactance device and methods of manufacturing and using the same are disclosed. The tunable reactance device includes a substrate, a microelectromechanical (MEM) structure supported on the substrate and comprising a conductive material, and a driver configured to move the MEM structure with respect to the substrate upon application of an electrostatic force to the driver. A gap between the MEM structure and the substrate is maintained when the driver moves the MEM structure. The tunable reactance device has (i) a first reactance and a first electromagnetic field topology when the electrostatic force is applied to the driver and (ii) a different reactance and a different electromagnetic field topology when a different electrostatic force is applied to the driver.

20 Claims, 33 Drawing Sheets

(56) References Cited

U.S. PATENT DOCUMENTS

| | | |
|---|---|---|
| 6,815,739 B2 | 11/2004 | Huff et al. |
| 6,842,101 B2 | 1/2005 | Maguire et al. |
| 7,148,783 B2 | 12/2006 | Parsche et al. |
| 7,202,768 B1 | 4/2007 | Harvey et al. |
| 7,274,278 B2 | 9/2007 | Weller et al. |
| 7,319,580 B2 | 1/2008 | Chou |
| 7,332,980 B2 | 2/2008 | Zhu et al. |
| 7,446,628 B2 | 11/2008 | Morris, III |
| 7,586,387 B2 | 9/2009 | Van Delden |
| 7,671,693 B2 | 3/2010 | Brobston et al. |
| 7,710,232 B1 | 5/2010 | Stalford et al. |
| 7,741,936 B1 | 6/2010 | Weller et al. |
| 7,831,210 B1 | 11/2010 | Freeman et al. |
| 7,847,669 B2 | 12/2010 | Ayazi et al. |
| 7,907,033 B2 | 3/2011 | Morris, III et al. |
| 7,982,291 B2 | 7/2011 | Kuisma |
| 8,026,773 B2 | 9/2011 | Zhu et al. |
| 8,039,922 B2 | 10/2011 | Ni |
| 8,124,435 B2 | 2/2012 | Kuisma |
| 8,131,232 B2 | 3/2012 | Muhammad |
| 8,450,816 B2 | 5/2013 | Kuisma |
| 8,503,157 B2 | 8/2013 | Ikehashi |
| 8,723,368 B2 | 5/2014 | Choudhary et al. |
| 8,742,859 B2 | 6/2014 | Jin et al. |
| 8,963,674 B2 | 2/2015 | Lee et al. |
| 9,124,236 B2 | 9/2015 | Liang et al. |
| 9,270,249 B2 | 2/2016 | Yen et al. |
| 2006/0226501 A1 | 10/2006 | Chou |
| 2008/0061916 A1 | 3/2008 | Pulskamp |
| 2010/0038753 A1 | 2/2010 | Ni |
| 2011/0063773 A1 | 3/2011 | Ikehashi |
| 2012/0119312 A1 | 5/2012 | Kuisma |
| 2014/0268482 A1 | 9/2014 | Dereus et al. |
| 2016/0094156 A1* | 3/2016 | Thompson ............ B81B 3/0051 310/300 |

OTHER PUBLICATIONS

Chang-Hoon Han et al.; "Parallel-Plate MEMS Variable Capacitor with Superior Linearity and Large Tuning Ratio Using a Levering Structure"; 10 pgs.; Journal of Microelectromechanial Systems; Dec. 2011; vol. 20 No. 6.

International Search Report and Written Opinion; International Searching Authority/US dated Sep. 22, 2016; International Application No. PCT/ US2016/41342; 12 pages; International Searching Authority/United States, Commissioner for Patents; Alexandria, Virginia.

International Preliminary Report on Patentability dated Jan. 25, 2018; PCT International Application No. PCT/US2016/041342; 10 pages; The International Bureau of WIPO, Geneva, Switzerland.

Dong-Ming Fang, Hai-Xia Zhang, Norman C. Tien, A review of the tunable microinductors, Micronanoelectronic Technology, Mar. 2010.

Shinji Murata; "Finely Movable Mechanism and Variable Capacitor"; Bibliographic data of WO2013108705 (A1); 2 pgs.; Jul. 25, 2013; https://worldwide.espacenet.com.

Extended European Search Report dated Feb. 15, 2019; European Patent Application No. 16824921.7; 13 pgs.; European Patent Office, Munich, Germany.

\* cited by examiner

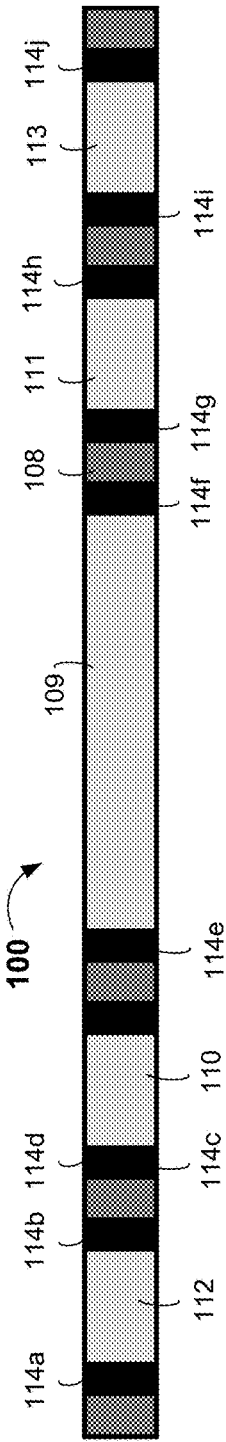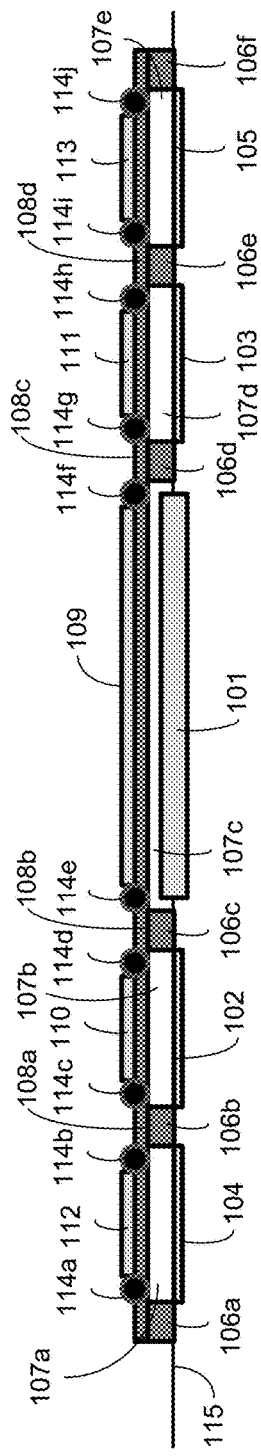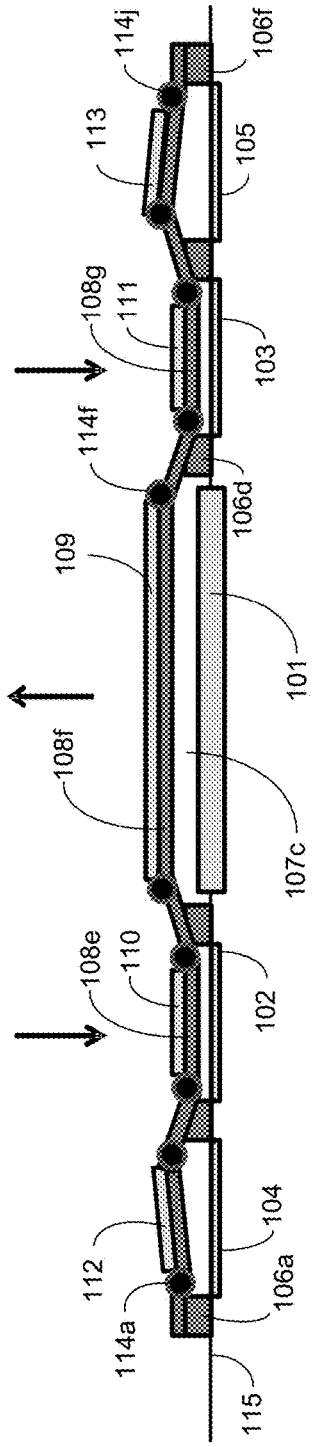

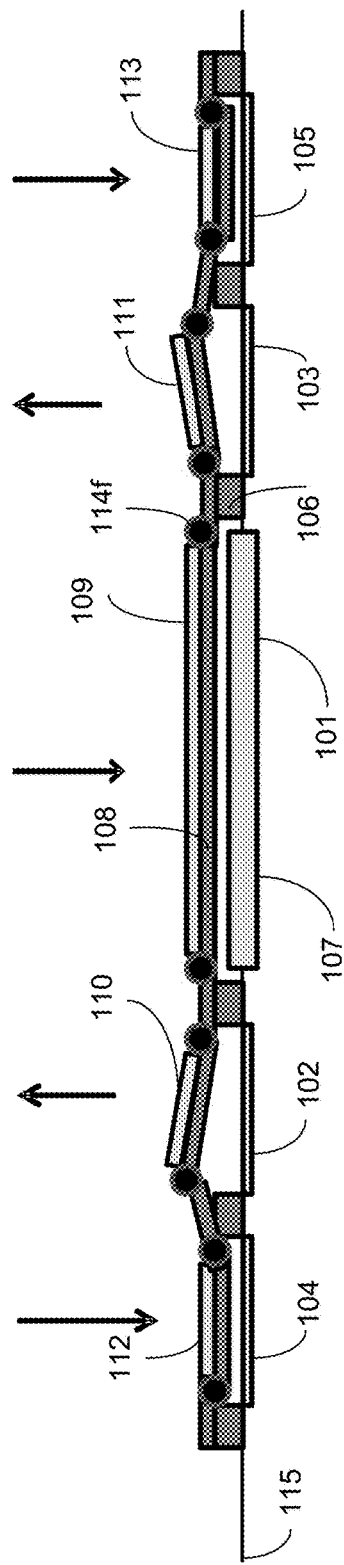
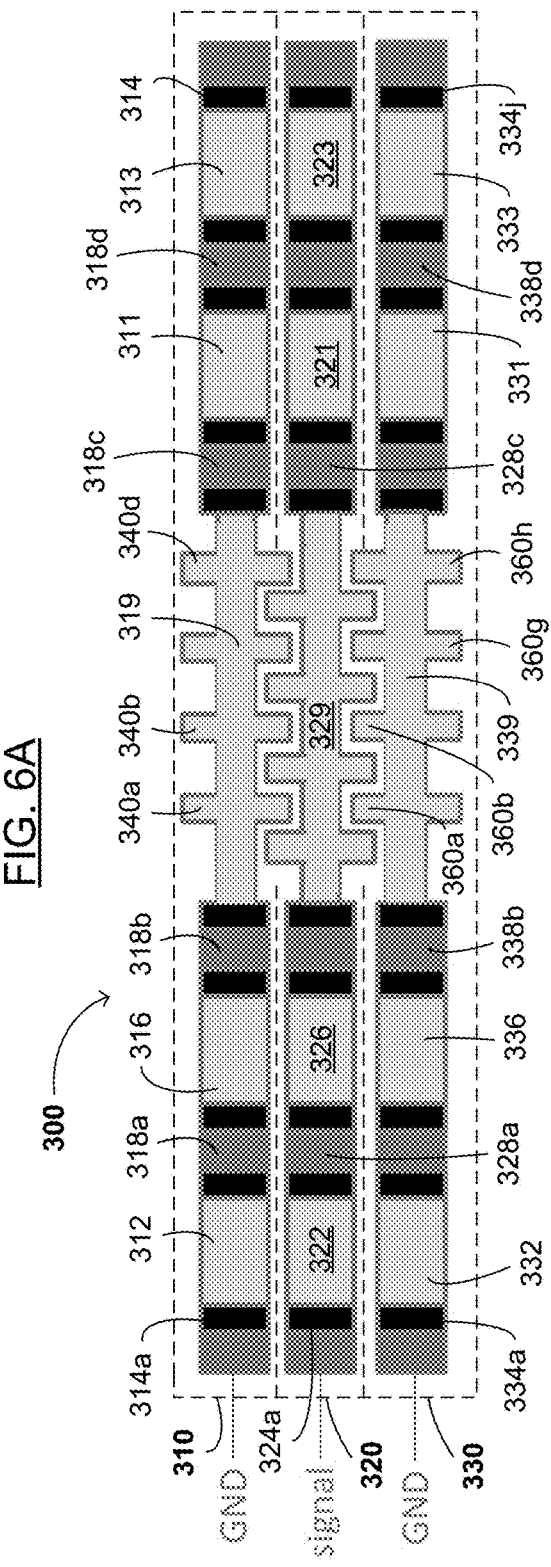

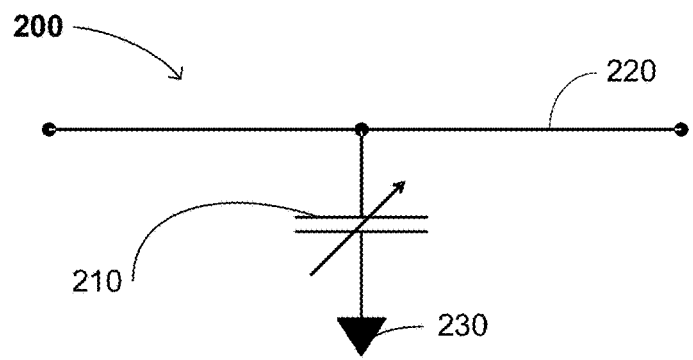
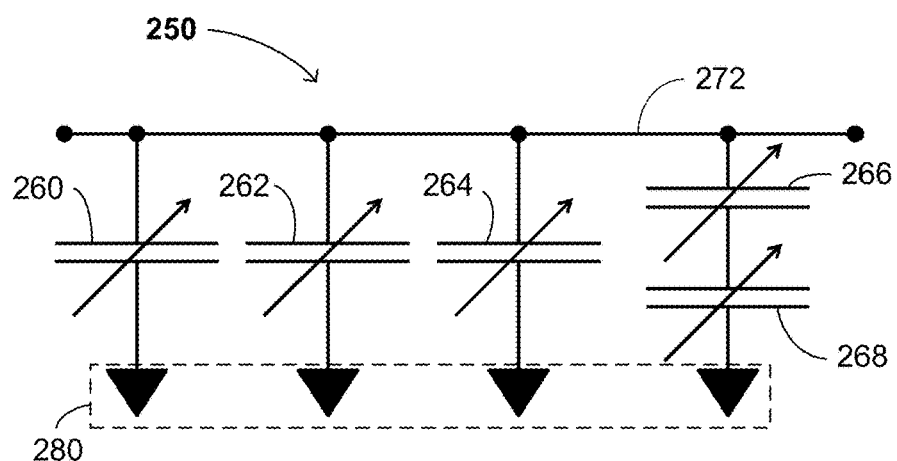
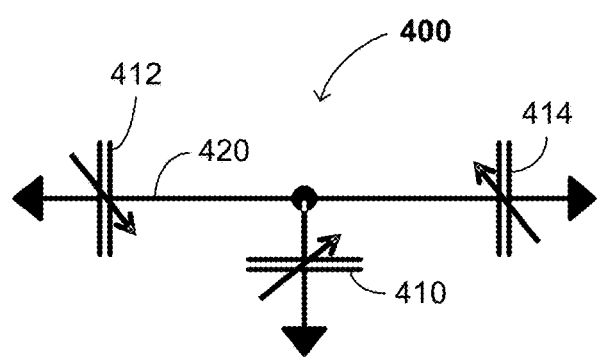

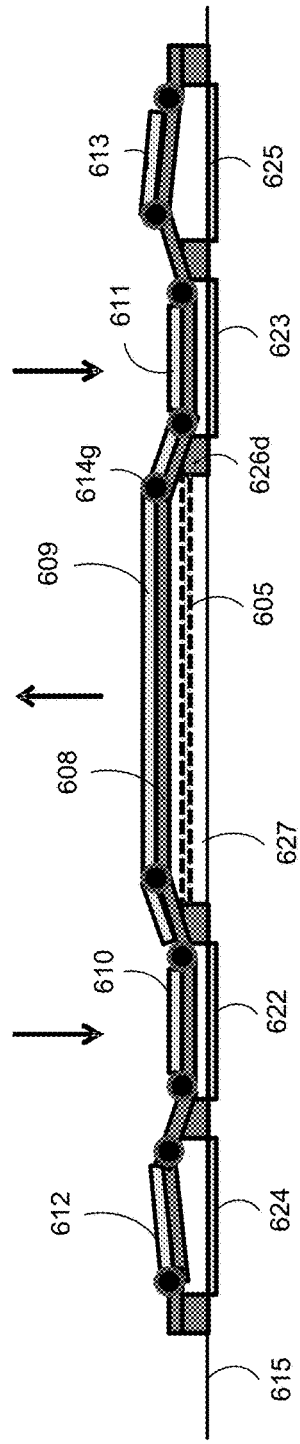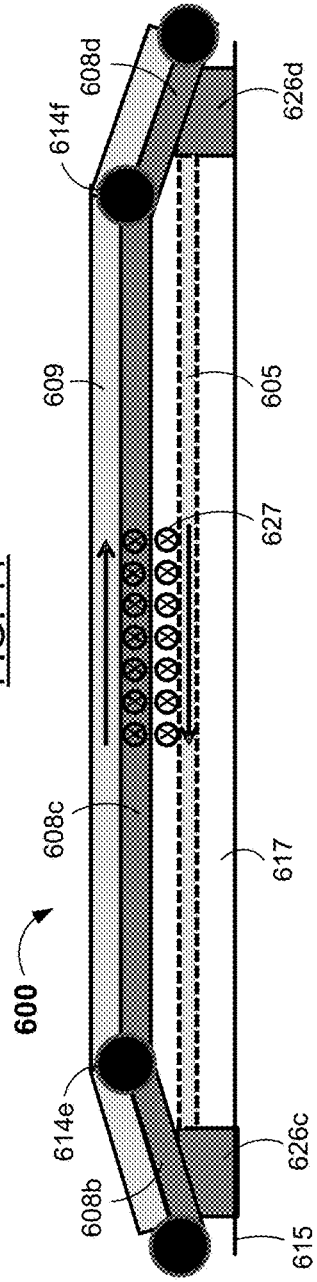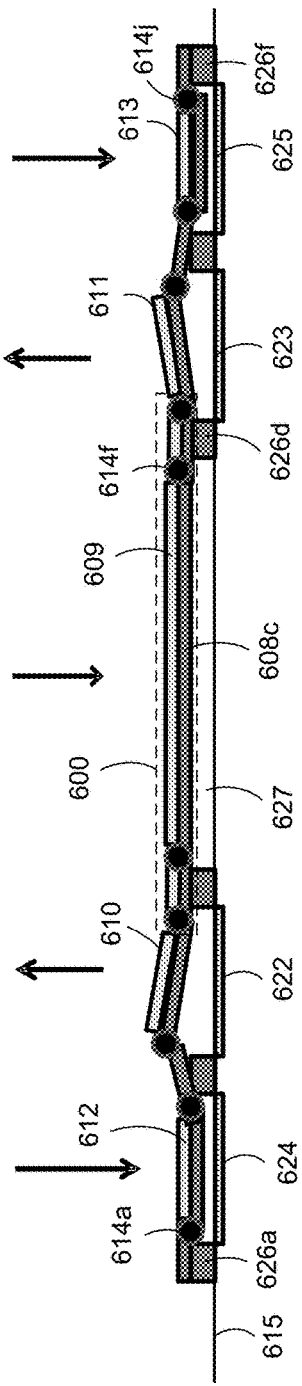

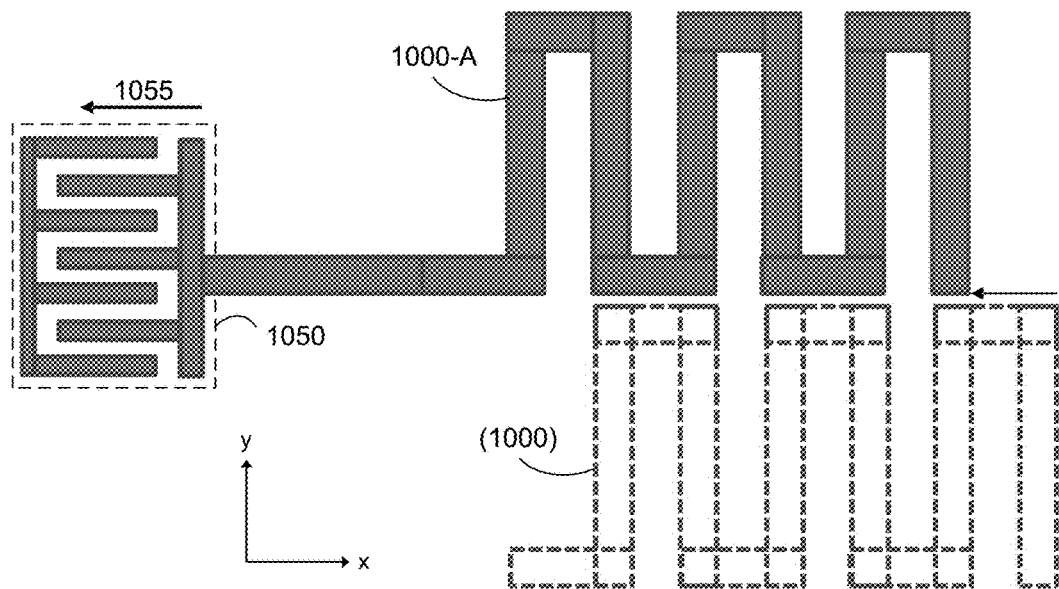
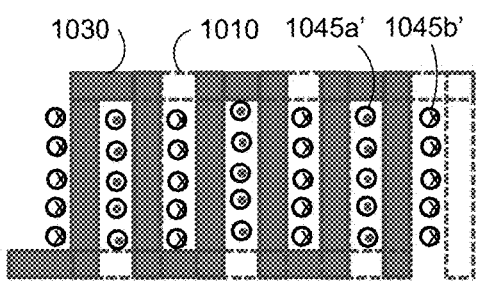
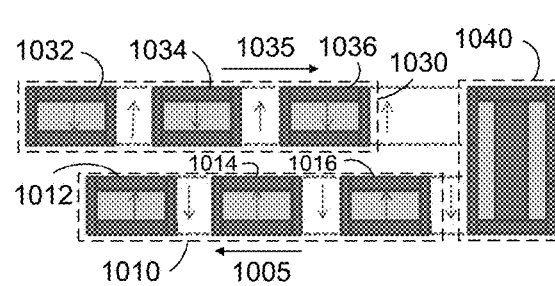
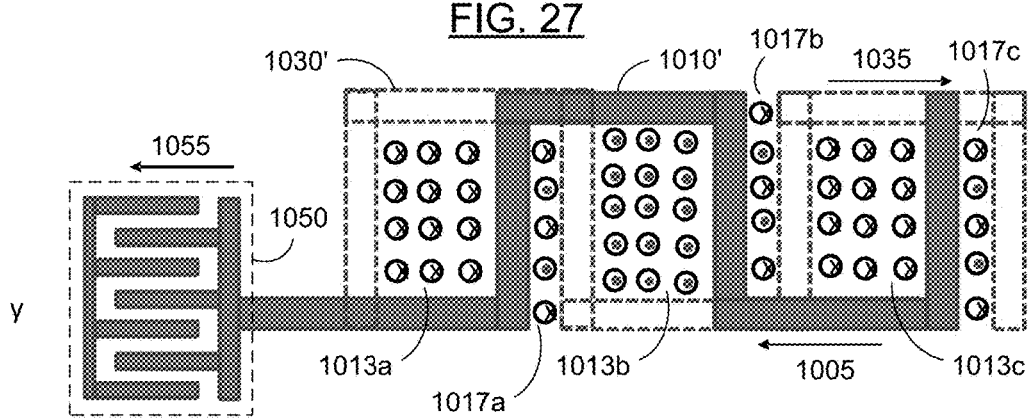

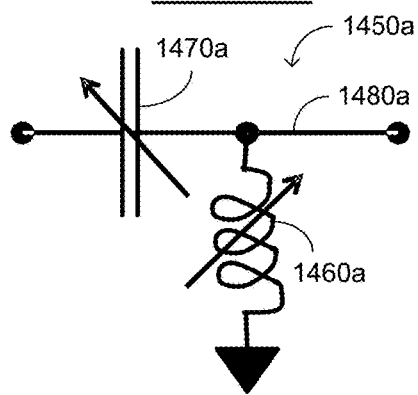
FIG. 37A
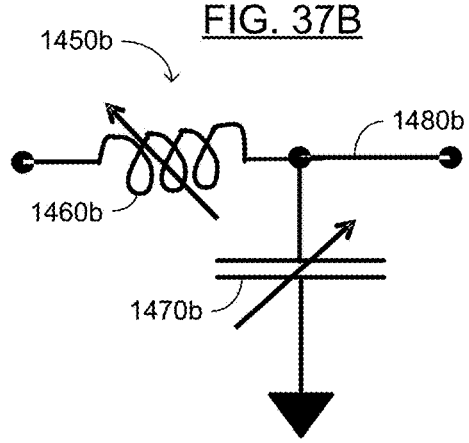
FIG. 37B
FIG. 38A
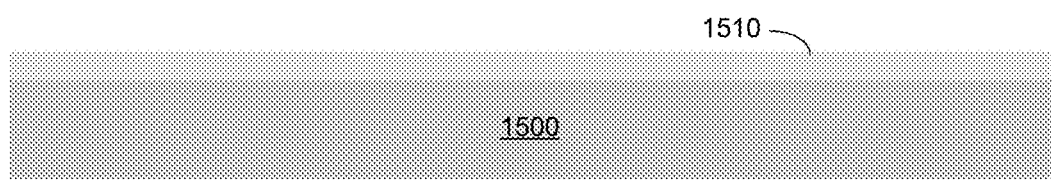
FIG. 38B
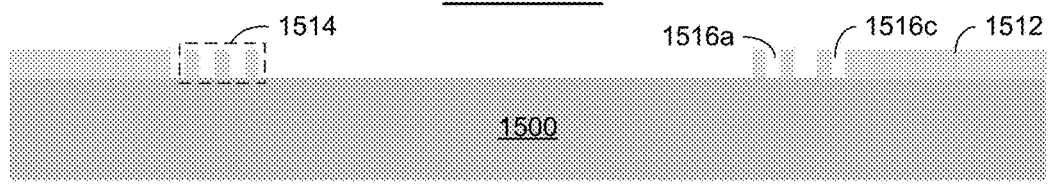
FIG. 38C
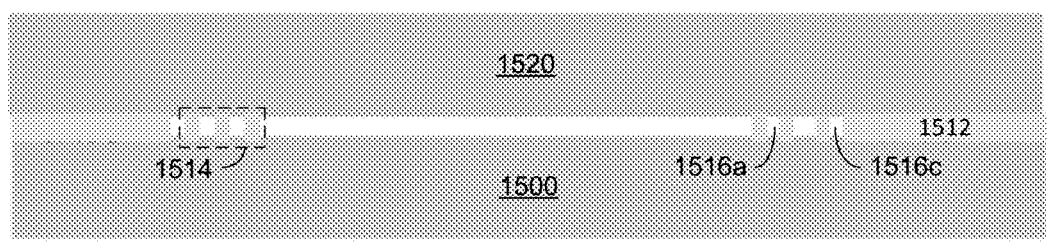

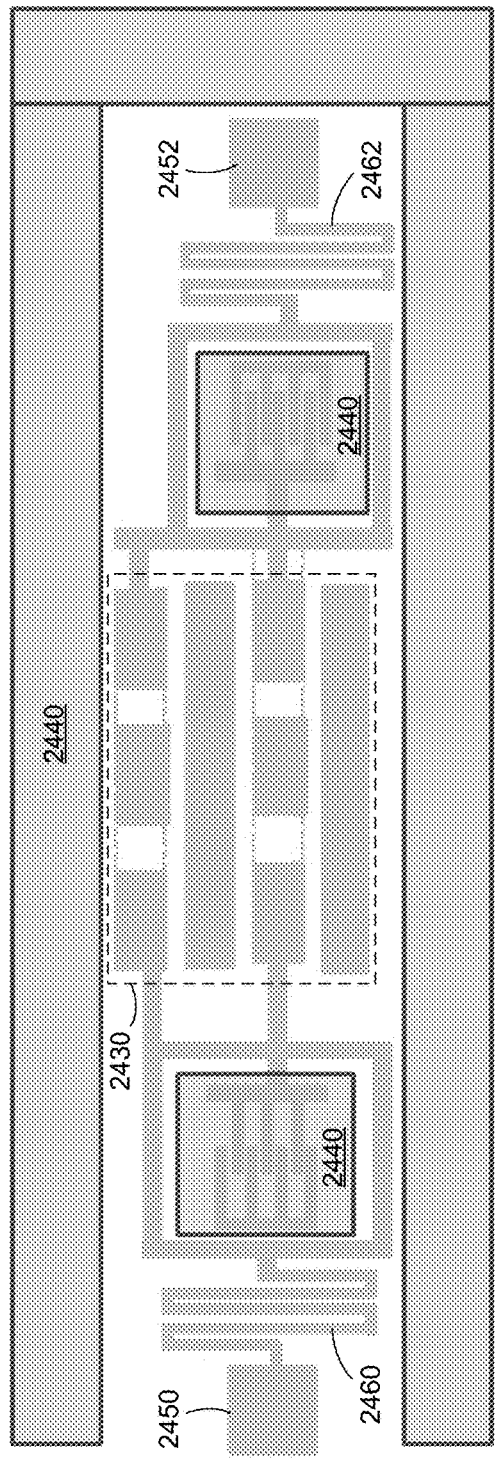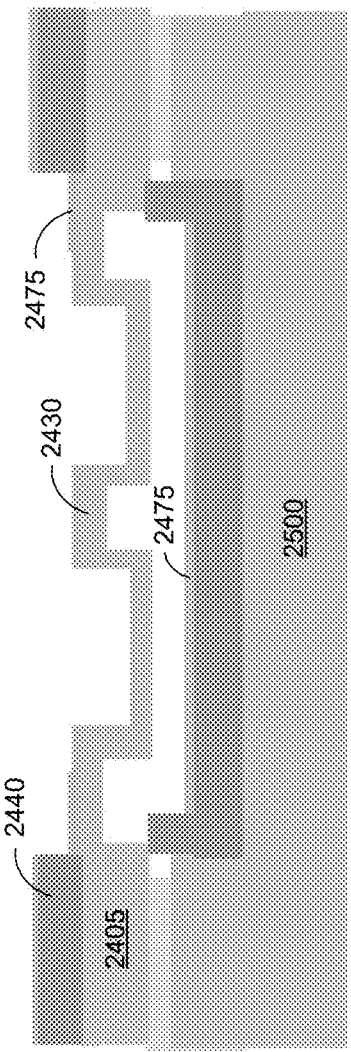

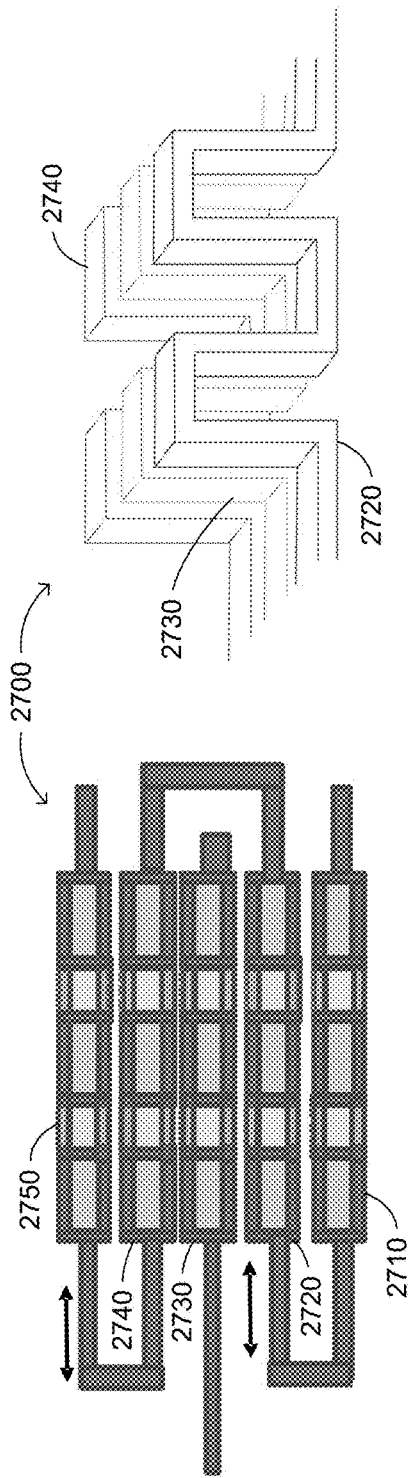
FIG. 57A
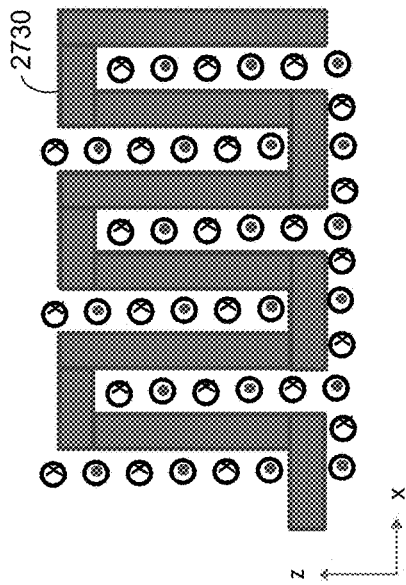
FIG. 57B
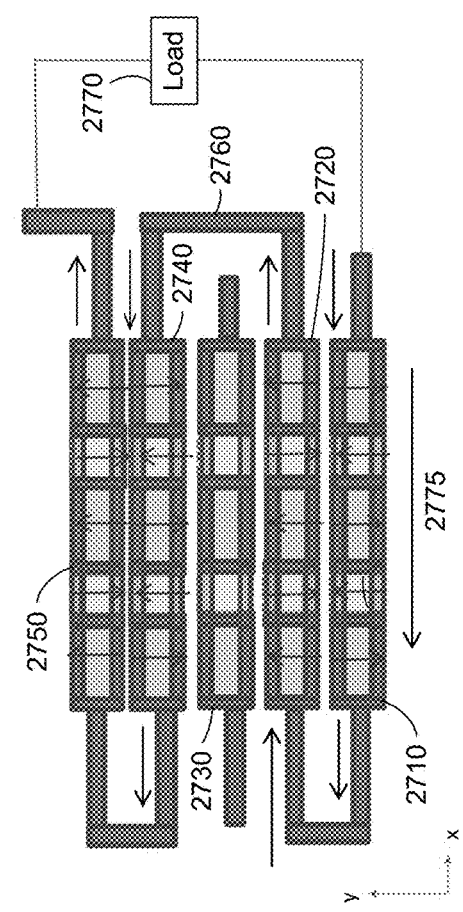
FIG. 58A
FIG. 58B

TUNABLE REACTANCE DEVICES, AND METHODS OF MAKING AND USING THE SAME

CROSS REFERENCE TO RELATED APPLICATION

This application claims the benefit of U.S. Provisional Patent Application No. 62/192,969, filed on Jul. 15, 2015, which is incorporated herein by reference as if fully set forth herein.

FIELD OF THE INVENTION

The present invention generally relates to the field of microelectromechanical system (MEMS) devices and devices having a tunable inductance and/or capacitance. More specifically, embodiments of the present invention pertain to a novel tunable reactance device, integrated circuits and systems including the same, and methods of manufacturing and using the same.

DISCUSSION OF THE BACKGROUND

Wireless devices such as cellular telephones operate using a range of frequencies and need to maintain signal integrity across a frequency range. Increasingly there is a need for tunable antennas in wireless devices such as cellular telephones to maintain signal integrity over a range of frequencies, reduce power consumption and adjust to changing environmental and user conditions. Wireless devices such as cellular telephones have employed CMOS and MEMS tunable capacitors for digital tunable antenna applications, but to date, there has not been a widespread adoption of MEMS tunable capacitors that have contacting surfaces and may suffer from elements sticking together, dielectric charging, and changes in impedance and restoring force after repeated use. Various implementations of tunable MEMS inductors have been described in the prior art that use contacting surfaces but are subject to performance degradation due to changing impedance values, changing restoring forces and stiction from contacting surfaces. Accordingly, there is a need to provide tunable reactance in circuits with low loss and high quality factor that avoids the reliability problems with contacting surfaces.

In a tunable antenna application, it is desirable to tune a circuit toward resonance to increase signal gain. In a series RLC circuit, the resonance frequency is given by the formula:

$$\omega_0 = 1/\mathrm{SQRT}(LC)$$

where L is the inductance and C is the capacitance in the circuit. Therefore, it is desirable to be able to tune both the inductance L and capacitance C of a tunable antenna circuit to provide a wider tuning range and allow more design flexibility.

The impedance Z of an element in an AC circuit is given by $$Z = R + jX$$

where the real part of the impedance, R, is the resistance of the element, j is the square root of minus one, and the imaginary part of the impedance, X, is the reactance of the element due to capacitance and inductance. The inductive reactance of an element is $\omega L$ and the capacitive reactance of an element is $1/\omega C$ where $\omega$ is the angular frequency of oscillation. There is a need for fast switching, repeatable tunable inductors and capacitors for tunable antenna applications.

This "Discussion of the Background" section is provided for background information only. The statements in this "Discussion of the Background" are not an admission that the subject matter disclosed in this "Discussion of the Background" section constitutes prior art to the present disclosure, and no part of this "Discussion of the Background" section may be used as an admission that any part of this application, including this "Discussion of the Background" section, constitutes prior art to the present disclosure.

SUMMARY OF THE INVENTION

The present invention concerns tunable reactance devices, integrated circuits and systems including the same, and methods of fabricating and using the same. More particularly, the present invention relates to a tunable MEMS device which can tune inductance, capacitance, or both inductance and capacitance within circuits and is referred to more generally as a tunable reactance device. In one aspect, the present invention relates to a tunable reactance device that includes a substrate, a microelectromechanical (MEM) structure supported on the substrate and comprising a conductive material, and a driver configured to move the MEM structure with respect to the substrate upon application of an electrostatic force to the driver. A gap is between the MEM structure and the substrate, and the driver maintains the gap (which may have a different magnitude) when it moves the MEM structure. The tunable reactance device has (i) a first reactance and a first electromagnetic field topology when the electrostatic force is applied to the driver and (ii) a different reactance and a different electromagnetic field topology when a different electrostatic force is applied to the driver.

In various embodiments of the present invention, the tunable reactance device may be configured as a tunable inductor, a tunable capacitor or both. In other embodiments, the tunable reactance device includes a plurality of microelectromechanical (MEM) structures. In some embodiments, the MEM structures comprise serpentine structures. Alternatively, the MEM structures may comprise a series of moveable beams.

In additional embodiments, the driver may comprise a comb drive or a plurality of lever arms connected to opposed ends of the MEM structure. In further embodiments, the tunable reactance device comprises a plurality of drivers, which may be connected to opposed ends of the same MEM structure or to different MEM structures.

Another aspect of the present invention relates to a method of fabricating a tunable reactance device, including forming a MEM structure in a mechanical substrate and above a supporting substrate, forming a driver in the mechanical substrate configured to move the MEM structure with respect to the supporting substrate upon application of an electrostatic force to the driver, and coating the MEM structure with a conductor.

In various embodiments, the supporting substrate may comprise a doped or undoped silicon, silicon dioxide, or silicon on insulator (SOI) wafer, and the mechanical substrate may comprise silicon, gallium arsenide, silicon carbide, or silicon germanium. Furthermore, the method further comprises bonding the mechanical substrate to the supporting substrate prior to forming the MEM structure, forming a plurality of MEM structures in the mechanical substrate and coating the plurality of MEM structures with the conductor, and/or attaching a protective cover over the MEM structure(s) and forming a plurality of conducting buses external to the protective cover, the plurality of conducting buses being electrically connected to the MEM structure(s) and/or circuitry configured to control movement of the MEM structure(s).

In some embodiments, forming the MEM structure(s) may comprise patterning and etching the mechanical substrate, and coating the MEM structure(s) may comprise depositing the conductor by chemical vapor deposition, atomic layer deposition, or sputtering.

The advantages of the present invention will become readily apparent from the detailed description of various embodiments below.

BRIEF DESCRIPTION OF THE DRAWINGS

FIG. 1 is a top view of an exemplary tunable capacitive device according to one or more embodiments of the present invention.

FIG. 2 is a cross-sectional view of the exemplary tunable capacitive device of FIG. 1.

FIG. 3 is a cross-sectional view of the exemplary tunable capacitor element of FIGS. 1-2 in a low capacitance active state according to one or more embodiments of the present invention.

FIG. 4 is a cross-sectional view of the exemplary tunable capacitor element of FIGS. 1-2 returned to a high capacitance state.

FIG. 5A is an equivalent circuit for the tunable capacitive element of FIGS. 1-2.

FIG. 5B is a schematic of an implementation involving multiple tunable capacitive elements according to one or more embodiments of the present invention.

FIG. 6A is a top view of an exemplary tunable capacitor having interdigitated fingers along the length of the capacitor according to one or more embodiments of the present invention.

FIG. 7 is an equivalent circuit for the tunable capacitive element of FIGS. 6A-C according to further embodiments of the present invention.

FIG. 10 is a cross-sectional view showing the exemplary series inductor element of FIG. 9 in an activated state.

FIG. 11 is a cross-sectional view showing the center of the exemplary inductor of FIGS. 9-10 in greater detail.

FIG. 12 is a cross-sectional view showing the exemplary tunable inductor element of FIGS. 9-10 returned to an inactive state.

FIG. 24 is a top view of the serpentine and comb structures of FIG. 23, to which an electrostatic force is applied to move one serpentine a half pitch distance relative to the other serpentine.

FIGS. 25A-B are top and cross-sectional views showing the serpentine mechanical structure of FIGS. 22A-B to which an electrostatic force is applied, showing magnetic fields generated from current flow facing in similar directions, resulting in higher net magnetic flux and higher inductance.

FIG. 26A shows a low inductance state with low net magnetic flux, and FIG. 26B shows a high inductance state with high net magnetic flux combined through multiple serpentine layers.

FIG. 27 is a top view of an alternative serpentine structure according to one or more embodiments of the present invention.

FIGS. 37A-B show exemplary circuit embodiments of tunable reactance devices in accordance with the present invention.

FIGS. 57A-B are top and perspective views of an exemplary tunable inductive transformer including multiple serpentine structures according to one or more embodiments of the present invention.

FIGS. 58A-B show top and side views of a tunable inductive transformer in a low inductance or 'OFF' state.

DETAILED DESCRIPTION

Figure 6B:
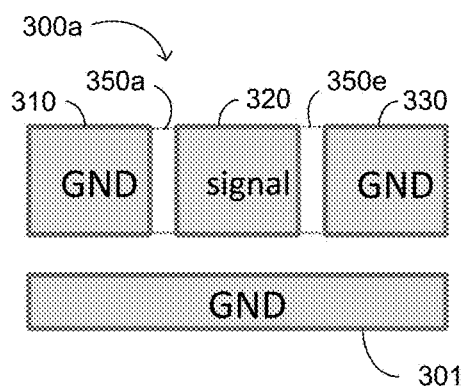
FIGS. 6B-C are end views of the tunable capacitor of FIG. 6A in different states.

Reference will now be made in detail to various embodiments of the invention, examples of which are illustrated in the accompanying drawings. While the invention will be described in conjunction with the following embodiments, it will be understood that the descriptions are not intended to limit the invention to these embodiments. On the contrary, the invention is intended to cover alternatives, modifications and equivalents that may be included within the spirit and scope of the invention. Furthermore, in the following detailed description, numerous specific details are set forth in order to provide a thorough understanding of the present invention. However, it will be readily apparent to one skilled in the art that the present invention may be practiced without these specific details. In other instances, well-known methods, procedures, components and materials have not been described in detail so as not to unnecessarily obscure aspects of the present invention.

Thus, the technical proposal(s) of embodiments of the present invention will be fully and clearly described in conjunction with the drawings in the following embodiments. It will be understood that the descriptions are not intended to limit the invention to these embodiments. Based on the described embodiments of the present invention, other embodiments can be obtained by one skilled in the art without creative contribution and are in the scope of legal protection given to the present invention.

Furthermore, all characteristics, measures or processes disclosed in this document, except characteristics and/or processes that are mutually exclusive, can be combined in any manner and in any combination possible. Any characteristic disclosed in the present specification, claims, Abstract and Figures can be replaced by other equivalent characteristics or characteristics with similar objectives, purposes and/or functions, unless specified otherwise. Each characteristic is generally only an embodiment of the invention disclosed herein.

Exemplary Tunable Reactance Devices

The present tunable reactance devices achieve a significant change in reactance (A/C impedance) by changing the topology of electric and/or magnetic fields in the devices using a small mechanical displacement in one or more structures therein. The displacement may be achieved using counter-balanced electrostatic forces, without the displaced structure contacting the substrate or another structure in the device. The present tunable reactance devices may be configured either as digital capacitors and/or inductors or as analog capacitors and/or inductors, with a reactance value controlled by the voltage level of a signal applied to the device.

Devices that tune capacitive and inductive reactance can be made on the same substrate with the same process. Examples include devices exhibiting vertical displacements from the substrate and devices exhibiting lateral displacements along the substrate. In embodiments exhibiting vertical displacements, the devices tune reactance by changing topography of electric and magnetic fields through a small vertical displacement of one or more MEMS devices from a substrate. In embodiments exhibiting lateral displacements, the devices tune reactance by changing topography of electric and magnetic fields through a small lateral displacement of one or more MEMS devices along a substrate. The small displacements may be achieved with one or more electrostatic, piezoelectric, electromagnetic, or thermal actuators.

Both inductive reactance (e.g., in which $X_L=\omega L$) and capacitive reactance (e.g., in which $X_c=1/\omega C$) can be tuned with devices using the same fabrication process on the same substrate. Since resonance in a series RLC circuit is given by $\omega_0=1/SQRT(LC)$, a greater range of resonance frequency tuning can be achieved by tuning both inductance (L) and capacitance (C) in the same die and/or on the same substrate. Thus, the present tunable reactance devices may be used in a tunable LC tank or LC matching network, a voltage controlled oscillator (e.g., for frequency generation comprising the tunable LC tank or LC matching network), a device used to tune impedance for wireless energy transfer, a component of a tunable matching network in a tunable antenna (e.g., for an RF circuit configured to transmit and receive wireless signals) or in which the performance is monitored by one or more sensors (which may, in turn, provide feedback via a control loop and/or control circuitry to adjust the tunable reactance devices to optimize a particular performance parameter, such as impedance, power level, frequency, amplitude or phase of an AC signal), etc.

FIGS. 1-2 show top and cross-sectional views, respectively, of an exemplary capacitor element 100. The capacitor element 100 can be an element of a tunable reactance device, alone or in combination with one or more other elements.

FIG. 2 shows more details of the tunable capacitor element 100. The tunable capacitor element 100 is built upon a substrate 115 such as a silicon, silicon dioxide, silicon germanium, gallium arsenide, silicon carbide, glass, or silicon on insulator (SOI) wafer. Tunable element 100 includes a conducting bus 101 which, in one embodiment, is an RF signal path. The tunable element 100 also includes control electrodes 102, 103, 104 and 105 which are preferably external to the RF signal path. The tunable device 100 contains support posts 106a-f, some of which support moveable beam elements 108a-d. The moveable beam elements 108a-d span gaps 107a-e where there are no solid structures. The movable beam elements 108a-d support separate conducting electrodes 109, 110, 111, 112 and 113. The beam elements 108a-d are joined by flexible mechanical springs 114a-j which allow ends of the beams 108a-d to move angularly toward and away from the substrate 115. The moveable beam elements 108a-d, flexible springs 114a-j and support posts 106a-f may be fabricated from material such as single crystal silicon, amorphous silicon, gallium arsenide, silicon carbide, silicon germanium or other common semiconductor materials, while conducting electrodes 109, 110, 111, 112 and 113 may be fabricated from highly conductive materials such as copper, aluminum, aluminum copper, aluminum silicon, gold, silver, platinum, tungsten, tantalum, graphene, titanium or other high conductivity material.

The tunable reactance device 100 shown in FIGS. 1 and 2 functions as a tunable capacitor. The tunable capacitor element is shown in its high capacitance or inactive state in FIGS. 1 and 2. FIG. 3 shows the tunable capacitor element 100 in its low capacitance or active state. A voltage difference is applied between electrodes 102 and 110 while a similar voltage difference is applied between electrodes 103 and 111, bringing electrodes 110 and 111 toward substrate 115 and lifting electrode 109 by means of a lever mechanism from both sides. Electrodes 104, 105, 112 and 113 are preferably set at the same voltage (e.g., equal to the voltage on the others of the electrodes 104, 105, 112 and 113) and do not contribute to beam movement in FIG. 3. The center gap 107c between electrodes 109 and 101 increases along with the capacitance between these two electrodes. Electrode 109 is preferably kept at a fixed voltage such as ground. The vertical arrows in FIG. 3 indicate the direction of movement of beam elements 108e-g and attached electrodes 109, 110, and 111 as the tunable capacitor element 100 switches from a high capacitance state to a low capacitance state. The moveable beam elements 108e-g, flexible springs 114a-j and support posts 106a-f may be fabricated from material such as single crystal silicon, amorphous silicon, silicon carbide, gallium arsenide, silicon germanium or other common semiconductor materials, while conducting electrodes 109, 110, 111, 112 and 113 may be fabricated from highly conductive materials such as copper, aluminum, aluminum copper, aluminum silicon, gold, silver, platinum, tungsten, tantalum, graphene, titanium or other high conductivity material.

FIG. 4 shows the tunable capacitive element 100 returned to a high capacitance state. By applying a voltage difference between electrodes 104 and 112 and a similar voltage difference between electrodes 105 and 113, while removing the voltage differences between electrodes 102 and 110 and between electrodes 103 and 111, electrode 109 on beam element 108 is brought quickly back to a high capacitance state relative to signal electrode 101. By turning off the lever arm actuation that had previously moved electrode 109 away from the substrate 115 and counteracting the lever arm actuation by pulling down electrodes 112 and 113, the center electrode 109 can returned more quickly to its initial high capacitance state. Electrode 101 may be at the same height as electrodes 102, 103, 104, and 105 relative to substrate 115, or it may be at a greater height than electrodes 102, 103, 104, and 105 relative to substrate 115 as shown in FIG. 4, in order to provide for a higher initial capacitance state while allowing sufficient movement for beam elements and electrodes 110, 111, 112, and 113. In any case, the electrode 101 underlies or overlaps with the moveable beam 108 and electrode 109. For example, a plane that is orthogonal to both the moveable beam 108 and the electrode 101 and oriented along the long axis of at least the moveable beam 108 can pass through both the moveable beam 108 and the electrode 101. The moveable beam elements 108a-f, flexible springs 114a-j and support posts 106a-f may be fabricated from material such as single crystal silicon, amorphous silicon, silicon carbide, gallium arsenide, silicon germanium or other common semiconductor materials, while conducting electrodes 109, 110, 111, 112 and 113 may be fabricated from highly conductive materials such as copper, aluminum, aluminum copper, aluminum silicon, gold, silver, platinum, tungsten, tantalum, graphene, titanium or other high conductivity material.

The tunable capacitor 100 described above provides a fast switching, repeatable, and variable capacitance without making any physical contact between surfaces or making a physical or direct electrical connection to the signal path. An equivalent circuit schematic 200 for the tunable capacitive element 100 described above is shown in FIG. 5A and includes a variable capacitor 210 with a first electrode coupled to an RF signal line 220 and a second electrode coupled to ground 230. Various implementations of the tunable capacitor may include arrays of multiple tunable capacitive elements arranged in various combinations, such as series and parallel configurations, as shown in FIG. 5B, which is a diagram of a tunable capacitor array 250, having three capacitors 260, 262 and 264 in parallel with each other between an RF signal line 272 and ground 280, and with series capacitors 266 and 268 (i.e., capacitors in series) between the same nodes (i.e., RF signal line 272 and ground 280).

FIGS. 1 through 5B show one aspect of a tunable reactance device as contemplated in this invention. Tunable reactance devices similar to that shown in FIGS. 1 through 5B can be configured through combinations with similar devices to act as a tunable inductors and/or tunable capacitors. Various implementations of the invention may include arrays of multiple tunable and fixed capacitive elements and/or tunable and fixed inductive elements arranged in various combinations such as series and parallel configurations, as shown in FIG. 5B.

FIG. 6A is a top view of an exemplary tunable capacitor 300 having interdigitated fingers 340a-h, 350a-h and 360a-h along the length of the capacitor electrodes 319, 329 and 339, respectively, to provide additional capacitance (e.g., a wider range of capacitance) and/or allow for a larger capacitance tuning range according to one or more embodiments of the present invention. Interdigitating portions of the tunable capacitor conductor 329 with ground conductors 319 and 339 increases the capacitance of the tunable capacitor element 300.

The tunable capacitor 300 includes three MEMS devices 310, 320 and 330, receiving a ground voltage, a tuning (e.g., RF) signal, and a ground voltage, respectively. Similar to the tunable capacitor 100 of FIGS. 1-4, the MEMS devices 310, 320 and 330 include control electrodes 311-313 and 316, 321-323 and 326, and 331-333 and 336 which are preferably external to the RF signal path, support posts (not shown) that support moveable beam elements (not shown) between gaps under the control electrodes where there are no solid structures, and movable beam elements 318a-d, 328a-d and 338a-d that support the control electrodes. The MEMS device 310, 320 and 330 function identically or substantially similarly to the tunable capacitor 100 of FIGS. 1-4.

Figure 6C:
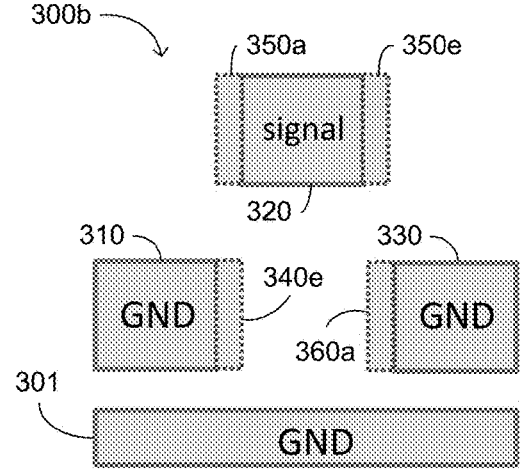

FIGS. 6B-C are end views of the tunable capacitor of FIG. 6A in different states. FIG. 6B shows the tunable capacitor 300a with interdigitated fingers (fingers 350a and 350e on electrode 320 are shown) in a high capacitance state. FIG. 6C shows the tunable capacitor 300b with interdigitated fingers in a low capacitance state. The different states are selected in the same way as the tunable capacitor 100 of FIGS. 1-4. The states of the MEMS devices 310 and 330 can be independently selected to provide further selectable capacitances.

FIG. 7 is a schematic for an equivalent circuit 400 for the tunable capacitor 300 of FIGS. 6A-C. The equivalent circuit 400 includes variable capacitors 410, 412 and 414, each with a first electrode coupled to an RF signal line 420 and a second electrode coupled to a ground potential.

Figure 8A:
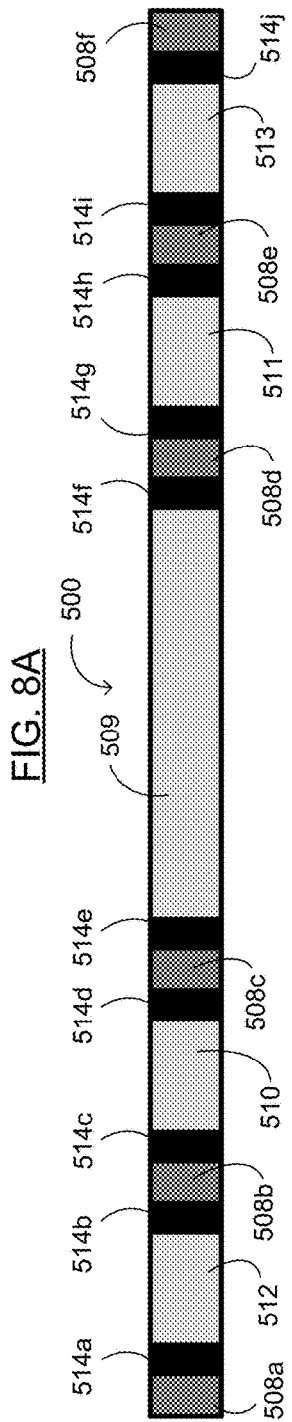
FIGS. 8A-B are top and cross-sectional views of an exemplary tunable inductor element according to one or more embodiments of the present invention.
Figure 8B:
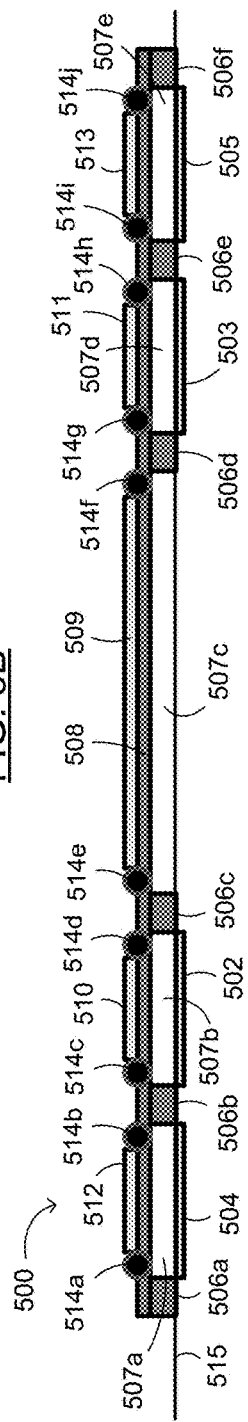

FIGS. 8A-B show top down and side views of a tunable inductor element 500, which is similar to the tunable capacitor element 100 shown in FIGS. 1 through 5 except there is no center electrode on the substrate.

FIG. 8B shows more details of the tunable inductor element 500. The tunable inductor element 500 is built upon a substrate 515 such as a silicon, silicon dioxide, or silicon on insulator (SOI) wafer. Tunable element 500 includes control electrodes 502, 503, 504 and 505 which are preferably external to any RF signal path. The tunable device contains support posts 506b-e, which support moveable beam elements 508a-e. The moveable beam elements 508a-e are adjacent to gaps 507a-e, where there are no solid structures. The beam elements 508a-e support separate conducting electrodes 509, 510, 511, 512 and 513. The beam elements 508a-e are joined by flexible mechanical springs 514a-j which allow the beams 508b-e to move (e.g., rotate) toward and away from substrate 515. The moveable beam elements 508a-f, flexible springs 514a-j and support posts 506a-f may be fabricated from material such as single crystal silicon, amorphous silicon, silicon carbide, gallium arsenide, silicon germanium or other common semiconductor materials, while conducting electrodes 509, 510, 511, 512 and 513 may be fabricated from high conductivity materials such as copper, aluminum, aluminum copper, aluminum silicon, gold, silver, platinum, tungsten, tantalum, graphene, or titanium or other high conductivity material.

Figure 9:
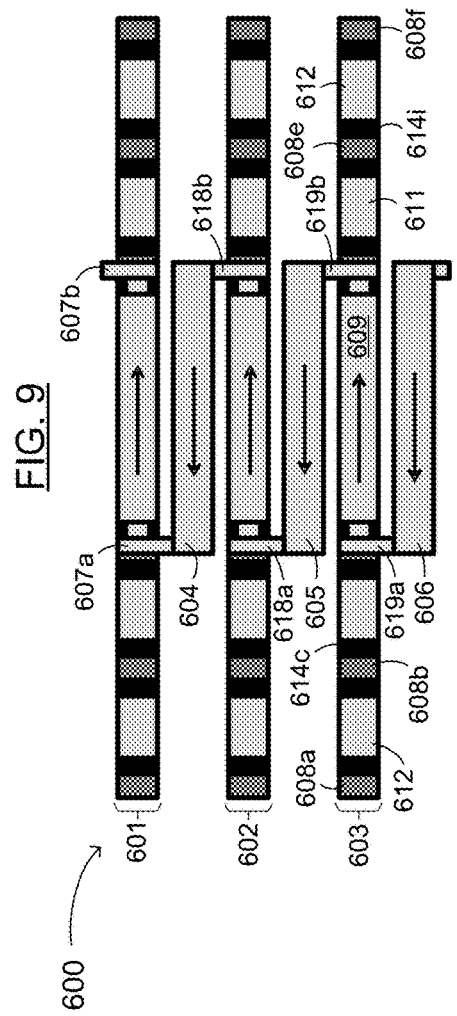
FIG. 9 is a top view of an exemplary tunable series inductor element according to one or more embodiments of the present invention.

FIG. 9 shows a series of inductor elements 601, 602 and 603 connected in series by conducting buses 604, 605, and 606 and conducting anchor points (e.g., links) 619a-b, 618a-b and 607a. The conducting buses are preferably at the same height above the substrate and made of the same material by the same process as the conducting electrodes on top of the center elements 601, 602, and 603. Conducting buses 604, 605 and 606 connect one end of an inductor element to the opposite end of another inductor element as shown in FIG. 9. The conducting buses 604, 605 and 606 preferentially connect to the tunable inductor elements 601, 602, and 603 at the anchor points 607a, 619a-b and 618a-b.

The horizontal arrows in FIG. 9 indicate one direction of current flow at a given time within the connected series of elements. However, the current can also flow in the opposite direction. Note that the current in the inductor elements 601, 602, and 603 flows in the opposite direction of the current in conducting buses 604, 605, and 606. Conducting buses 604, 605 and 606 and the electrodes on inductor elements 601, 602, 603 may be fabricated from high conductivity materials such as copper, aluminum, aluminum copper, aluminum silicon, gold, silver, platinum, tungsten, tantalum, graphene, or titanium or other high conductivity material. In a preferred embodiment, conducting buses 604, 605, 606 are made of the same high conductivity material as the electrodes on inductor elements 601, 602, and 603. Although the tunable inductor 600 includes three tunable elements 601, 602, and 603 connected in series, many more configurations are possible within the scope of the invention.

FIG. 10 shows the tunable inductor element 600 in its active state. A voltage difference is applied between electrodes 622 and 610, while a similar voltage difference is applied between electrodes 623 and 611, bringing electrodes 610 and 611 toward substrate 615 and lifting electrode 609 by means of a lever mechanism from both sides. Electrodes 624, 625, 612 and 613 are preferably set at the same voltage and do not contribute to beam movement in FIG. 10. The center gap 627 between electrode 609 and the substrate increases, and the electrode 609 rises above the level of adjacent conducting buses 605 and 606 (not seen). The vertical arrows in FIG. 10 indicate the direction of movement of beam elements 608b-d and attached electrodes 609, 610, and 611 as the tunable inductor element switches from an inactive to active state. The moveable beam elements 608, flexible springs 614 and support posts 626a-f (see also FIGS. 11-12) may be fabricated from material such as single crystal silicon, amorphous silicon, silicon carbide, gallium arsenide, silicon germanium or other common semiconductor materials, while conducting electrodes 609, 610, 611, 612 and 613 may be fabricated from highly conductive materials such as copper, aluminum, aluminum copper, aluminum silicon, gold, silver, platinum, tungsten, tantalum, graphene, titanium or other high conductivity material.

FIG. 11 shows additional detail regarding the central portion of a tunable inductor element 600 of FIG. 10. The central portion of the tunable inductor element 600 includes a moveable beam element 608c supporting overlying conductor 609 and attached to lever arms 608b and 608d by flexible mechanical springs 614e-f. The moveable beam elements 608b-d, flexible springs 614d-g and support posts 626c-d may be fabricated from material such as single crystal silicon, amorphous silicon, silicon carbide, gallium arsenide, silicon germanium or other common semiconductor materials, while conducting electrodes 609, 610, 611, 612 and 613 may be fabricated from highly conductive materials such as copper, aluminum, aluminum copper, aluminum silicon, gold, silver, platinum, tungsten, tantalum, graphene, titanium or other high conductivity material. When the inductor element 600 is activated, electrode 609 is raised above the level of adjacent conducting buses 606 and 605, and the gap 617 between electrode 609 and the substrate 615 is also increased.

Due to the wiring configuration shown in FIG. 9, any current within the conducting electrode 609 will move in an opposite direction to the current in the adjacent conducting buses 605 and 606. The horizontal arrows in FIG. 11 indicate one direction of current flow at a given time within the tunable inductor series (although the opposite direction is also possible) and show that the current in moveable electrode 609 is in the opposite direction to adjacent fixed conducting buses 605 and 606. Current flowing in the electrodes creates magnetic fields surrounding electrodes per the right hand rule. With current flow directions indicated as in FIG. 11, magnetic fields due to currents in electrodes 609 and 605 are in the same direction into the page as indicated by the 'X' marks 627 in the area between electrodes 609 and 605. Magnetic fields from electrodes 609 and 605 combine together in the area between the electrodes 609 and 605, creating a larger net magnetic flux in this area similar to the core region of a coil inductor. Note magnetic field orientations from currents in electrodes 609 and 605 are in opposite directions in areas outside of the area between electrodes 609 and 605. The activated inductor element 600 shown in FIG. 11 and connected as in FIG. 9 therefore behaves similarly to a solenoid inductor with main axis into and out of the page, and has an inductance value that is proportional to both the cross-sectional area between the electrodes 609 and 605 and to the total number of tunable inductor elements connected in series. FIG. 9 shows 3 tunable inductor elements connected in series, but many more configurations are possible within the scope of this invention. The activated tunable inductor 600 stores electromagnetic energy in the magnetic field of aligned current coils, and in doing so provides some upward and outward force that counteracts the mechanical restoring force of spring elements 614d-g. The aligned magnetic fields in FIG. 11 provide an electromagnetic force that opposes changes to the magnetic field that is created.

When the tunable inductor element 600 is deactivated and returned to its initial low inductance state as in FIG. 12, electrode 609 is in substantially the same plane and same height above the substrate as adjacent conducting buses 605 and 606, and there is effectively no overlap or 'core' region of the inductor in a cross sectional view. The inductance of the connected series of inductive elements as well as the stored electromagnetic energy is at a minimum value with elements in the configuration of FIG. 12, as there are no effective loops for magnetic fields to combine and/or influence other loops significantly. The mechanical potential energy is also at a minimum as the springs 614a-j are in a relaxed equilibrium state.

FIG. 12 shows the tunable inductor element 600 returned to its inactive state. The moveable beam elements 608a-e, flexible springs 614a-j and support posts 626a-f may be fabricated from material such as single crystal silicon, amorphous silicon, silicon carbide, gallium arsenide, silicon germanium or other common semiconductor materials, while conducting electrodes 609, 610, 611, 612 and 613 may be fabricated from highly conductive materials such as copper, aluminum, aluminum copper, aluminum silicon, gold, silver, platinum, tungsten, tantalum, graphene, titanium or other high conductivity material. By applying a voltage difference between electrodes 624 and 612 and a similar voltage difference between electrodes 625 and 613 while removing the voltage differences between 622 and 610 and between 623 and 611, electrode 609 on beam element 608c is brought quickly back to an inactive state. By turning off the lever arm actuation that had previously moved electrode 609 away from the substrate 615 and counteracting the lever arm actuation by pulling down electrodes 612 and 613, the center electrode 609 can returned more quickly to its inactive state. The tunable inductor element described above changes capacitance as well as inductance of the connected electrodes and is referred to therefore as a tunable reactance device. The tunable reactance device described above provides a fast switching, repeatable, and variable inductance and capacitance without making any physical contact between surfaces.

Figure 13:
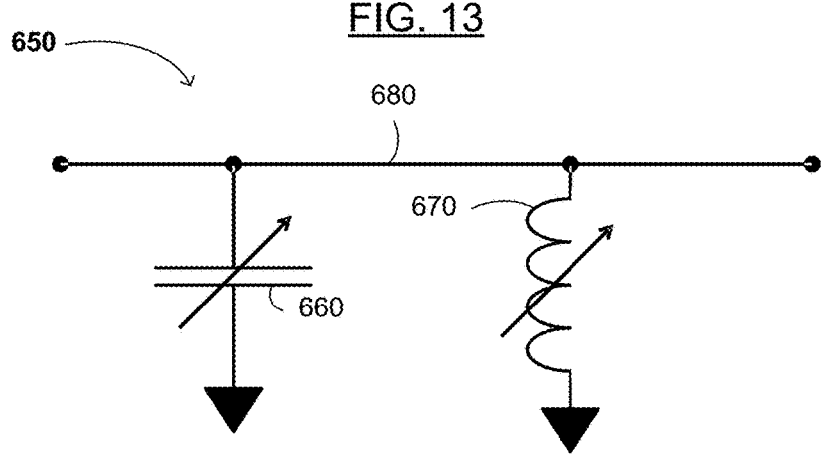
FIG. 13 is a schematic of an exemplary tunable reactance device according to one or more embodiments of the present invention.

A circuit schematic for a tunable reactance device 650 as described herein is shown in FIG. 13. The tunable reactance device 650 includes a variable capacitor 660 and a variable inductor 670. The variable capacitor 660 has one electrode coupled to an RF signal line 680 and the other electrode coupled to a ground potential. The variable inductor 670 has one terminal coupled to the RF signal line 680 and the other terminal coupled to the ground potential. Various implementations of the invention may include arrays of multiple tunable reactance devices arranged in various combinations, such as series and parallel configurations.

Figure 14:
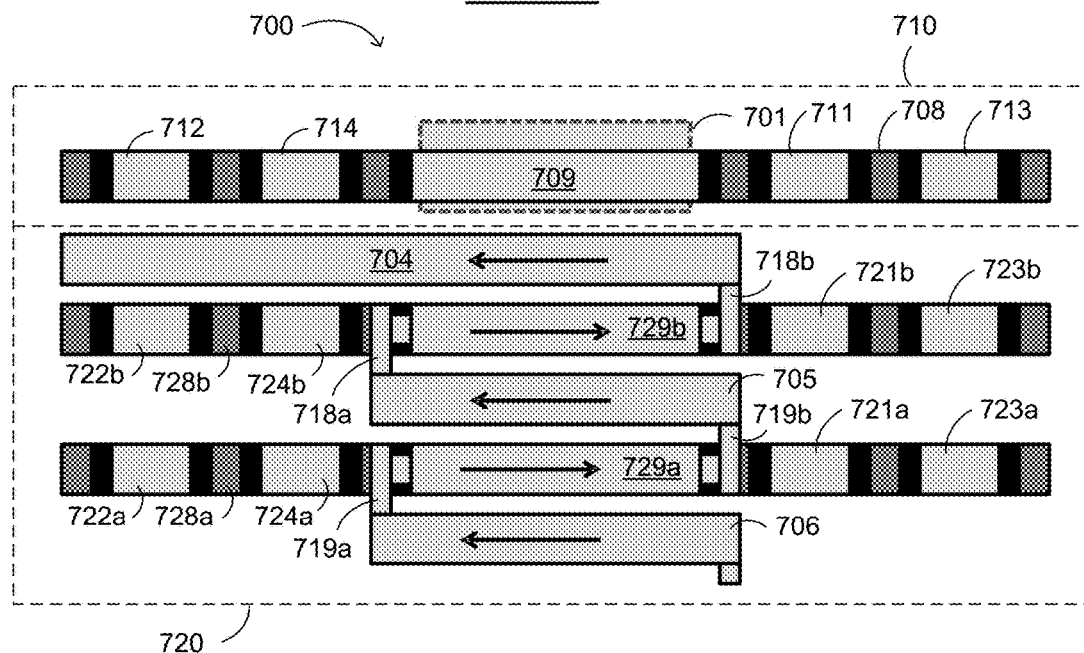
FIG. 14 is a top view showing an exemplary tunable reactance device including tunable capacitor and inductor elements combined on the same substrate according to one or more embodiments of the present invention.

Tunable reactance devices such as the tunable capacitor shown in FIGS. 1 through 4 and 6A-C and the tunable inductor and capacitor device shown in FIGS. 8 through 12 can be fabricated on the same substrate using the same manufacturing process and combined into various combinations of devices as shown in the top down view of the exemplary tunable inductor and capacitor device 700 in FIG. 14. The tunable capacitor element 710 with underlying RF signal bus 701 is fabricated adjacent to a tunable inductor and capacitor series element 720 on the same substrate within the same device. The tunable capacitor element 710 includes control electrodes 711-714, which are preferably external to the RF signal path, support posts (not shown) that support moveable beam elements 708 between gaps under the control electrodes where there are no solid structures, and movable beam elements 708 that support the control electrodes. The tunable capacitor element 710 functions identically or substantially similarly to the tunable capacitor 100 of FIGS. 1-4. The tunable inductor and capacitor element 720 includes conducting buses 704, 705, and 706 and conducting anchor points (e.g., links) 719a-b and 718a-b. The conducting buses are preferably made of the same material by the same process as the conducting electrodes on top of the center elements 729a-b. Conducting bus 705 connects one end of inductor element 729a to the opposite end of inductor element 729b. The conducting buses 704, 705 and 706 preferentially connect to the tunable inductor elements 729a-b at the anchor points 719a-b and 718a-b. Various combinations of tunable capacitors and inductors can be fabricated using the same process on the same device and substrate. For example, conducting bus 704 can be connected electrically to signal bus 701, thereby providing a mechanism to tune both capacitive reactance and inductive reactance on the same signal node and allowing for a greater range of resonance frequency tuning (e.g., given by the equation $\omega_0=1/\text{SQRT}(LC)$).

Figure 15:
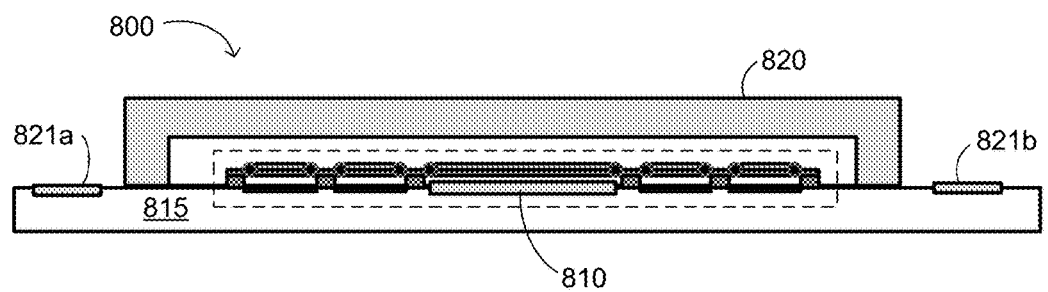
FIG. 15 is a cross-sectional view showing an exemplary packaged tunable reactance device according to one or more embodiments of the present invention.

FIG. 15 shows a tunable reactance device 800 enclosed with a protective cap 820 attached to substrate 815. The protective cap 820 may be made from silicon, silicon carbide, polyimide or other common materials used in semiconductor wafer manufacturing. In one embodiment, the protective cap 820 may be a CMOS circuit wafer that is bonded to substrate 815 by eutectic bonding, fusion bonding, or thermal compression bonding. The protective cap 820 may interface electrically to tunable reactance devices 810 through electrical contacts (not shown) that may be formed by eutectic or thermal compression bonding. Tunable reactance device 800 includes electrodes 821a-b external to the protective cap 820 for the tunable capacitance and/or inductance device 810 to electrically interface with an external device through wire bonding, ball bonding or other electrical wire connection mechanisms as needed or desired.

Figure 16:
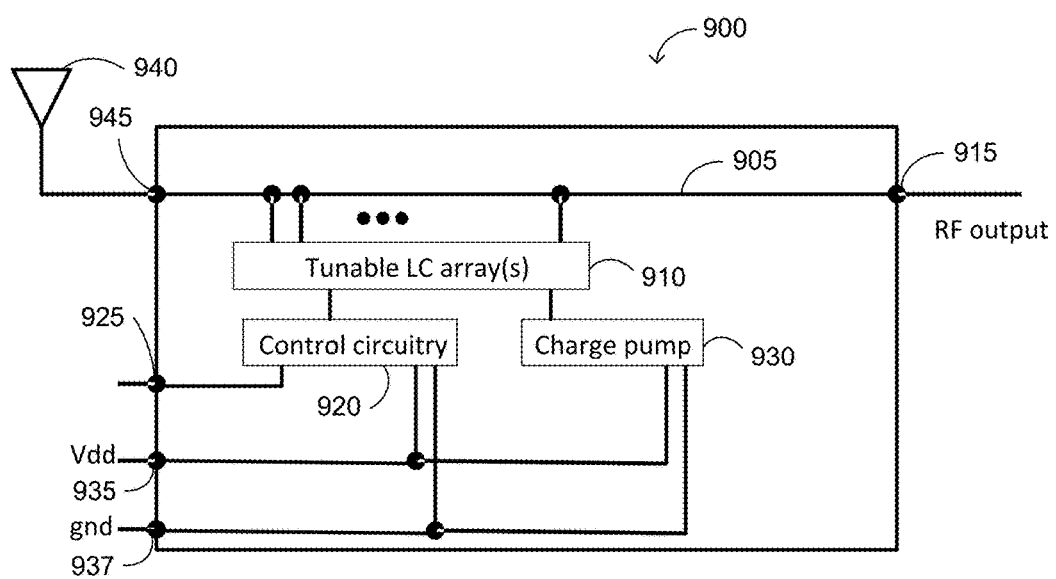
FIGS. 16-17 are schematic diagrams of exemplary integrated circuits including the present tunable reactance device according to embodiments of the present invention.

FIG. 16 shows a schematic for an integrated circuit 900 implementing the present tunable reactance devices and fabricated on a single die. An RF antenna 940 is connected to the RF input port 945 of the die. Various tunable reactance devices 910 including tunable capacitors and inductors are arrayed and coupled or connected to the RF antenna bus 905. Digital control signals are input to the die through a control port 925 along with power and ground supplies through power ports 935 and 937 to a control circuitry block 920. The digital control signals and control circuitry select the number and type or size of tunable reactance devices in the tunable LC array(s) 910 to activate at a given time, and may be changed dynamically to suit operation needs. A charge pump 930 is also provided on the die to increase an input power supply voltage Vdd to a higher voltage (such as 20 V) that may be required to activate the MEMS lever arms or other actuators in the tunable reactance devices 910. The die also provides an RF output port 915 for passing the tuned antenna signal through the die. Various implementations and revisions can be made to this circuit within the scope of this invention.

Figure 17:
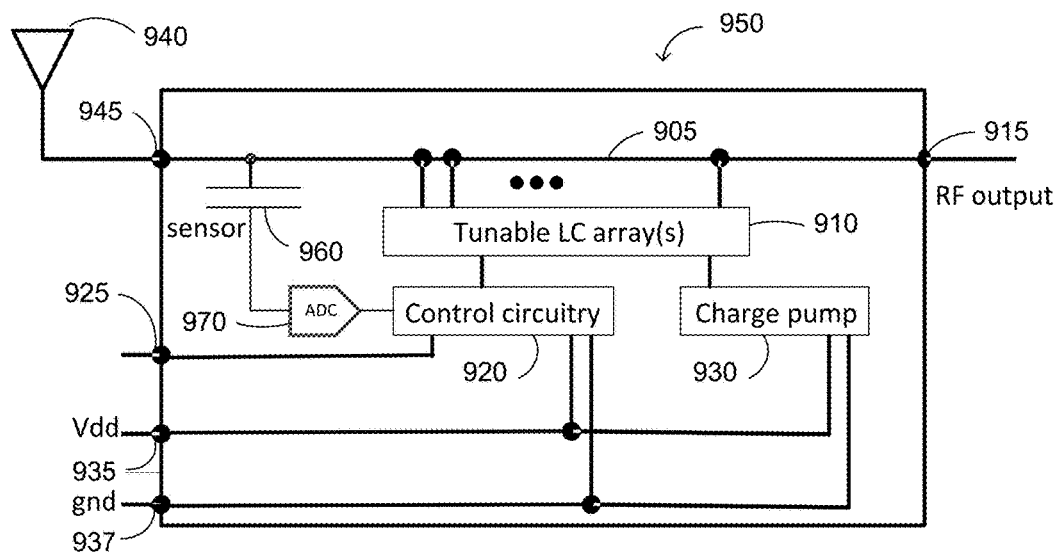

FIG. 17 shows a schematic for another integrated circuit 950 implementing the present tunable reactance devices and fabricated on a single die. An RF antenna 940 is connected to the RF input port 945 of the die. Various tunable reactance devices 910 including tunable capacitors and inductors are arrayed and coupled or connected to the RF antenna bus 905. A signal sensor represented by the capacitor 960 measures the input power level (e.g., of the RF signal). The signal sensor can also filter or limit the current of the input signal, and can filter or transmit the frequency of the input signal. The sensor may include additional circuit elements and/or features beyond the capacitor 960, and in some embodiments, may further include some or all of the tunable reactance elements 910. Analog signals from the sensors are input to an analog to digital converter (ADC) 970. The ADC 970 converts information from the analog sensors such as power level, frequency, and phase and inputs them to a digital control block 920. Digital control signals are input to the die through control port 925 along with power and ground supplies through power ports 935 and 937 to the control circuitry block 920. The digital control signals and control circuitry select the number and type or size of tunable reactance devices in the array(s) 910 to activate at a given time, and may be changed dynamically to suit operation needs. A charge pump 930 is also provided on the die to increase an input power supply voltage Vdd to a higher voltage (such as 20 V) that may be required to activate the MEMS lever arms or other actuators in the tunable reactance devices 910. The die also provides an RF output port 915 for passing the tuned antenna signal through the die. Various implementations and revisions can be made to this circuit within the scope of this invention.

An Exemplary Tunable Reactance Device with Lateral Displacement

Figure 18:
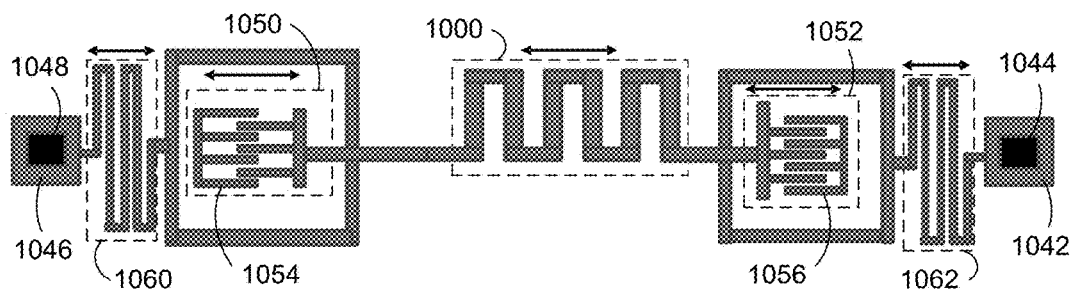
FIG. 18 shows a top view of a tunable reactance device configured as a tunable inductor according to one or more embodiments of the present invention.

FIG. 18 shows a top view of a tunable reactance device configured as a tunable inductor. The moveable MEMS beam 1000 is connected to springs 1060 and 1062, which are supported by anchors 1042 and 1046 connected to a substrate (not shown). The serpentine structure 1000 may be connected to an upper or lower layer through vias 1044 and 1048. Springs 1060 and 1062 are significantly softer than the serpentine structure 1000 and undergo deformation during movement of the springs 1060 and 1062. The tunable reactance device contains fixed electrodes 1054 and 1056 anchored to the substrate as part of comb drives 1050 and 1052, which actuate movement of the beam through electrostatic force. The horizontal arrows indicate the direction of movement of the structures, which are untethered to the substrate except for the anchors 1042 and 1046 and fixed electrodes 1050 and 1052. An electrical connection is provided through the moveable MEMS beam 1000 by a metal coating on the moveable beam 1000. Comb drives 1050 and 1052 are preferably not metallized. In this embodiment, the moveable beam 1000 of the tunable reactance device contains a serpentine or zig zag structure which is parallel to the substrate. The tunable reactance device further contains vias 1044 and 1048 through anchors 1042 and 1046 to provide electrical connection to a second layer of the device.

Figure 19A:
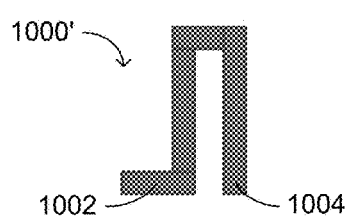
FIGS. 19A-B are top and cross-sectional views showing a basic structure in another exemplary tunable reactance device according to one or more embodiments of the present invention.
Figure 19B:
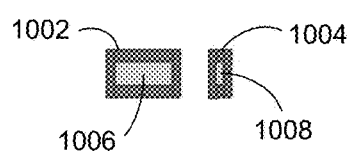

FIGS. 19A-B show details of a basic unit 1000' of the serpentine structure 1000 shown in FIG. 20. The basic unit 1000' (as well as the serpentine structure 1000) may comprise silicon or another mechanical material (e.g., 1006, 1008) with added metal (e.g., surfaces 1002 and 1004). FIG. 19A is a top-down view of the serpentine mechanical structure 1000' surrounded by metal, created in a first layer. A cross-section of the serpentine structure 1000' in FIG. 19A is shown in FIG. 19B. The serpentine structure 1000' comprises or consists of a mechanical material 1006, 1008 such as silicon with a metal coating 1002, 1004 such as copper (which may be electroplated or deposited by CVD). The metal coating 1002 and 1004 preferably surrounds the mechanical layer 1006 and 1008, but may also be a metal layer deposited largely on the top surface of mechanical layers 1006 and 1008 (e.g., the upper portions of 1002 and 1004 in FIG. 19B).

Figure 20A:
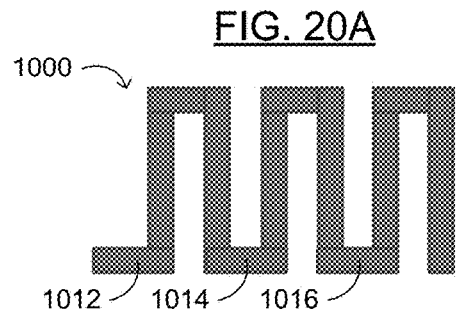
FIGS. 20A-B are top and cross-sectional views showing an exemplary serpentine mechanical structure with added metal, created in a first layer in the exemplary method of making a tunable reactance device according to one or more embodiments of the present invention.
Figure 20B:
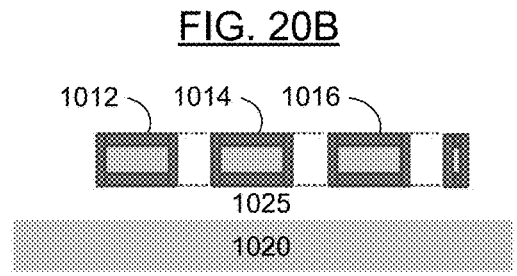

FIGS. 20A-B show top-down and side views of the serpentine structure 1000, respectively, supported above a substrate 1020 by springs and anchors (not shown in FIGS. 20A-B, but similar to those shown in and described with respect to FIGS. 1-4, 6A, 8A-12 and 14) with a gap 1025 between the substrate 1020 and the serpentine structure 1000.

Figure 21A:
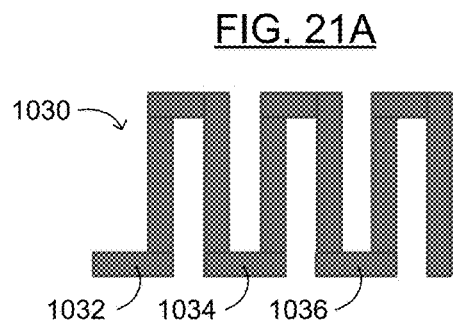
FIGS. 21A-B are top and cross-sectional views showing the serpentine mechanical structure of FIGS. 20A-B with an added metal layer above the first layer, with a gap in between the first and second layers.
Figure 21B:
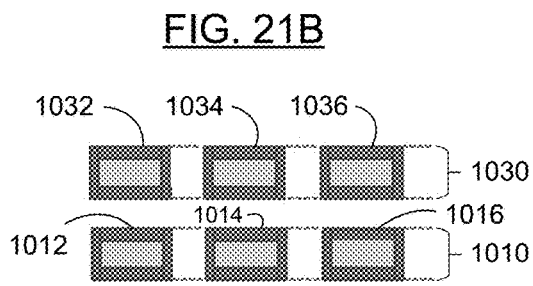

FIGS. 21A-B are top and cross-sectional views showing the serpentine mechanical structure of FIGS. 20A-B with an added metal layer 1030 above the first layer 1010, with a gap in between the first and second layers. In FIG. 21, the second serpentine MEMS layer 1030 is provided with the same shape and footprint as the first serpentine MEMS layer 1010. The second serpentine MEMS layer 1030 is supported by anchors (not shown) and connected electrically to the first serpentine MEMS layer 1010 with one or more vias (see FIG. 22B) as in the first serpentine MEMS layer. The second serpentine MEMS layer 1030 is mechanically supported with springs (not shown) above the first serpentine layer 1010 with a gap in between the two serpentine layers.

Figure 22A:
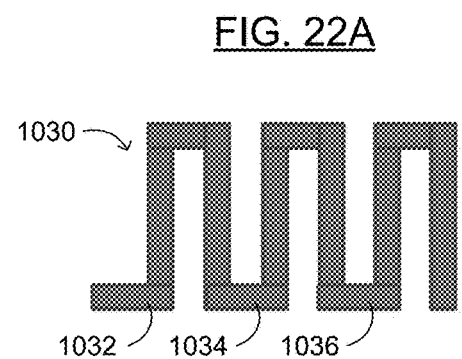
FIGS. 22A-B are top and cross-sectional views showing the serpentine mechanical structure of FIGS. 21A-B having an electrical connection provided from a first serpentine layer to a second serpentine layer through a via apart from the serpentines.
Figure 22B:
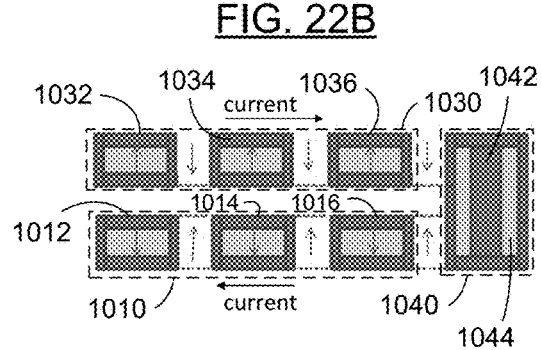
Figure 22C:
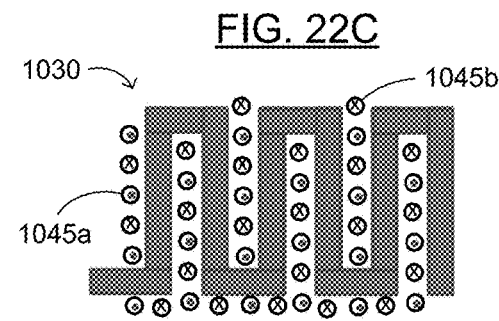
FIG. 22C shows the magnetic field generated by passing a current through the serpentine mechanical structure of FIGS. 22A-B. The magnetic fields face in opposite directions through the serpentine elements, resulting in a low net magnetic flux and a low inductance state.

FIGS. 22A-B are top and cross-sectional views showing the serpentine mechanical structure of FIGS. 21A-B having an electrical connection 1040 provided from the first serpentine layer 1010 to the second serpentine layer 1030 through a substrate apart from the serpentines. The electrical connection comprises a via 1042 in an anchor 1044 from a first serpentine element 1016 to a second serpentine element 1036. The serpentine conductors in the first and second serpentine layers 1010 and 1030 are connected across an electrical load, allowing current to flow through the serpentines. Current in the first serpentine layer 1010 flows in an opposite direction from the current in the second layer 1030, regardless of the load. FIG. 22C shows that the magnetic fields generated from the current flow in the first and second serpentine layers 1010 and 1030 face in opposing directions through the serpentines, resulting in low net magnetic flux and low inductance. A circled "X" represents the magnetic field into the plane of the page, and a circled dot ("●") represents the magnetic field out of the plane of the page.

In FIGS. 22A-C, an electrical load at one end of a first MEMS serpentine structure 1010 is connected to one end of a second MEMS serpentine structure 1030, such that a current passes through the first MEMS serpentine structure 1010, a via 1040, and the second MEMS serpentine structure 1030. The current in the first MEMS serpentine structure 1010 in the first layer flows in a direction opposite to the current in the second MEMS serpentine structure 1030. Magnetic fields 1045$a$-$b$ generated by current flow through the serpentine structures 1010 and 1030 face in opposite directions along the z-axis as indicated by the symbols in the circles. FIG. 22C indicates an equal amount of magnetic field into and out of the page. Since the magnetic fields 1045$a$-$b$ face in opposite directions, the net magnetic flux through the serpentines 1010 and 1030 in the z direction is small and the inductance of the system is relatively low.

Figure 23:
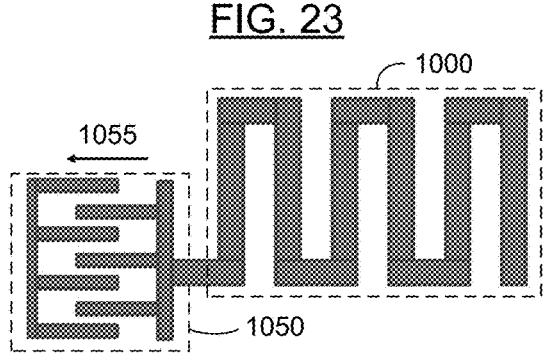
FIG. 23 is a top view of an exemplary serpentine mechanical structure and comb drive provided in one or more layers according to one or more embodiments of the present invention.

FIG. 23 is a top view of an exemplary at least one structure such as a comb drive 1050 for providing an electrostatic force 1055 that can displace a corresponding serpentine structure 1000 according to one or more embodiments of the present invention. Although the comb drive 1050 is shown connected to the serpentine structure 1000 in the first layer 1010, the comb drive 1050 may be connected to the serpentine structure 1030 in the second layer, or there may be a comb drive in each of the first and second layers, respectively connected to the corresponding serpentine structure.

FIG. 23 shows a movable MEMS serpentine 1000 connected to one end of the comb drive 1050. The comb drive 1050 provides an attractive electrostatic force to move the MEMS serpentine 1000. In a preferred embodiment, there are counterbalanced comb drives 1050 and 1052 which can independently pull the moveable MEMS serpentine 1000 in opposite directions, as shown in FIG. 18. The comb drives 1050 and 1052 have one end that is anchored to a substrate (e.g., substrate 1020 in FIG. 20B). In a preferred embodiment, the metallization on serpentine 1000 does not cover the comb drives 1050 and/or 1052, but rather, provides a low resistance route around the comb drives 1050 and/or 1052 from one via 1044 to the via 1048 on the opposite end of the moveable MEMS serpentine 1000 as shown in FIG. 18.

In FIG. 24, an electrostatic force is applied to one or more serpentine layers to move one serpentine a half pitch distance relative to the other serpentine. The original position (1000) of the serpentine is shown by the dashed lines. In FIG. 24, an electrostatic force at comb drive 1050 is applied in the negative x direction, resulting in the displacement of the moveable MEMS serpentine element by one-half pitch to position 1000-A. FIG. 24 indicates the relative displacement of the serpentine along the x axis from the original position (1000). There is no displacement along the y-axis.

FIGS. 25A-B are top and cross-sectional views showing the serpentine mechanical structure of FIGS. 22A-B, in which magnetic fields 1045$a'$-$b'$ generated from current flow in the serpentines 1010 and 1030 face in similar directions, resulting in higher net magnetic flux and higher inductance. The "X" in a circle indicates the magnetic field 1045$b'$ into page. The dot in a circle indicates the magnetic field 1045$a'$ out of the page.

FIGS. 25A-B indicate the directions of magnetic fields 1045$a'$-$b'$ resulting from currents through the tunable inductor element 1000 when one of two serpentine elements 1010 and 1030 is displaced one-half pitch along the x axis relative to the other serpentine element. Magnetic fields 1045$a'$-$b'$ along the z axis point in the same direction, reinforcing each other and contributing to an increase in the magnetic flux and inductance of the tunable inductor element 1000. Magnetic fields 1045a'-b' undergo a topological change from the configuration in FIG. 22C, where magnetic fields in the z direction cancel each other, to the configuration in FIG. 25A, where the magnetic fields 1045a'-b' reinforce each other in the z direction, with alternating −z and +z directions with subsequent turns of the serpentine(s). Magnetic coupling between the layers 1010 and 1030 depends on gap spacing, which is preferably small relative to the thickness of the serpentines 1010 and 1030. More electromagnetic energy is stored in the magnetic fields 1045a'-b' in the deflected state shown in FIGS. 25A-B than in the undeflected state shown in FIG. 22A-C. The configuration of FIGS. 25A-B is preferred in terms of electromagnetic energy and can be a metastable state. In addition to a mechanical force, the moveable MEMS serpentine structure(s) 1010 and/or 1030 will experience an electromagnetic force to pull the magnetic fields toward each other and align in the same direction. The configuration of FIGS. 25A-B can be stable to small perturbations due to the electromagnetic forces driving the serpentines 1010 and 1030 toward alignment of the magnetic fields 1045a'-b'.

Figure 26A:
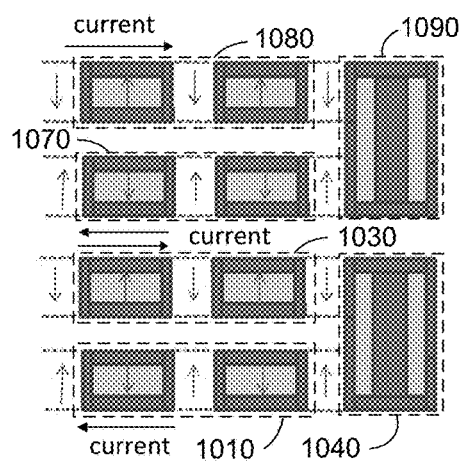
FIGS. 26A-B are cross-sectional views showing the tunable reactance element of FIGS. 22A-B extended to multiple layers, resulting in higher inductance change per unit area.
Figure 26B:
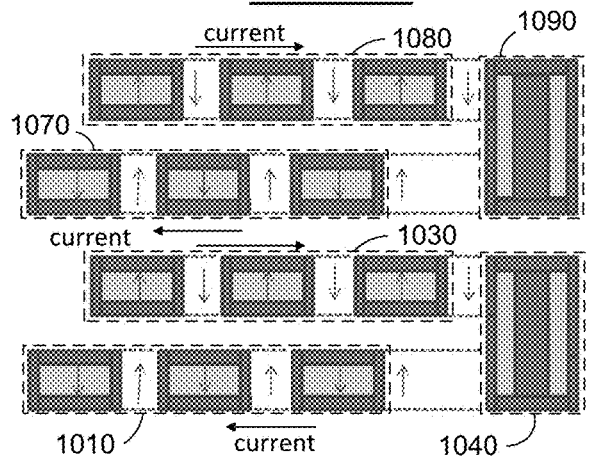

FIGS. 26A-B are cross-sectional views showing the design of FIGS. 22A-B extended to multiple layers 1010, 1030, 1070 and 1080, resulting in higher inductance change per unit area. FIG. 26A shows the lowest inductance state. FIG. 26B shows the highest inductance state. In further embodiments, different layers (e.g., 1010 alone, 1030 alone, 1070 alone, 1010 and 1080 together, etc.) may be offset or moved a half-pitch distance relative to the other serpentines. The configurations in FIGS. 26A-B may be analogous to multiple vertical solenoid inductor structures in parallel. Through actuation of the moveable MEMS serpentine beams 1010, 1030, 1070 and/or 1080, the solenoid-like inductance can be turned on or off in a digital or multi-bit fashion.

FIG. 27 shows another embodiment in which the spacing between adjacent turns of the serpentines 1010' and 1030' (and thus the magnetic field overlap areas 1013a-c) is larger than in earlier figures. In one such embodiment, the spacing between adjacent turns of the serpentines 1010' and 1030' is larger than the displacement of the serpentine 1030', allowing for analog fine tuning of the inductance (e.g., by applying an electropotential to the comb drive 1050 that may vary within a predetermined range). In this configuration, tuning of the inductance is proportional to the ratio of overlap areas 1013a-c (which increase the inductance) to overlap areas 1017a-c (which reduce the inductance). Serpentine 1030' is in one layer, serpentine 1010' is in another layer, and the serpentines 1010' and 1030' are electrically connected through at least one via in an anchor structure (not shown). In this invention, analog inductance tuning elements like that shown in FIG. 27 can be connected in various series and parallel combinations to digital inductance tuning elements like that shown in FIGS. 22-25, thereby providing coarse digital tuning as well as fine analog tuning of inductive reactance with the same device on the same substrate.

Figure 28:
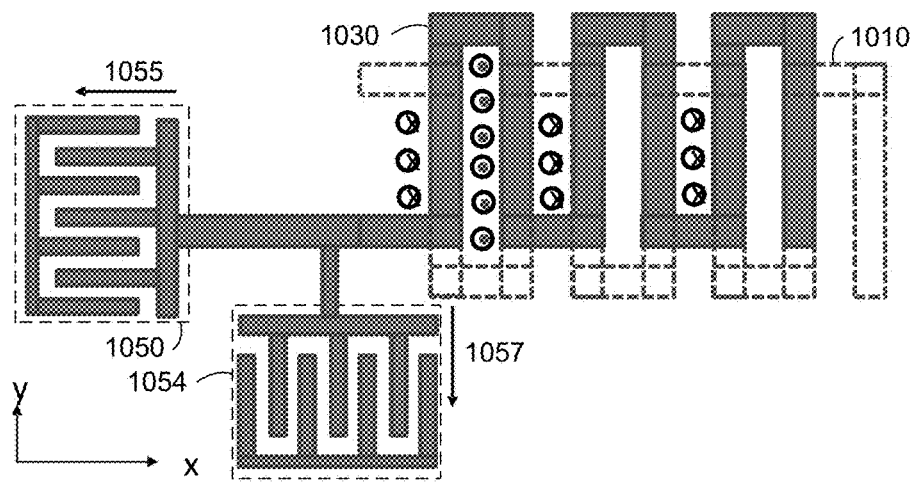
FIG. 28 is a top view of a further alternative serpentine MEMS element that can be moved and tuned in two dimensions, according to one or more embodiments of the present invention.

FIG. 28 shows a serpentine MEMS element 1030 that can be moved and tuned in two (orthogonal) dimensions, resulting in digital gross tuning and analog fine tuning using the same set of serpentines. Digital tuning, for example, can be performed along one dimension (e.g., in the x-direction) by moving the serpentine 1030 by one-half pitch relative to the other serpentine 1010 for gross tuning of inductance. Analog tuning can then be performed in the other dimension (e.g., the y-direction) by moving the serpentine 1030 within a predefined pitch range to change the overlap area 1013' for fine tuning of inductance. In such an embodiment, the fingers of the comb drives 1050 and 1054 may be spaced father apart or may have a sawtooth-like profile or shape to allow freedom of movement in the two orthogonal directions. Orthogonal motion can also be provided by attaching comb structures 1050 and 1057 to different concentric support frames (not shown), each of which preferably moves along a single axis.

Figure 29:
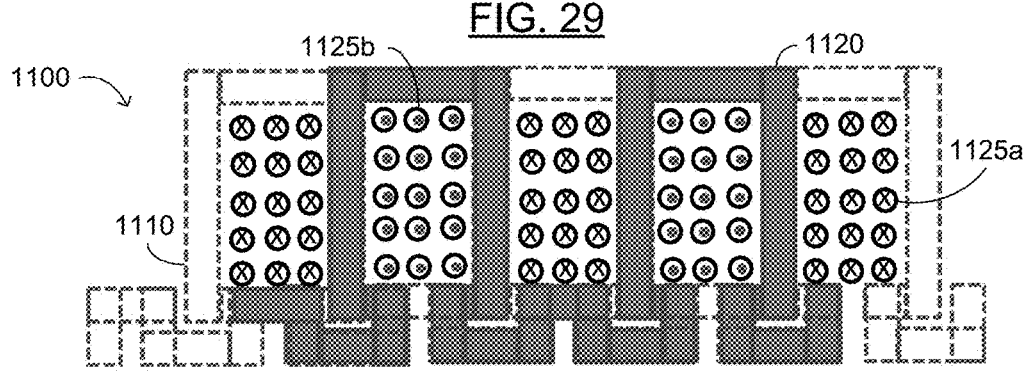
FIG. 29 is a top view of an even further alternative serpentine MEMS element in which coupling between adjacent layers can be increased by providing nearly closed loops, according to one or more embodiments of the present invention.

FIG. 29 shows an embodiment 1100 in which coupling between adjacent layers can be increased by providing nearly closed loops. The moveable serpentine beams 1110 and 1120 are shaped into nearly closed loops to improve magnetic coupling between the serpentine elements 1110 and 1120. The nearly closed loops also help to confine the magnetic field(s) 1125a and 1125b along the z axis. The "X" in a circle indicates the magnetic field into page. The dot in a circle indicates the magnetic field out of the page.

Figure 30:
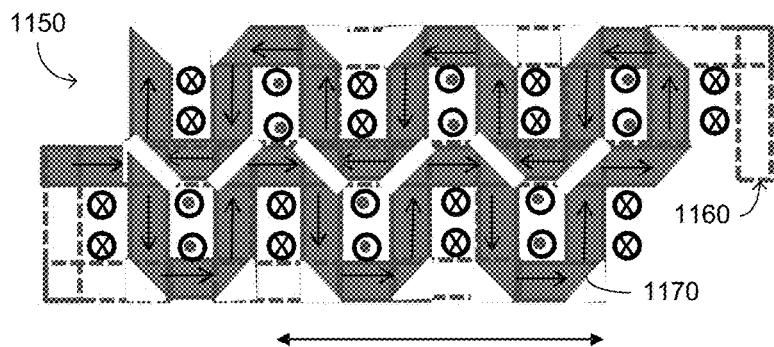
FIG. 30 is a top view of a still further alternative serpentine structure generalized to a two-dimensional checkerboard array of clockwise and counterclockwise current loops in a high inductance state, according to one or more embodiments of the present invention.

FIG. 30 shows another embodiment 1150 in which the serpentine structure can be generalized to a two-dimensional checkerboard array of clockwise (CW) and counter-clockwise (CCW) current loops in the high inductance state. Identical overlaid patterns with opposite current directions (indicated by the arrows along the serpentine 1170) result in little to no net magnetic field in the low inductance state. Mechanical deflection of one serpentine 1170 is lateral and in the plane of the page. Identically or substantially identically shaped beams 1160 and 1170 form a close-packed continuous current path in which at least one of the beams is moveable. The current in beam 1170 moves in an opposite direction to current in beam 1160. The configuration in FIG. 30 provides a high density tunable inductive element, as each segment of the current path contributes to the tunable inductance. The configuration in FIG. 30 can provide a high tuning ratio for inductance and a high Q (or quality factor), which is a measure of the ratio of energy stored in the inductor to resistive and other losses in the inductor. The "X" in a circle indicates the magnetic field into page. The dot in a circle indicates the magnetic field out of the page.

Advantages of the present tunable inductor include the ability to provide a large change in inductance with a relatively small displacement, achieve high tuning ratios with inductors (e.g., since the magnetic fields can be effectively cancelled at one end or combined with high coupling at the other), and minimize or eliminate resistance changes during tuning (e.g., compared to other technologies using MOSFET switches or MEMS contact switches). Due to lower resistive losses, embodiments relating to the present tunable inductor can enable a higher quality factor (or Q) for signal tuning, enabling a finer frequency tuning range. The present invention also provides higher device reliability than variable capacitors and/or inductors using contact switches, as there are no reversibly contacting surfaces. The present tunable capacitors and inductors minimize or eliminate degradation due to dielectric charging, as is sometimes seen in contact switches including MEMS capacitive devices. The present tunable inductors generate magnetic fields in opposite directions with similar magnitudes, resulting in a small value of the net magnetic field and reduced electromagnetic interference with surrounding circuits, as compared to a solenoid of similar inductance. Embodiments of the present tunable inductors that include an air core enable high frequency operation.

An Exemplary Tunable Capacitor with Lateral Displacement

Figure 31:
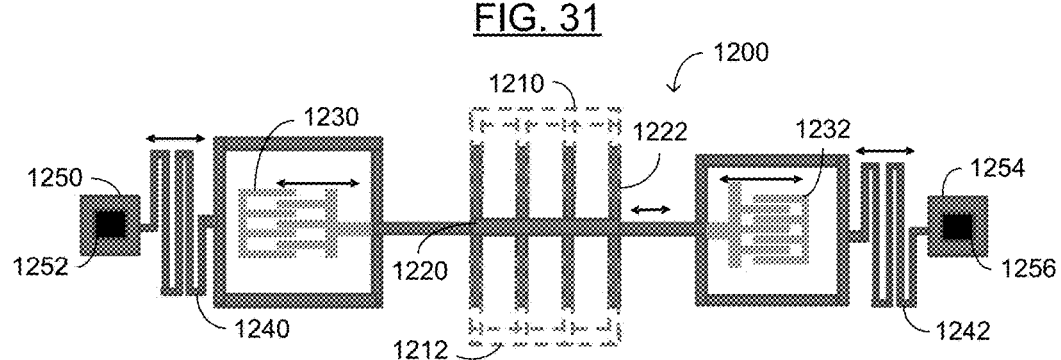
FIG. 31 is a top view of a tunable reactance device configured as a tunable capacitor, according to one or more embodiments of the present invention

In addition to structures shown in FIGS. 18-30, which provide devices for tuning inductive reactance, devices for tuning capacitive reactance can be provided with the same fabrication process on the same substrate. FIG. 31 shows an embodiment of a tunable reactance device 1200 configured as a tunable capacitor, analogous to the tunable inductor in FIG. 18. A moveable MEMS beam 1220 is connected to springs 1240 and 1242, which are supported by anchors 1250 and 1254 that are connected to a substrate (not shown). The tunable reactance device 1200 contains fixed electrodes 1230 and 1232 also anchored to the substrate, which actuate movement of the beam 1220 through electrostatic force. The arrows in FIG. 31 indicate the direction(s) of movement of the structure 1220, which is untethered except for the anchors 1250 and 1254 and the fixed electrodes 1230 and 1232. An electrical connection is provided through the moveable MEMS beam 1200 by a metal coating on the moveable beam 1220. In this embodiment, the moveable beam 1220 of the tunable reactance device 1200 contains capacitor fingers 1222 which are parallel to the substrate and parallel to capacitor plates 1210 and 1212. The capacitor plates 1210 and 1212 are preferably fixed (e.g., to the substrate or to an overlying structure) and at different spacing from the substrate than the capacitor fingers 1222. Capacitor plates 1210 and 1212 are connected to different electrical nodes than the moveable beam 1220 and are preferably grounded. The tunable reactance device 1200 contains vias 1252 and 1256 through anchors 1250 and 1254 to provide electrical connection to a second layer of the device. Springs 1240 and 1242 are significantly softer than capacitor element 1220 and undergo deformation during movement.

Figure 32A:
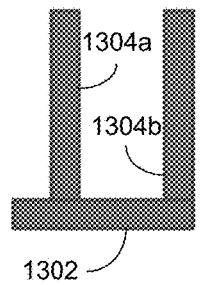
FIGS. 32A-B show top and cross-sectional views of a basic structure for a tunable capacitor in accordance with one or more embodiments of the present invention.
Figure 32B:
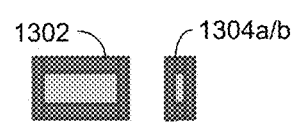

FIGS. 32A-B show top and cross-sectional views of a basic structure for a tunable capacitor in accordance with one or more embodiments of the present invention, comprising a main electrode 1302 and capacitor fingers 1304a-b. As shown in FIG. 32B, the main electrode 1302 and capacitor fingers 1304a-b (cross-section not drawn to scale) may comprise silicon or another mechanically rigid material with added metal such as electroplated copper. The basic component of the tunable capacitive device shown in FIGS. 32A-B is analogous to the basic unit of the serpentine element for a tunable inductor shown in FIGS. 19A-B.

Figure 33A:
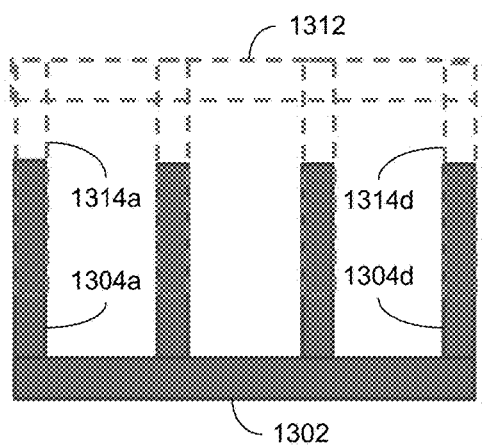
FIGS. 33A-B show top and cross-sectional views of a multi-layer structure for a tunable capacitor in a first, high capacitance position in accordance with one or more embodiments of the present invention.
Figure 33B:
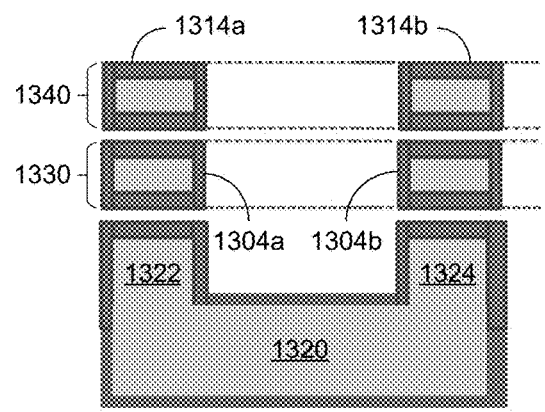
Figure 35A:
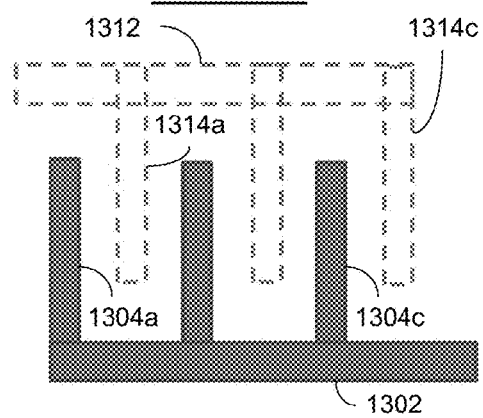
FIGS. 35A-B show top and cross-sectional views of the tunable capacitor of FIGS. 33A-B in a second, low capacitance position in accordance with one or more embodiments of the present invention.
Figure 35B:
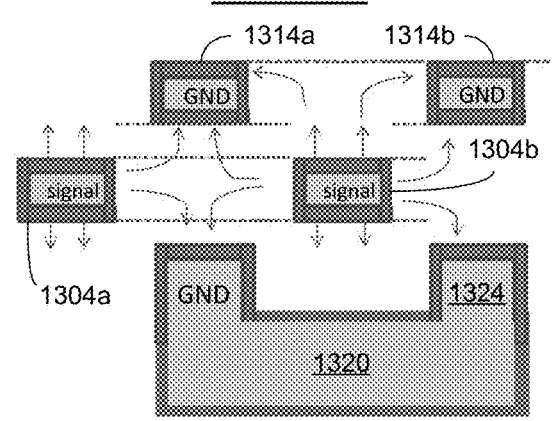

FIGS. 33A-B show top and cross-sectional views of a multi-layer structure for a tunable reactance device (a tunable capacitor 1300) in accordance with the embodiment(s) of FIGS. 32A-B. The tunable capacitor 1300 comprises two mechanical structure layers 1330 and 1340 (e.g., silicon with added metal) above a substrate 1320, with a gap between the layers. FIGS. 35A-B show capacitor electrode positions and the electric field directions when the tunable capacitor 1300 is in a binary/digital position with lower capacitance. For example, electric field lines are indicated with arrows from signal electrodes 1304a-b to substrate 1320 and to capacitor electrodes 1314a-b. Signal electrodes 1304a-b experience an electromagnetic force due to the potential difference between the signal line 1302 and the electrodes 1314a-b, but is designed to be in electromechanical equilibrium in the binary/digital position of FIGS. 35A-B due to a restoring force from supporting springs, such as springs 1240 and 1242 shown in FIG. 31. In FIGS. 35A-B, the tunable capacitor 1300 also has lower electrical energy and is in mechanically relaxed state, in which the main electrode 1302 is in an undeflected position with the mechanical springs (e.g., 1240 and 1242 in FIG. 31) in equilibrium. An AC or DC electrical signal is transmitted along moveable beam 1302 while substrate 1320 and capacitor electrodes 1314a-b (through main electrode 1312) are preferably grounded. The signal electrode 1302 is spaced relatively far from the substrate 1320, the main electrode 1312 and the capacitor electrodes 1304a-b.

Figure 34:
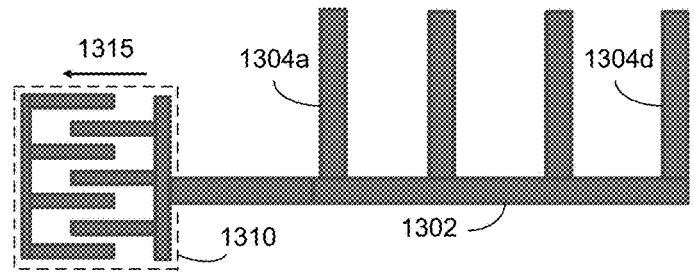
FIG. 34 is a top view of an exemplary mechanical structure and comb drive (for providing an electrostatic force to the mechanical structure) provided in one or more layers, according to one or more embodiments of the present invention.

FIG. 34 shows a structure for providing an electrostatic force 1315 to the tunable capacitor electrode such as a comb drive 1310. The comb drive 1310 may be provided in the first layer 1310 and/or the second layer 1330 (FIG. 33). The electrostatic force 1315 is applied to the moveable capacitor beam 1302 by one or more electrostatic comb drives 1310. In a further embodiment, there are two or more counterbalanced comb drives on either or both ends of the moveable beam 1302, which allows the beam 1302 to be pulled in either direction along the x-axis (and optionally in one or both directions along the y-axis), while maintaining a constant capacitance value between the beam and comb drives.

FIGS. 33A-B show top and cross-sectional views of the tunable capacitor of FIG. 31. FIGS. 33A-B depict the tunable capacitor in a second binary/digital position, in which one or more comb drives (e.g., 1310 in FIG. 34) have pulled the moveable beam 1302 between electrodes 1314a-b and substrate 1320, and the capacitor is mechanically deflected. In the state shown in FIGS. 33A-B, the tunable capacitor has a higher capacitance, higher electrical energy state than in FIGS. 35A-B. FIG. 33A shows the top-down view and FIG. 33B shows the cross-sectional view of the moveable beam 1302 suspended above the substrate 1320 with a gap therebetween. The tunable capacitor structure 1302 is suspended by springs (1240 and 1242 in FIG. 31) connected to anchors (1250 and 1254 in FIG. 31). FIG. 35B shows a second layer 1314a-b of the capacitor structure provided above the moveable beam 1302 with a gap therebetween. The tunable capacitor elements include a mechanical material such as silicon with a metal layer or coating, such as electroplated copper, thereon (e.g., on all exposed surfaces thereof). It is preferable that the gaps have the same height or spacing. It is preferable for the higher capacitance state (FIGS. 33A-B) to be the mechanically deflected state, since there is higher energy in the high capacitance state, and electromagnetic forces can make it meta-stable. Supporting springs such as 1240 and 1242 in FIG. 31 are mechanically deflected in the high capacitance state and provide a restoring force in the negative x direction or positive x direction, depending on initial deflection. In addition to a mechanical restoring force, moveable beam 1302 experiences electromagnetic forces from substrate 1320 and capacitor electrodes 1314a-b that tend to hold it in place in the second position shown in FIGS. 33A-B. The second position shown in FIGS. 33A-B may be a metastable state, which is stable to small electromagnetic or mechanical perturbations. The moveable beam 1302 can be returned to the first position (FIGS. 35A-B) by a second comb drive (such as comb drive 1230 in FIG. 31) which pulls the moveable beam 1302 in the negative x direction to an electromechanical equilibrium position.

Figure 36:
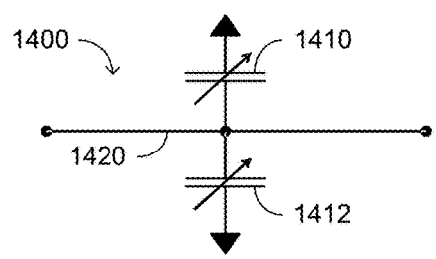
FIG. 36 is an equivalent circuit for the tunable capacitor of FIGS. 33A-35B.

FIG. 36 depicts a circuit schematic representing an equivalent circuit for the tunable capacitor of FIGS. 33A-35B. The tunable capacitor provides a tunable capacitance to substrate 1320 and capacitor electrodes 1314a-b in FIGS. 33A-35B. Other configurations of series and parallel tunable and fixed capacitances can be configured using the structures shown in FIGS. 31-35B. Tunable capacitors and tunable inductors described in this application can be fabricated using the same process on the same substrate.

Tunable capacitors and tunable inductors can be connected in various combinations as desired for use with, for example, impedance matching networks, tunable filters, voltage controlled oscillators or phase delay circuits. For example, FIG. 37A-B show two simple example combinations of tunable inductors and tunable capacitors connected in series and/or in parallel. Various combinations can be configured as desired within the scope of this invention.

An Exemplary Method of Making a Tunable Reactance Device

Figure 38D:
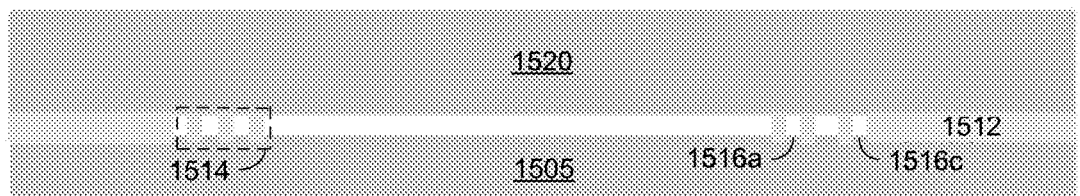
FIGS. 38A-R show an exemplary method of making a tunable reactance device in accordance with one or more embodiments of the present invention.
Figure 38E:
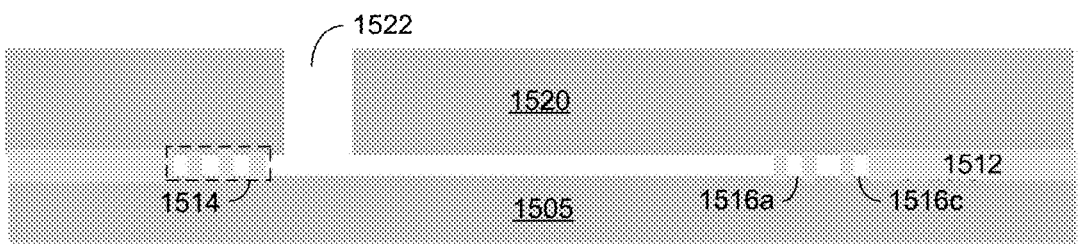
Figure 38F:
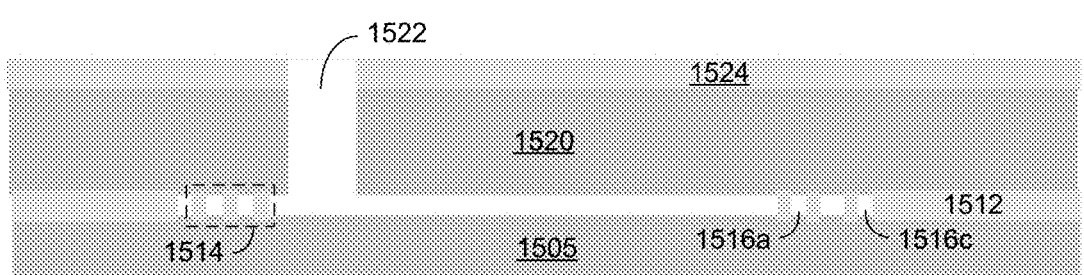
Figure 38G:
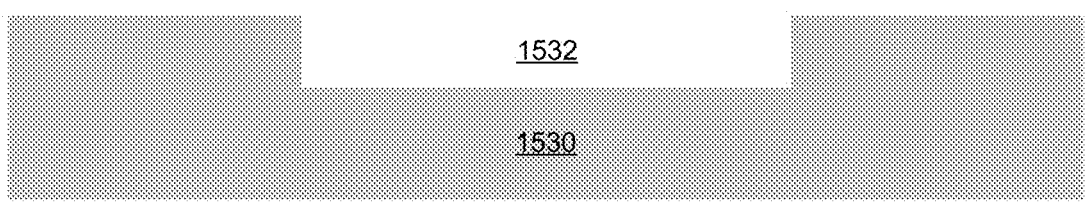
Figure 38H:
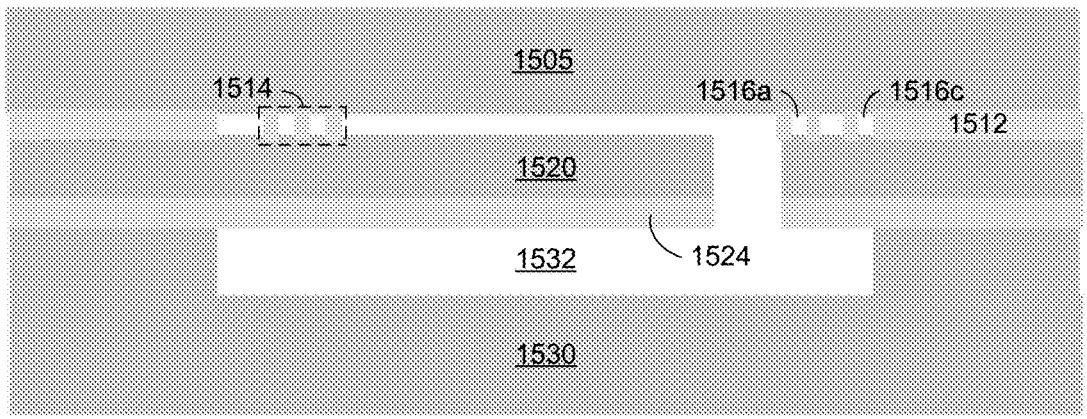
Figure 38I:
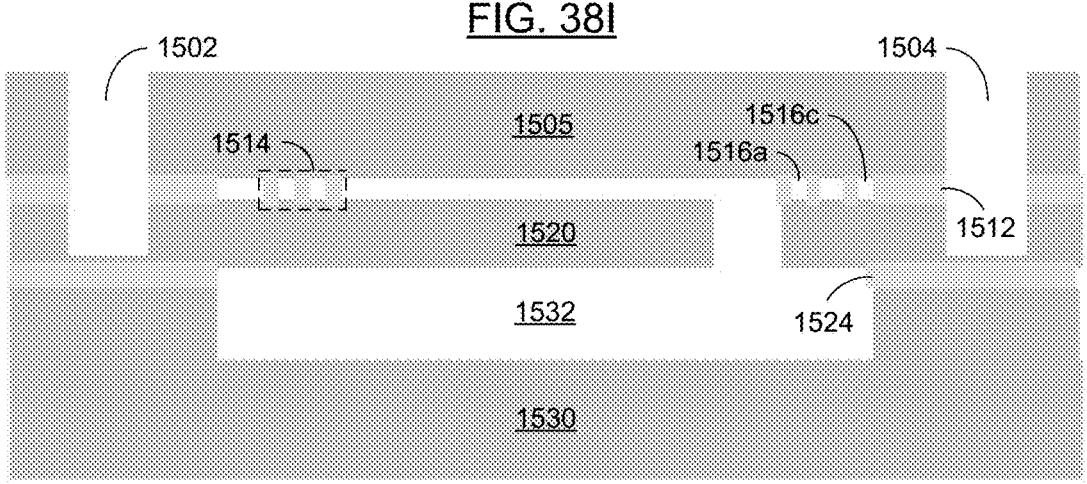
Figure 38J:
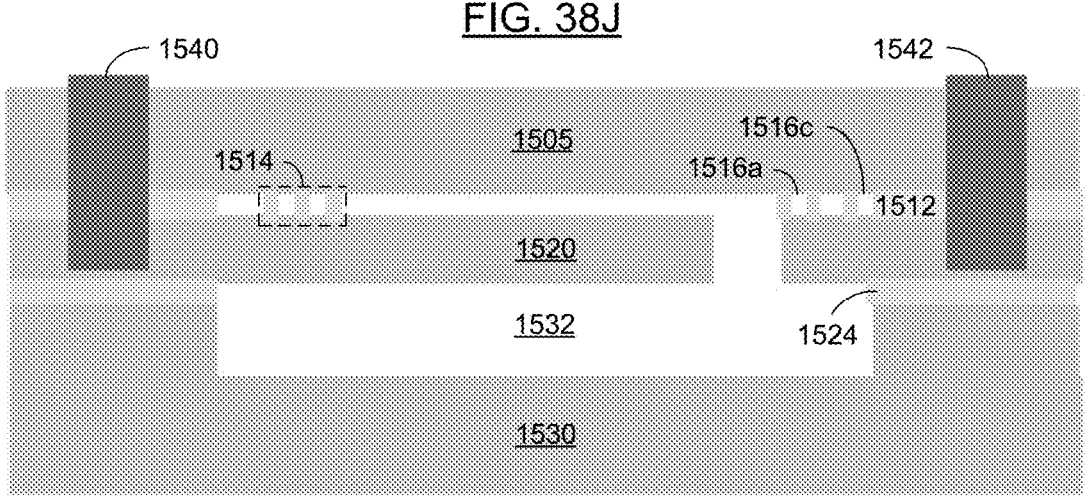
Figure 38K:
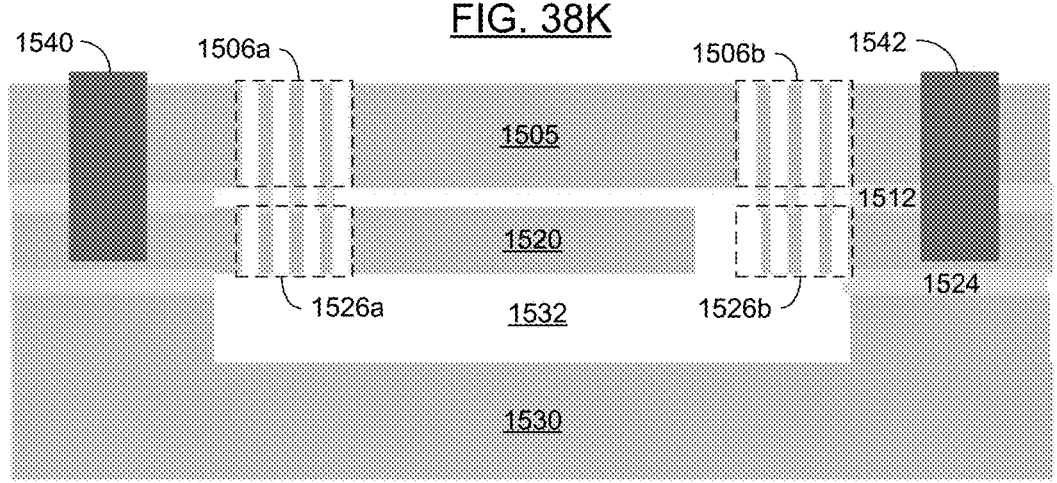
Figure 38L:
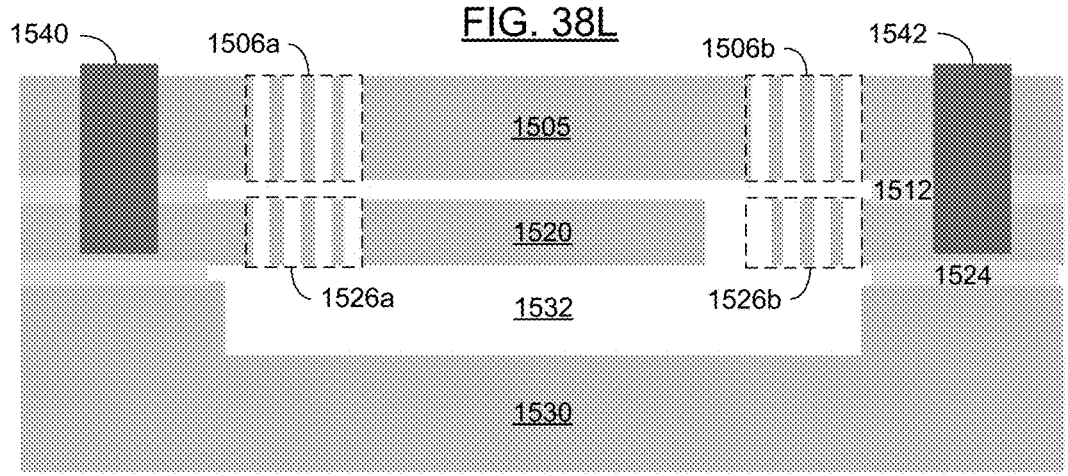
Figure 38M:
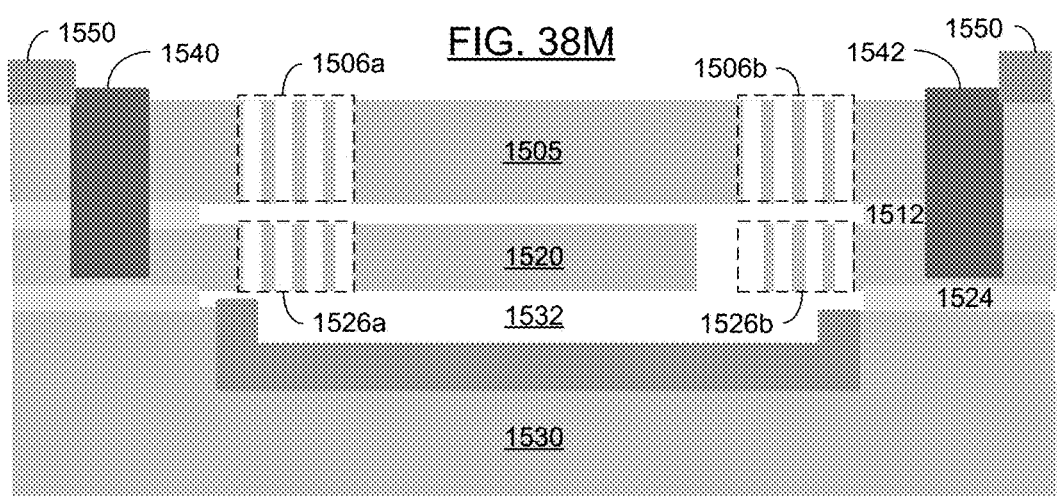
Figure 38N:
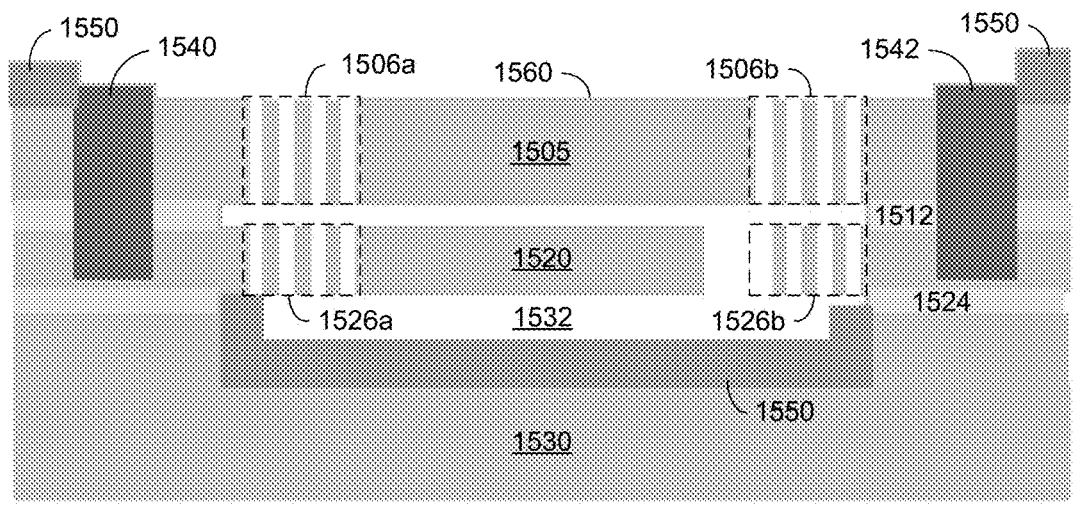
Figure 38O:
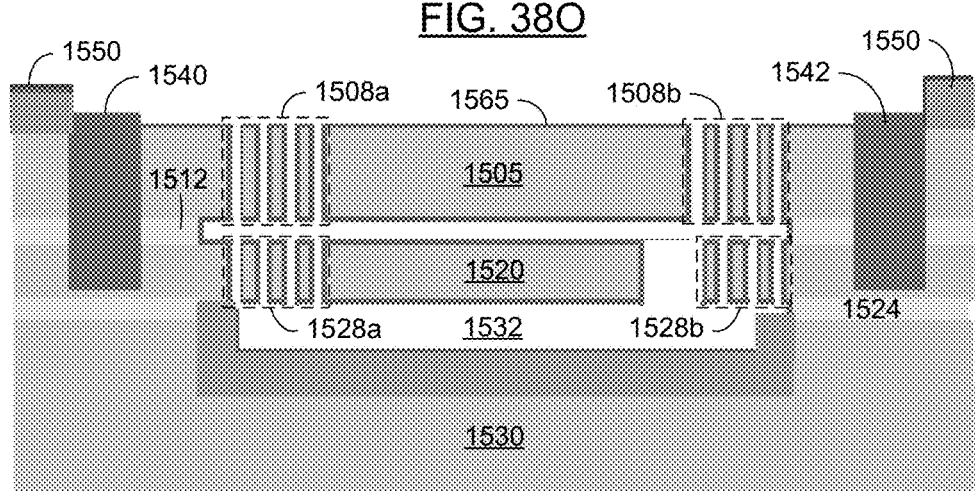
Figure 38P:
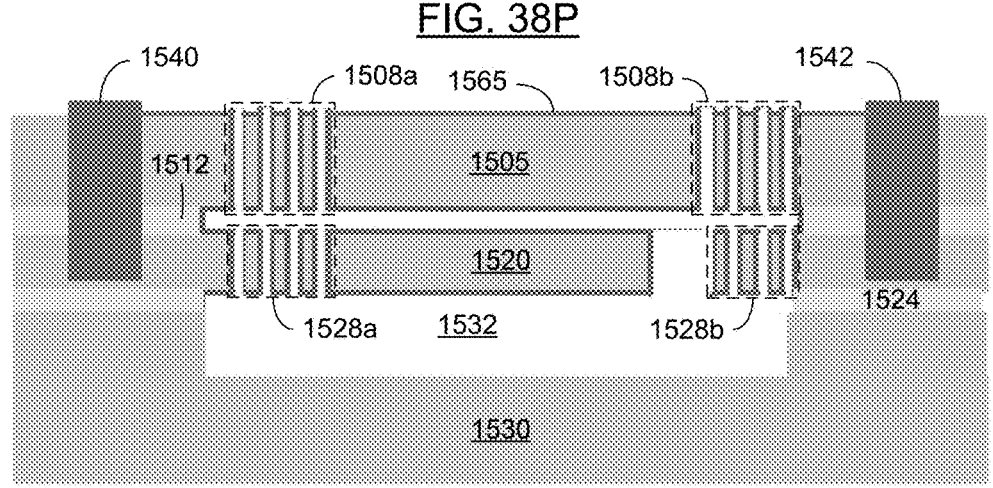
Figure 38Q:
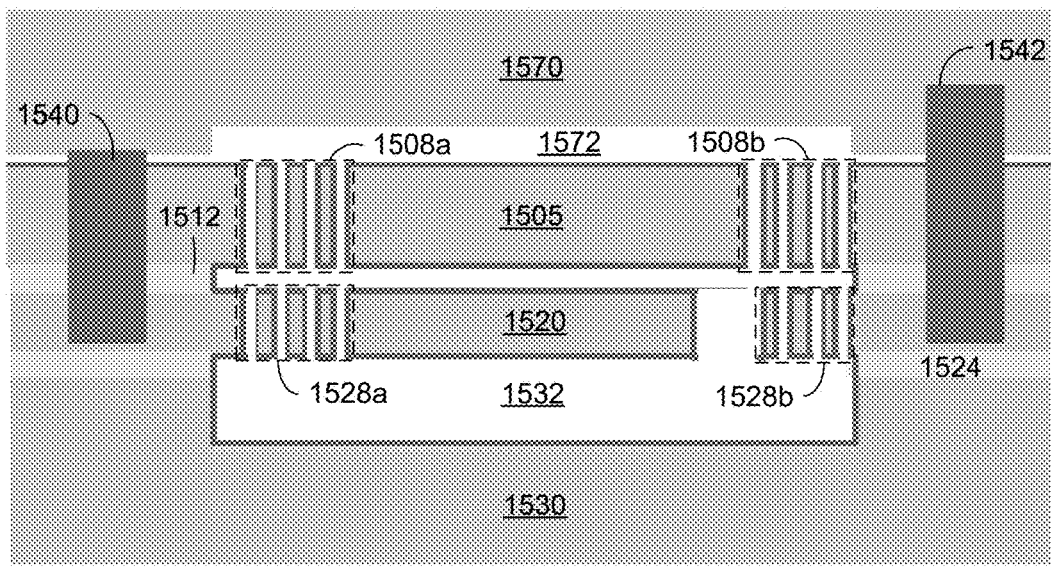
Figure 38R:
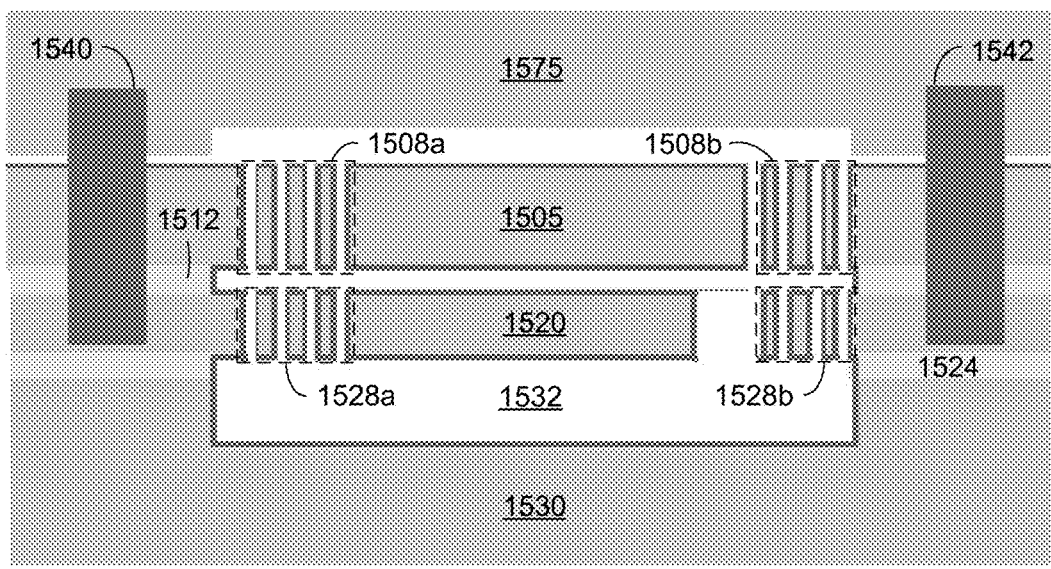

FIGS. 38A-R shows an exemplary method of fabrication for tunable reactance devices as described herein in accordance with one or more embodiments of the present invention. Starting with FIG. 38A, an oxide layer 1510 is grown or deposited on a silicon substrate 1500. The oxide layer 1510 may have a thickness of ~1 µm. The oxide layer 1510 is patterned using photolithography and etching in FIG. 38B to form a patterned oxide 1512 with a series of posts 1514 and gaps 1516a-c therebetween. FIG. 38C shows a second silicon wafer 1520 bonded to the patterned oxide 1512 and posts 1514. The second silicon wafer 1520 is bonded using fusion bonding (e.g., with oxide present) or anodic bonding (e.g., for silicon to silicon bonding). In FIG. 38D, the first wafer is ground and polished to a desired thickness to form a thin silicon mechanical layer 1505. Optionally, the second silicon wafer 1520 may also be ground and polished to a desired thickness.

In FIG. 38E, one silicon wafer (in this case, second wafer 1520) is patterned using photolithography and etched, preferably using deep reactive ion etching (DRIE), to form an opening 1522. Alternatively, the thin silicon mechanical layer 1505 could be similarly patterned and etched instead of the second wafer 1520. In FIG. 38F, an oxide layer is grown or deposited on the patterned and etched second wafer 1520.

FIG. 38G shows a third silicon wafer 1530 that is patterned and etched to create a cavity 1532 in the wafer 1530. In FIG. 38H, the third wafer 1530 is fusion bonded to the bonded stack of wafers 1505 and 1520. FIG. 38I shows vias 1502 and 1504 patterned and etched through the wafer 1520 into the underlying wafer 1505. In FIG. 38J, the vias 1502 and 1504 are filled with a conductive material 1540 and 1542, preferably a metal such as copper. FIG. 38K shows patterning and etching of the wafers 1520 and 1505 using DRIE to form mechanical support structures 1506a-b and 1526a-b for the tunable inductor and capacitor elements of a tunable inductance device. The DRIE is performed using existing oxide (e.g., posts 1514) as a mask. FIG. 38L shows removal of the oxide posts 1514 and some of the patterned oxide 1512 (e.g., by wet etching) to separate the first wafer 1505 from the second wafer 1520 and to separate small features such as the mechanical support structures for the tunable inductor and capacitor elements.

In FIG. 38M, photoresist 1550 is deposited, patterned, and developed to expose the areas of the tunable reactance device that are to be metallized (e.g., coated with metal). Note that the cavity 1532 in the third wafer 1530 is coated with photoresist 1550. FIG. 38N shows deposition of a barrier metal and seed layer 1560 using atomic layer deposition (ALD) and/or chemical vapor deposition (CVD). The barrier metal may be a conductive material (e.g., TiN) that inhibits or prevents migration of a subsequent metal layer into the underlying silicon structures, and the seed layer may be or comprise a conductive elemental metal such as Ti, Ta, Pd, etc., on which a subsequent bulk metal bay be plated or otherwise deposited. FIG. 38O shows a metal layer 1565 such as copper electroplated (or electrolessly plated) in areas of the device that have barrier and seed layer metallization 1560, thereby forming the tunable inductor and capacitor elements 1508a-b and 1528a-b. In FIG. 38P, the remaining photoresist (and unwanted metal thereon) is removed (e.g., by a lift-off process).

FIG. 38Q shows a fourth wafer 1570 bonded to the wafer stack 1520, 1505 and 1530 to electrically connect it to the tunable reactance device in the wafer stack. The fourth wafer 1570 may be a mechanical cap wafer, a MEMS cover wafer, or a CMOS circuit wafer. A cavity 1572 is etched within the fourth wafer 1570, and metal traces (not shown) may be patterned and etched on the top (actually the underside as shown) of the fourth wafer 1570 to electrically connect the tunable reactance device to external devices and/or circuitry on the fourth wafer 1570 (e.g., formed in the cavity 1572). The fourth wafer 1570 is bonded to the wafer 1520 (and, more specifically, the vias 1540 and 1542 therein) using thermal compression bonding or eutectic bonding. In FIG. 38R, the fourth wafer 1570 is thinned (e.g., by grinding and polishing) to a desired thickness. Optionally, the third wafer 1530 may also be thinned to a desired thickness. Lastly, wafer 1575 may be etched and filled with conductive through-silicon vias (TSVs) to form a connection for solder balls, which may be attached as depicted in FIG. 56T.

An Exemplary Tunable Inductance Device

Figure 39A:
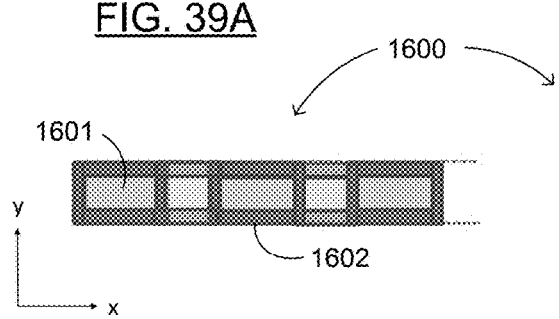
FIGS. 39A-B are top and cross-sectional views showing an exemplary serpentine structure for a tunable inductance device according to one or more embodiments of the present invention.
Figure 39B:
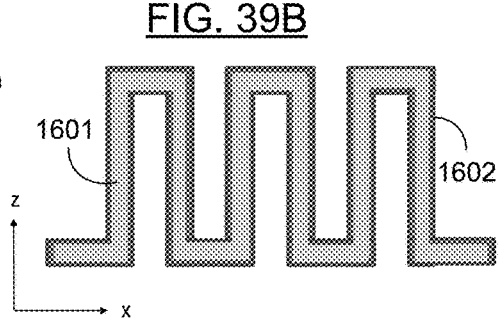

FIGS. 39A-B are top and cross-sectional views showing an exemplary basic unit 1600 for a tunable inductance device according to one or more embodiments of the present invention. A vertical serpentine mechanical structure 1600 such as silicon with added metal is created in a first layer. Alternatively, the vertical serpentine 1600 can also be metal alone.

Figure 40:
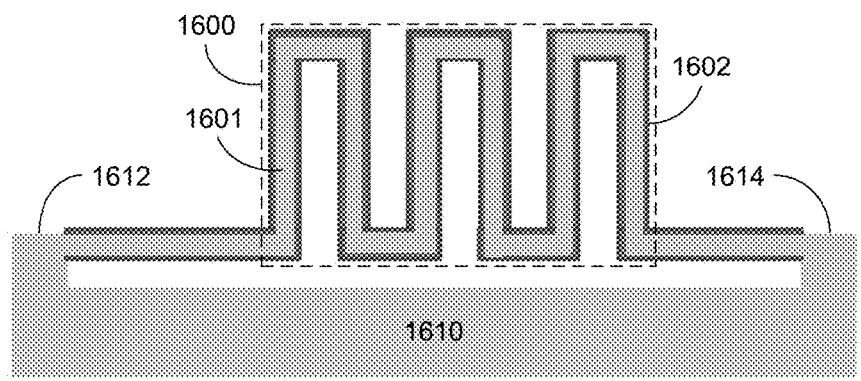
FIG. 40 shows the exemplary vertical serpentine mechanical structure of FIGS. 39A-B supported above a substrate by posts according to one or more embodiments of the present invention.
Figure 41:
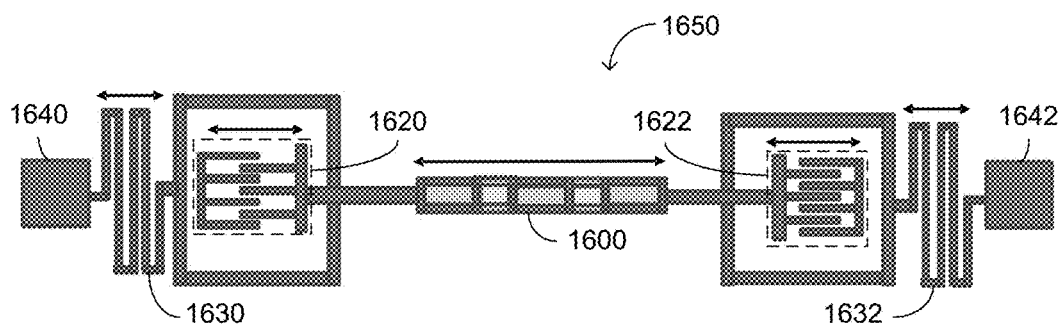
FIG. 41 shows an exemplary device for moving the vertical serpentine mechanical structure of FIGS. 39A-B and 40 laterally in accordance with one or more embodiments of the present invention.

FIG. 40 shows the vertical serpentine mechanical structure 1600 supported above a substrate 1610 by posts 1612 and 1614. FIG. 41 shows a tunable reactance device 1650 in which the vertical serpentine mechanical structure 1600 is moved laterally by fixed comb drives 1620 and 1622, while connected to the substrate 1610 through flexible springs 1630 and 1632. Springs 1630 and 1632 are significantly softer than the serpentine structure 1600.

Figure 42A:
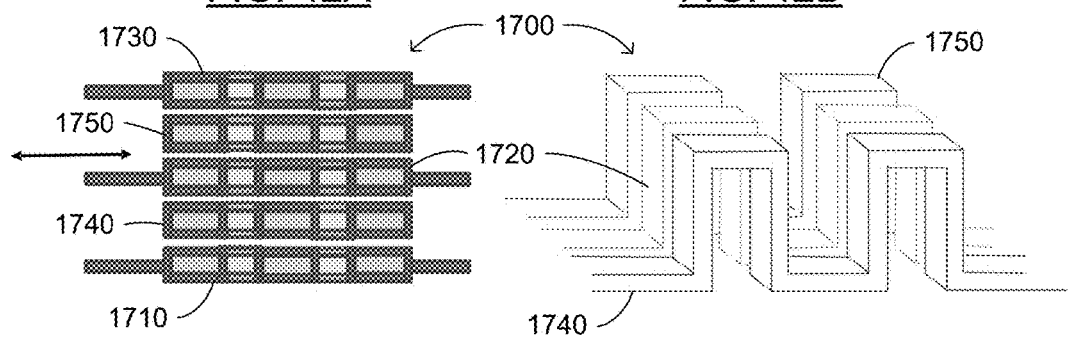
FIGS. 42A-B are top and perspective views of an exemplary tunable inductance device including multiple serpentine structures according to one or more embodiments of the present invention.
Figure 42B:
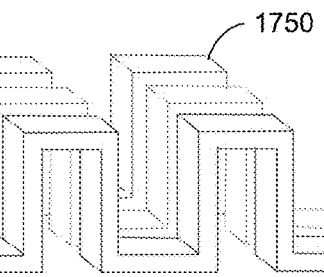

FIGS. 42A-B are top and perspective views of exemplary units in a tunable inductance device 1700 including multiple serpentine structures 1710, 1720 and 1730 according to one or more embodiments of the present invention. Alternate vertical serpentines 1710, 1720 and 1730 may be displaced laterally by one half pitch (e.g., relative to additional vertical serpentine structures 1740 and 1750 [FIG. 42A] adjacent to the movable vertical serpentines 1710, 1720 and 1730). The structures 1740 and 1750 immediately adjacent to the movable vertical serpentines 1710, 1720 and 1730 may be fixed or movable.

Figure 43:
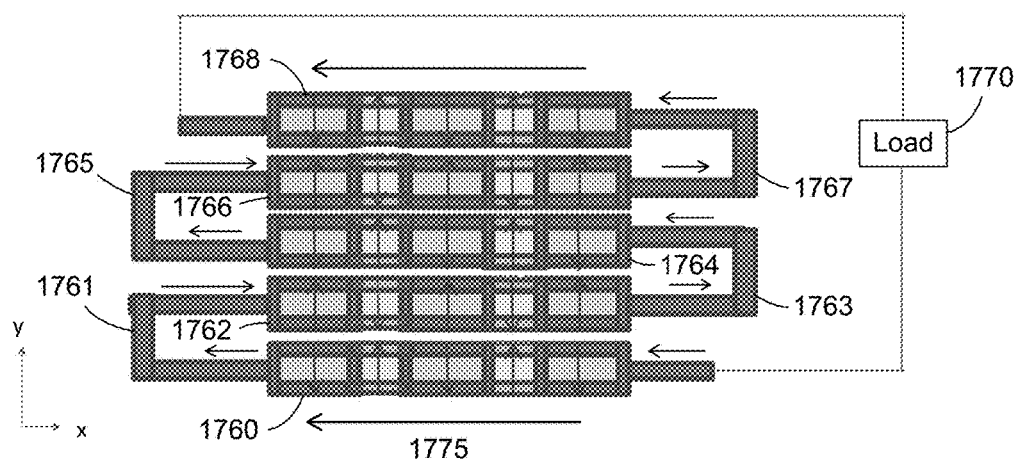
FIG. 43 is a top view of adjacent vertical serpentines connected electrically end to end through flexible springs (not shown) and metal routing in an exemplary tunable inductance device in accordance with one or more embodiments of the present invention.

FIG. 43 shows a top view of vertical serpentine structures 1760, 1762, 1764, 1766 and 1768. Adjacent vertical serpentines are connected electrically end to end through flexible springs (not shown) and metal routing 1761, 1763, 1765 and 1767. An electrical load (e.g., an RF signal) 1770 is applied across the connected serpentines. Current 1775 passes through the series of vertical serpentine structures, what are shown in FIG. 43 in a low inductance state. Relatively low magnetic energy is stored in the serpentine structures 1760, 1762, 1764, 1766 and 1768, and the magnetic energy UM is relatively small. Little to no electrostatic force is applied to the structures.

Figure 44:
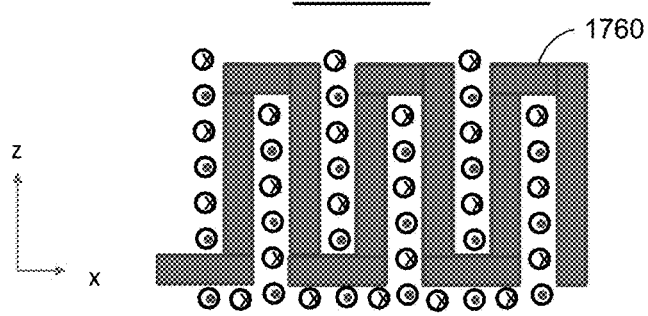
FIG. 44 is a side view of the vertical serpentines in the configuration of FIG. 43, in which the magnetic fields from electrical currents in the device face in opposite directions.

FIG. 44 shows a side view of the vertical serpentine structures of FIG. 43 (only serpentine 1760 is viewable). With the vertical serpentines in this configuration, magnetic fields from currents in adjacent serpentines face in opposite directions, and inductance is minimized. The "X" in a circle indicates a magnetic field into the page. The dot in a circle indicates a magnetic field out of the page.

Figure 45A:
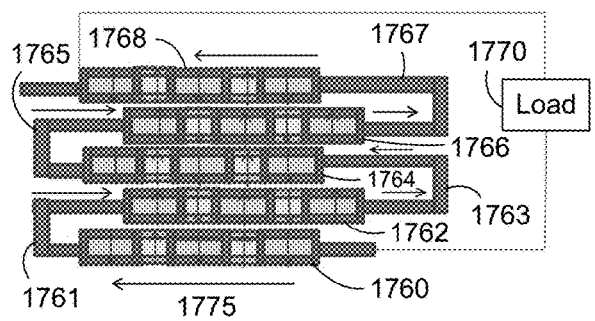
FIGS. 45A-B are top and side views of the tunable inductance device of FIGS. 43-44, in which alternate vertical serpentines are displaced laterally by one half pitch in accordance with one or more embodiments of the present invention.
Figure 45B:
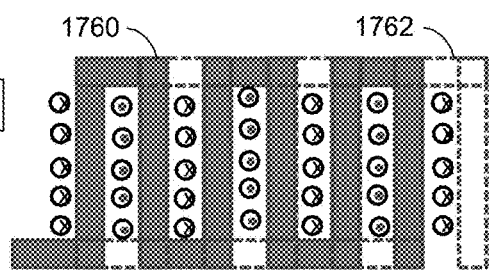

FIGS. 45A-B are top and side views of the vertical serpentine structures of FIGS. 43-44, in which alternate vertical serpentines (e.g., serpentines 1760, 1764 and 1768, or alternatively, serpentines 1762 and 1766) are displaced laterally by one half pitch. This configuration is the high inductance state. In this configuration, magnetic fields from currents in adjacent serpentines face in the same direction, the magnetic fields add together, the magnetic flux through the serpentines increases, and the inductance is increased significantly, proportional to the number of serpentines with magnetic fields that align. In the high inductance state, higher energy is stored in the magnetic field of the inductor, as $UM=0.5*L*I^2$, where L is the total inductance and I is the current through the inductor. An electrostatic force is applied to deflect the alternate serpentines, as described herein. In FIG. 45B, the "X" in a circle indicates a magnetic field into the page, and the dot in a circle indicates a magnetic field out of the page.

Figure 46:
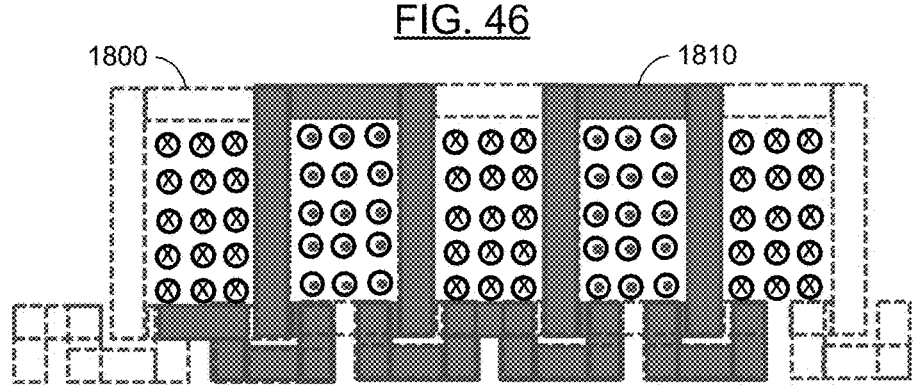
FIG. 46 is a side view of an alternative tunable inductance device in which coupling between adjacent layers can be increased by providing nearly closed loops, according to one or more embodiments of the present invention.

FIG. 46 is a side view of serpentines 1800 and 1810 comprising nearly closed loops. The magnetic coupling between the adjacent serpentines 1800 and 1810 can be increased by bringing the ends of the loops closer together. The "X" in a circle indicates the magnetic field into page. The dot in a circle indicates the magnetic field out of the page.

Figure 47:
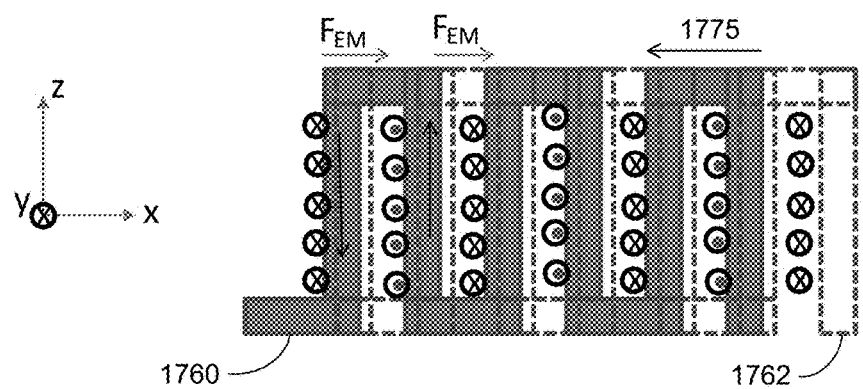
FIG. 47 is a side view of the exemplary tunable inductor of FIGS. 43-45B showing forces that result in a metastable, high inductance state in accordance with embodiments of the present invention.

FIG. 47 is a side view of tunable inductor serpentines 1760 and 1762 in a near high-inductance state, similar to that shown in FIG. 45B. The high inductance state is meta-stable to small perturbations, since a current-carrying conductor (e.g., 1760) moving into the magnetic field from an adjacent vertical serpentine will experience an electromagnetic force proportional to $\vec{F}_{EM} \alpha \vec{I} \times \vec{B}$ and the portion of the moving current-carrying conductor extending further into the magnetic field will feel a larger force, pushing it out (or back) until the magnetic fields line up at the point of maximum inductance. The electromagnetic force acts to stabilize the serpentines 1760 and 1762 in a maximum inductance state. Inductors with fields and currents in the same direction will attract each other, but since the serpentines 1760 and 1762 are symmetric on either side, there is no net force in the y direction (i.e., the axis perpendicular to the plane of the page).

Figure 48:
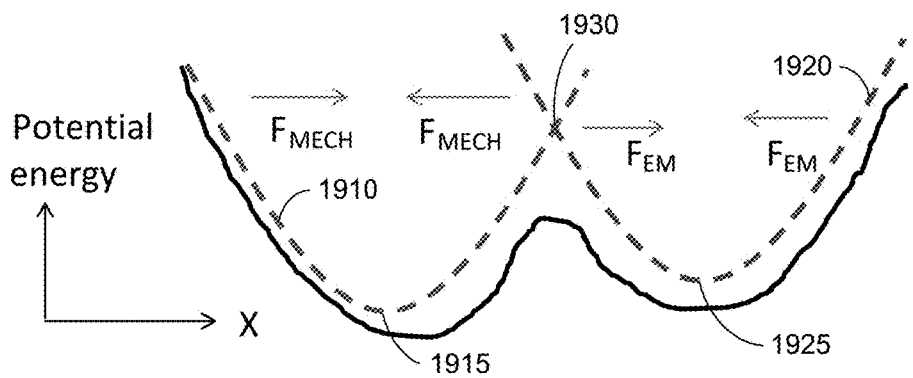
FIG. 48 is a graph depicting the mechanical spring and electromagnetic potential energy of an exemplary tunable inductor in accordance with one or more embodiments of the present invention.

FIG. 48 is a graph 1900 depicting the mechanical spring potential energy 1910 and electromagnetic potential energy 1920 used to describe the mechanical and electromagnetic forces of an exemplary tunable inductor in accordance with one or more embodiments of the present invention. In the tunable inductor described herein, the electromagnetic force is actually a positive gradient of the magnetic energy due to boundary conditions that is maximized at the maximum inductance point 1925, but is configured as a potential well here for illustrative purposes. The tunable inductor is designed with two metastable states 1915 and 1925 based on the mechanical restoring force of the springs (e.g., 1630 and 1632 in FIG. 41) and the electromagnetic force due to the energy in the inductor. The electrostatic force from the comb drive (e.g., 1620 and 1622 in FIG. 41) is designed to overcome the potential energy barrier between the two metastable states (e.g., the difference in potential energy between point 1930 where the curves 1910 and 1920 cross, and the metastable states 1915 and/or 1925). The total force is given as the sum of the electromagnetic, mechanical restoring, and electrostatic comb drive forces (i.e., $F_{tot}=F_{EM}+F_{MECH}+F_{comb}$).

Figure 49:
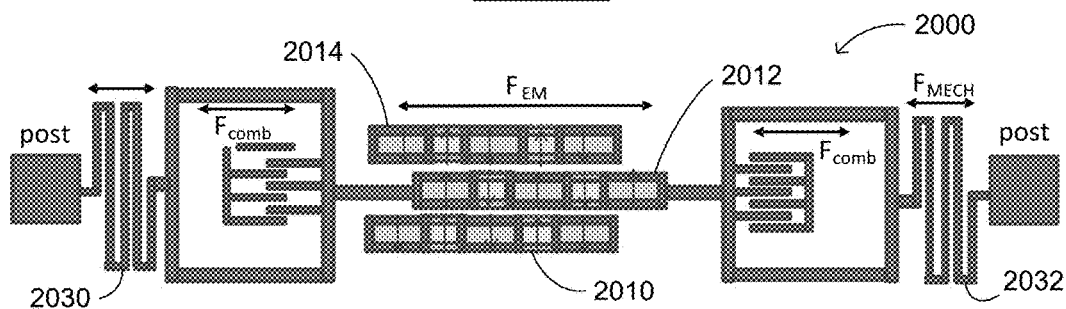
FIG. 49 is a top view showing the relationship(s) between the mechanical spring forces $F_{MECH}$, comb drive electrostatic forces $F_{comb}$, and electromagnetic forces $F_{EM}$ in an exemplary tunable inductor in accordance with one or more embodiments of the present invention.

FIG. 49 is a top view showing the origin and interplay of the mechanical spring forces $F_{MECH}$, comb drive electrostatic forces $F_{comb}$, and electromagnetic forces $F_{EM}$ in a tunable reactance device 2000 including vertical serpentine structures 2010, 2012 and 2014. The top and bottom serpentine structures 2010 and 2014 may be fixed or tunable. The comb structures 2020 and 2022 are tunable. Springs 2030 and springs 2032 are significantly softer than the serpentine structures.

Advantages of the tunable reactance devices of FIGS. 41-49 include generation of electromagnetic fields that are parallel with the substrate, minimizing or avoiding eddy currents and/or losses in the substrate. The design is scalable to multiple vertical serpentine structures and linear in the number of vertical serpentine structures that can be added. The net magnetic field is low due to fields in opposing directions, thereby resulting in less interference with neighboring circuits.

Alternative Tunable Reactance Devices

Figure 50:
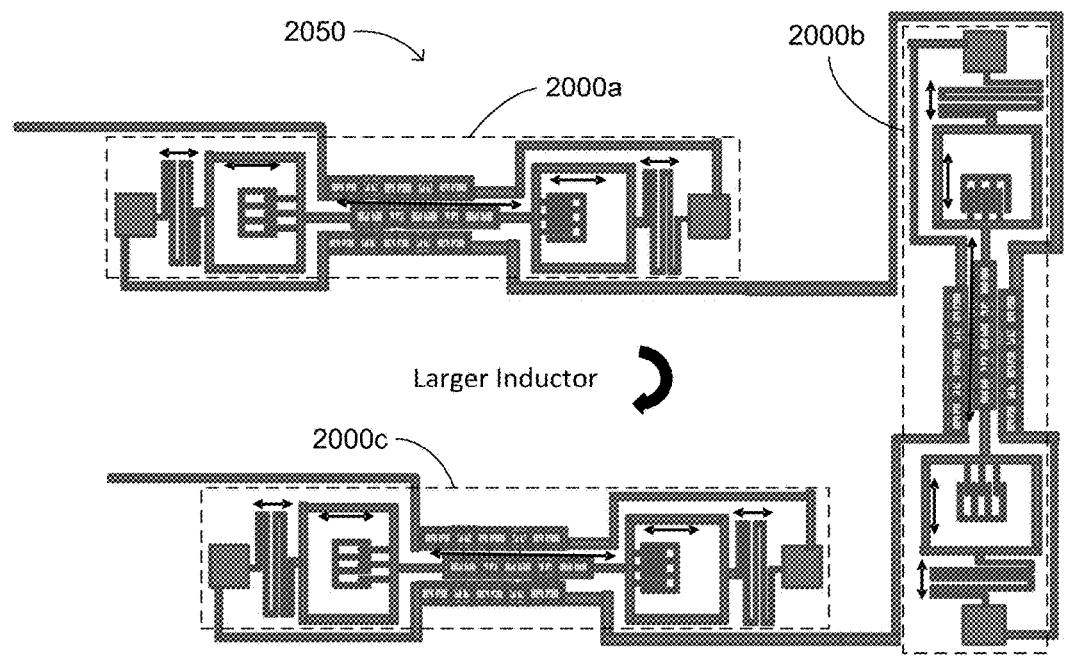
FIG. 50 is a top view of an exemplary compound tunable inductor comprising multiple tunable inductor elements that can be used to create segments of a larger inductor in accordance with one or more embodiments of the present invention.

FIG. 50 shows a compound tunable inductor 2050 comprising multiple tunable elements 2000a-c that can be used to create segments of a larger inductor such as a spiral inductor. The tunable elements 2000a-c may be electrically linked or coupled to each other as shown in FIG. 50.

Figure 51:
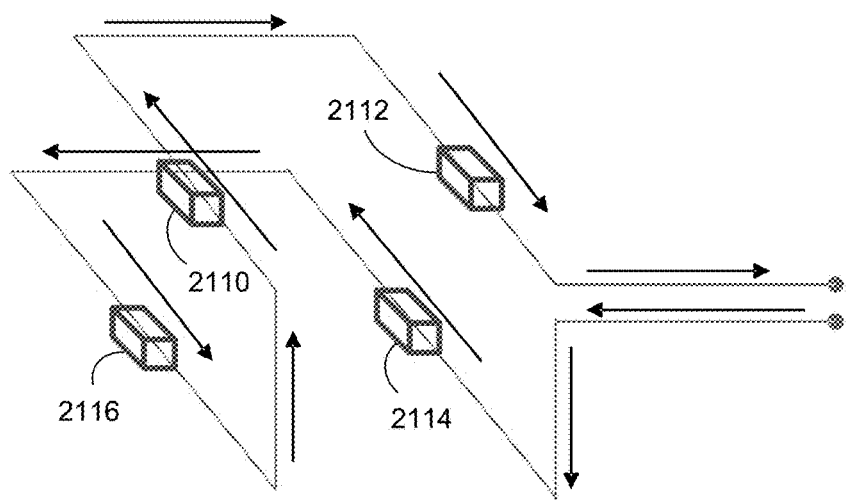
FIG. 51 is a diagram showing how parasitic inductance can be reduced in a compound tunable inductor comprising multiple tunable inductor elements in accordance with one or more embodiments of the present invention.

FIG. 51 shows a model 2100 for increasing coupling inductance and/or reducing parasitic inductance in a compound tunable inductor device in accordance with one or more embodiments of the present invention. For example, parasitic inductance formed by linked serpentine structures 2110, 2112, 2114 and 2116 can be reduced by providing two layers of vertical serpentines connected with a circuit topology as shown in FIG. 51. Reducing parasitic inductance improves the tuning range of the tunable inductor.

Figure 52A:
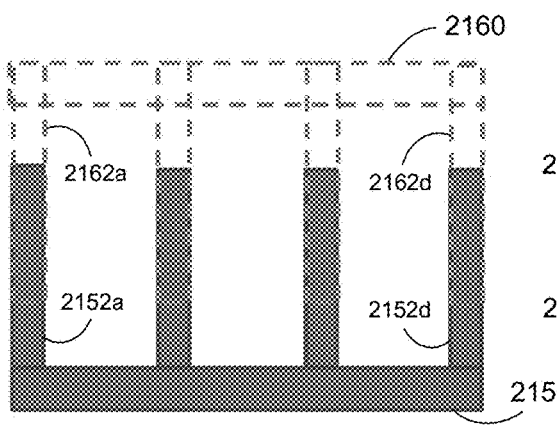
FIGS. 52A-B are side and top views showing movable MEMS mechanical structure layers above a substrate and anchored through springs in accordance with one or more embodiments of the present invention.
Figure 52B:
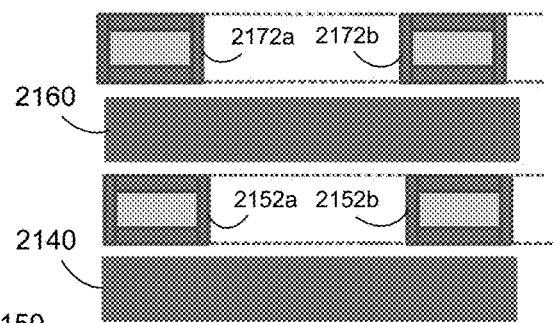

FIGS. 52A-B show side and top views, respectively, of movable MEMS mechanical structure layers 2140, 2150, 2160 and 2170 created above a substrate (not shown) and anchored through springs (not shown), with fingers 2152a-d, 2162a-d and 2172a-b alternately facing up and down. In FIG. 52B, fingers 2152a-b and 2172a-b are pointing up (out of the plane of the page), and fingers extending from main electrodes 2140 and 2160 are pointing down (into the plane of the page). Such movable MEMS mechanical structure layers are useful in a tunable capacitance device similar to tunable capacitance device 1200 in FIG. 31, but in which the comb drives are configured to move at least alternating mechanical structure layers horizontally, and the remaining mechanical structure layer(s) are fixed or movable. In further embodiments, each movable MEMS mechanical structure layer has at least one comb drive at each opposed end of the layer.

Figure 53:
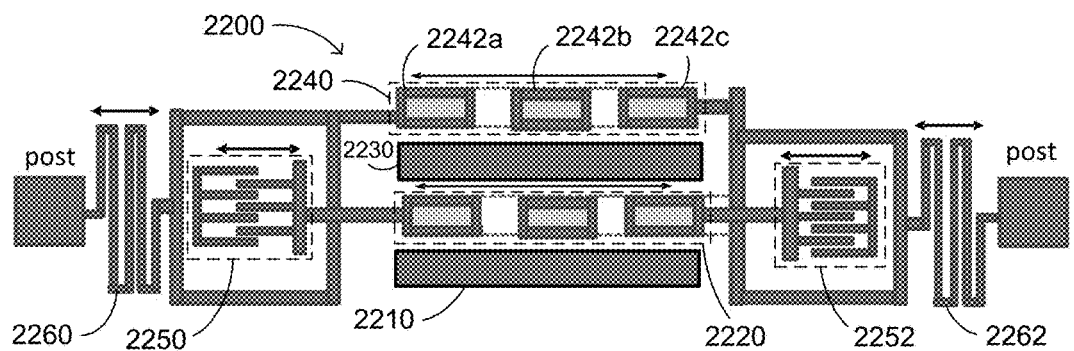
FIG. 53 is a top view showing an exemplary tunable reactance device including vertical mechanical finger structures, moved laterally by (partially) fixed comb drives while connected to substrate through flexible springs, according to one or more embodiments of the present invention.

FIG. 53 is a top view showing a tunable capacitance device 2200 including movable MEMS mechanical structures (electrodes) 2210, 2220, 2230 and 2240 similar to those shown in FIGS. 52A-B. Vertical mechanical finger structures (e.g., fingers 2242a-c) are moved laterally by fixed comb drives 2250 and 2252 while connected to a substrate (not shown) through flexible springs 2260 and 2262. Springs 2260 and 2262 are significantly softer than the vertical finger structures or MEMS mechanical structures 2210, 2220, 2230 and 2240.

Figure 54A:
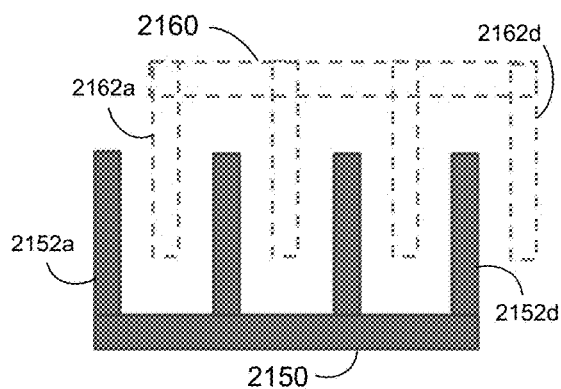
FIGS. 54A-B are side views of different states of the tunable reactance device of FIGS. 52A-B and 53.
Figure 54B:
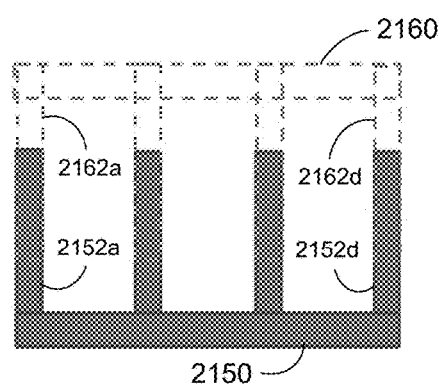

FIGS. 54A-B show side views of different states of the tunable capacitance device of FIGS. 52A-B. FIG. 54A shows the lower capacitance, mechanically non-deflected state. FIG. 54B shows the higher capacitance, mechanically deflected state. It is preferable that the zero deflection, relaxed state is the low capacitance state and the mechanically deflected state is the high capacitance state. The mechanically deflected, high capacitance state can be meta-stable due to electromagnetic forces between the capacitor fingers 2152a-d and 2162a-d.

Referring back to FIG. 17, the amount of energy stored in the electromagnetic fields of the tunable reactance devices in the tunable LC array(s) 910 depends on the magnitude of the input signal at port 945 and/or on bus 905. Therefore, one may filter and/or limit the current of the input RF circuit with inductive and capacitive reactance, which may also serve as a sensor 960 to measure the amplitude, frequency and/or phase of the input signal(s) at port 945 relative to other signals. The sensor circuit 960 can be input through an ADC 970 to control circuitry 920 to adjust the amplitude, frequency and/or phase of the comb drive signals to the tunable reactance devices in the tunable LC array(s) 910 to deflect the tunable reactance devices.

Figure 55A:
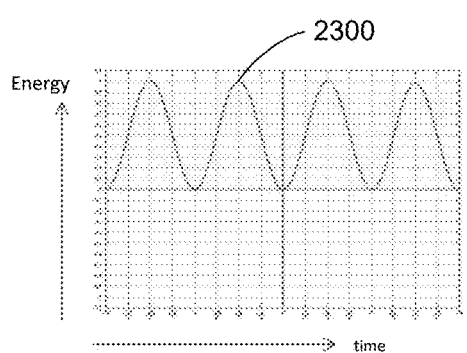
FIGS. 55A-B are graphs showing the stored energy and voltage applied to an exemplary tunable reactance device according to one or more embodiments of the present invention.
Figure 55B:
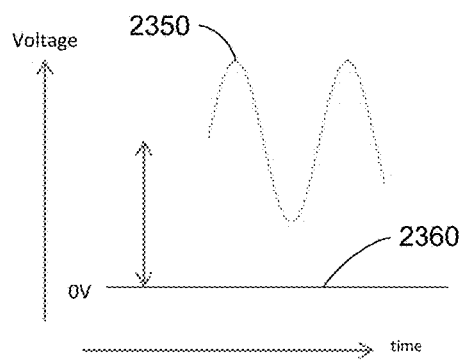

FIGS. 55A-B are graphs respectively showing the stored energy and proposed comb drive voltage of an exemplary tunable reactance device in accordance with one or more embodiments of the present invention. FIG. 55A shows a curve 2300 of the energy stored in electromagnetic fields vs. time. FIG. 55B shows a curve 2350 of the voltage on a comb drive vs. time. For received AC signals, the amount of energy stored in the electromagnetic fields varies with the frequency of the AC signal, as shown in the curve 2300. Therefore, one may adjust the comb drive forces corresponding to the change in electromagnetic energy within the tunable reactance devices. Combining an AC signal 2350 with a DC voltage bias 2360, or timing the comb force to pull maximally at zero electromagnetic energy (e.g., in the AC signal 2350) can help to more efficiently deflect the tunable reactance devices from a higher inductive or capacitive (reactance) state to a lower reactance state.

An Exemplary Method of Making a Tunable Reactance Device

Figure 56A:
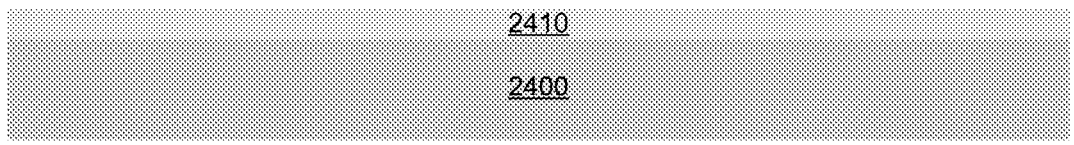
FIGS. 56A-T show cross-sections of a tunable reactance device made by an exemplary method according to embodiments of the present invention.
Figure 56B:
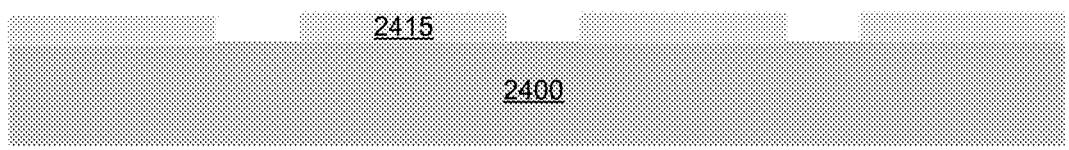
Figure 56C:
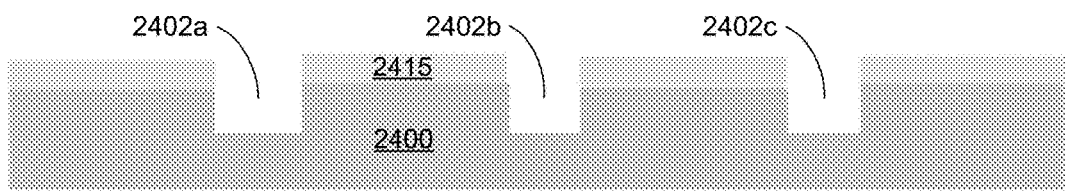
Figure 56D:
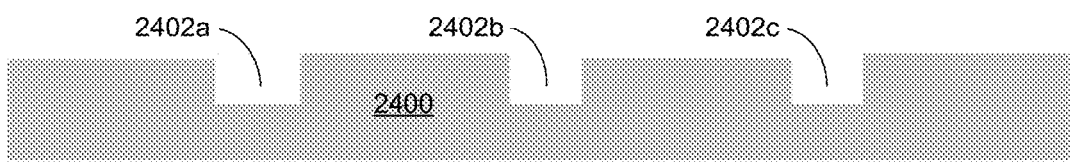
Figure 56E:
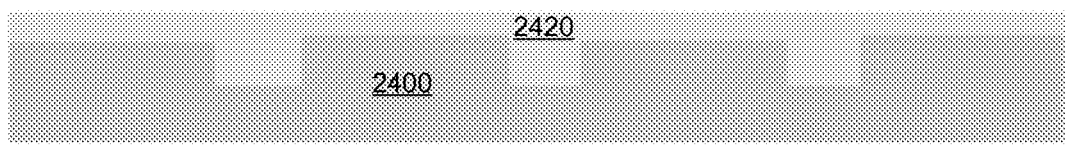
Figure 56F:
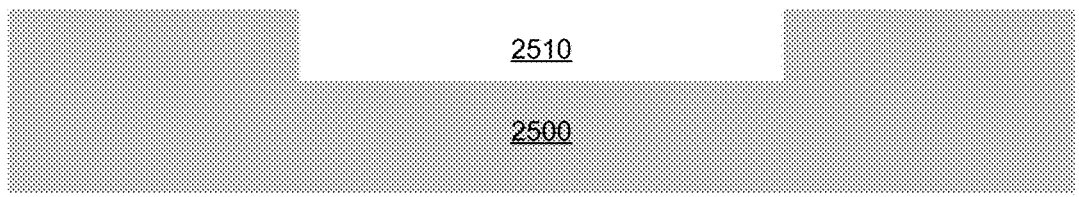
Figure 56G:
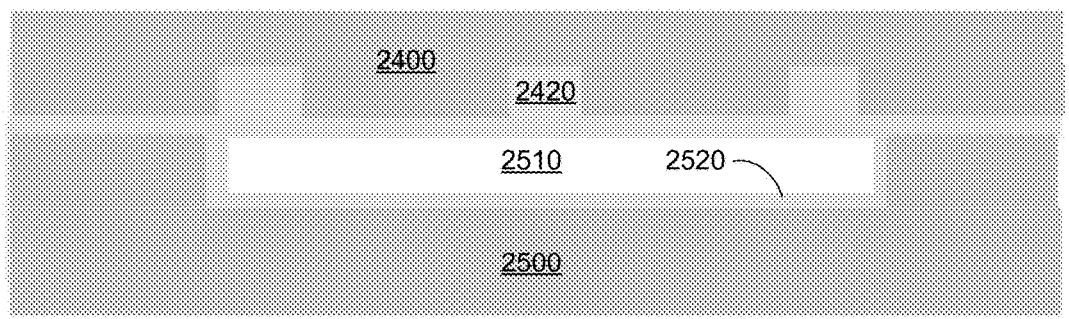
Figure 56H:
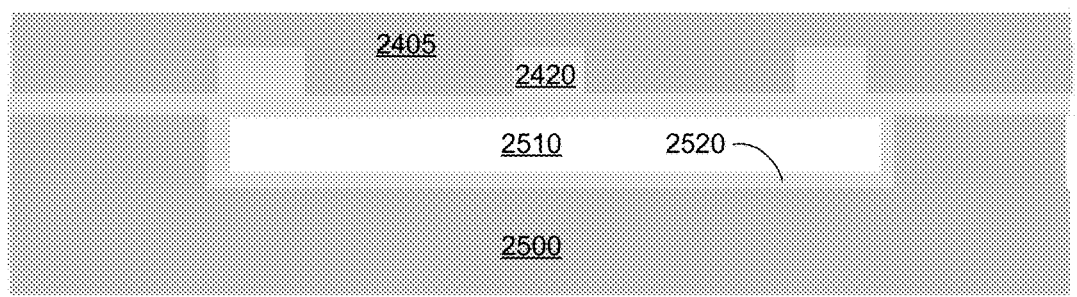
Figure 56I:
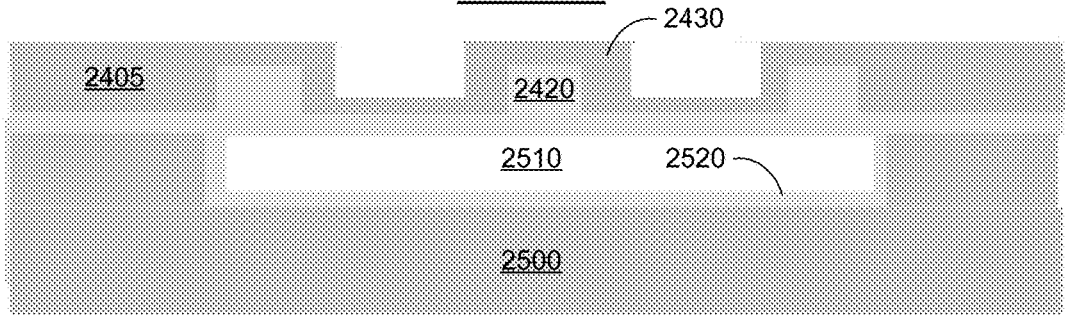
Figure 56J:
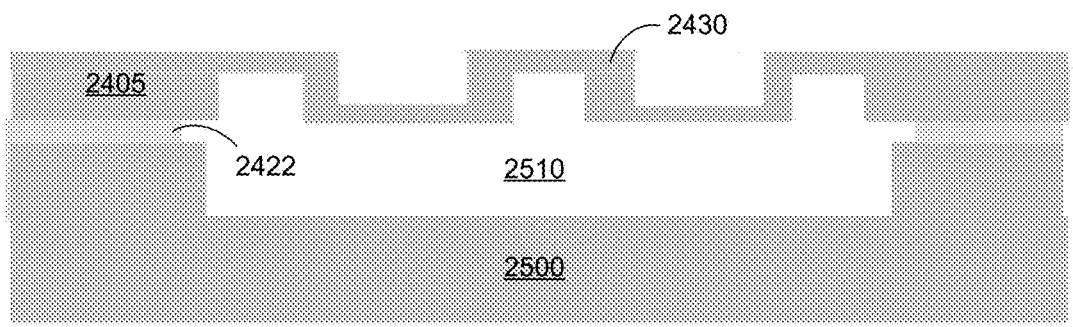
Figure 56K:
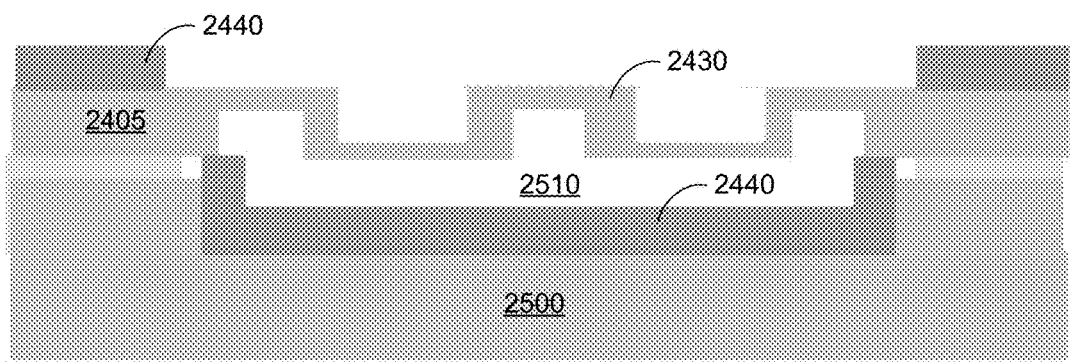
Figure 56M:
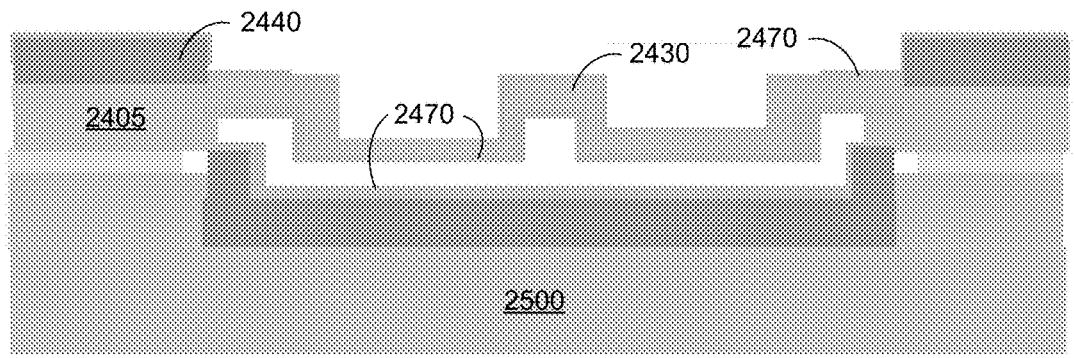
Figure 56N:
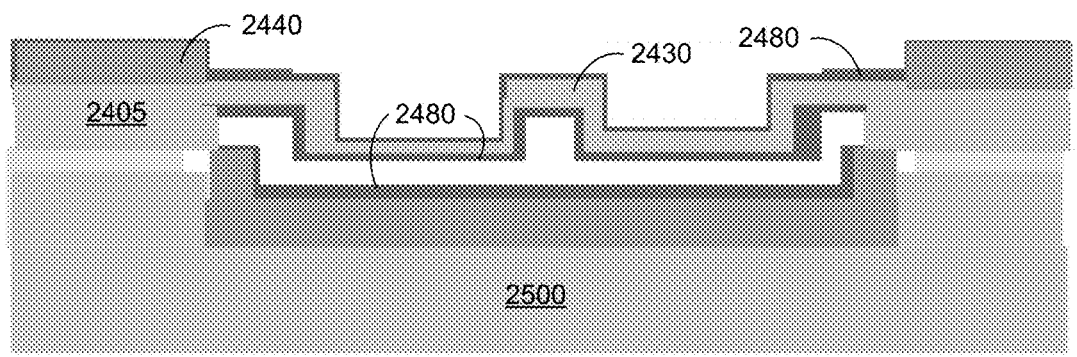
Figure 56P:
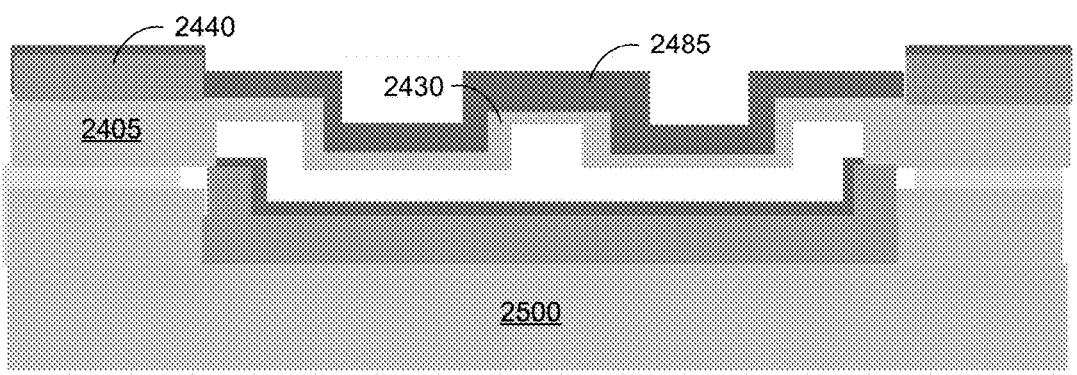
Figure 56Q:
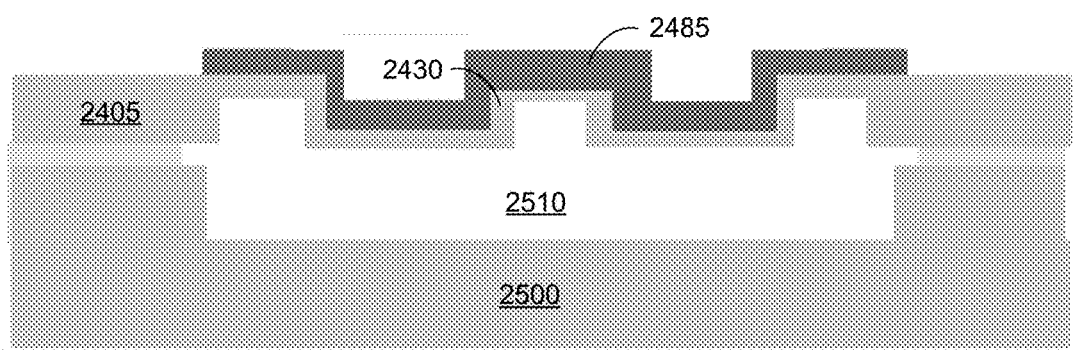
Figure 56R:
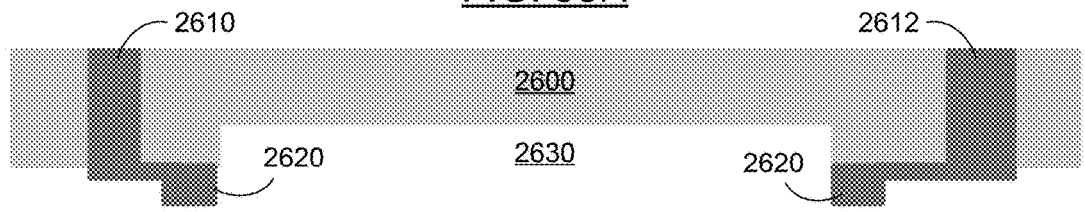
Figure 56S:
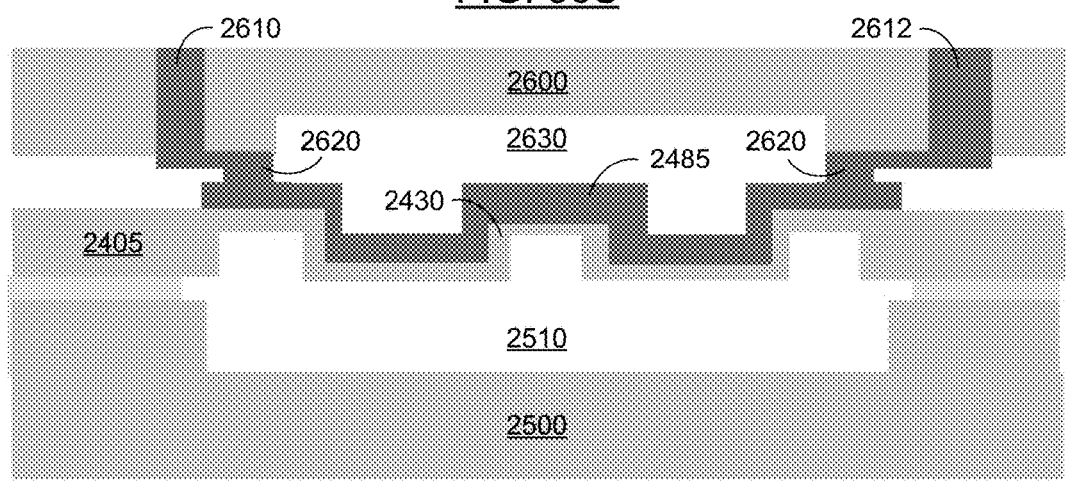
Figure 56T:
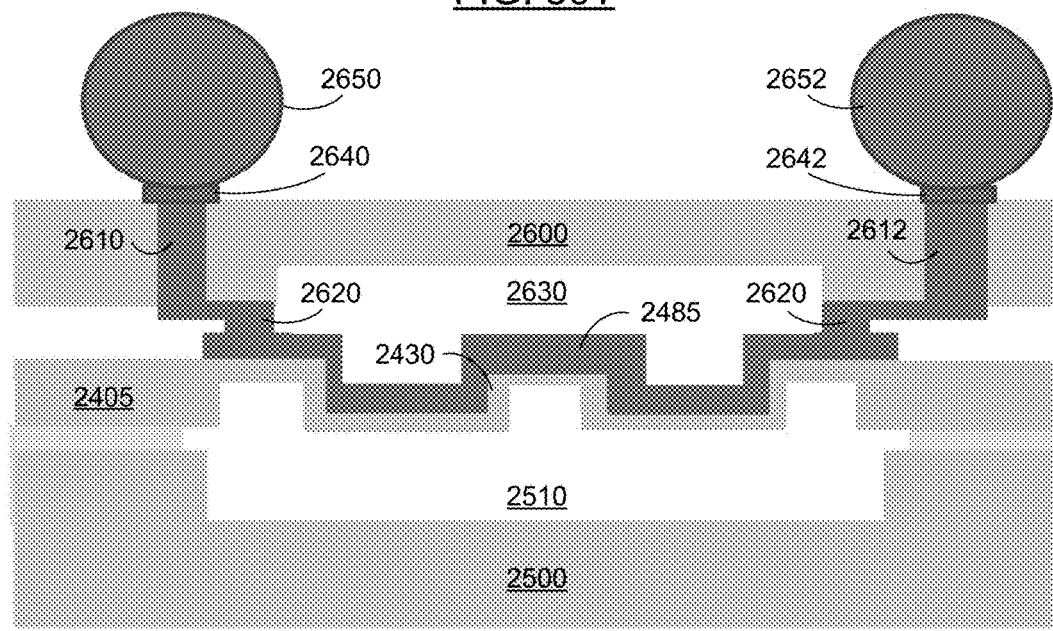

An exemplary method of making a tunable reactance device according to one or more embodiments of the present invention is shown in FIGS. 56A-T. The method of FIGS. 56A-T is similar in many respects to that shown in FIGS. 38A-R, so the description of details of steps common to both methods will be omitted here.

FIG. 56A shows an oxide layer 2410 (e.g., ~1 µm thick) on a silicon wafer 2400. In FIG. 56B, the oxide layer 2410 is patterned and etched to form an oxide mask 2415. FIG. 56C shows partial etching of the silicon wafer 2400 to form trenches 2402a-c. In FIG. 56D, the oxide mask 2415 is removed. FIG. 56E shows a new oxide layer 2420 deposited and polished (e.g., by chemical-mechanical polishing [CMP]).

FIG. 56F shows a second silicon wafer 2500 that has been patterned and partially etched. In FIG. 56G, the second silicon wafer 2500 is fusion bonded to the oxide layer 2420. In FIG. 56H, the first wafer 2400 is ground, polished and/or wet etched to reduce its thickness. FIG. 56I shows the wafer stack in which the backside of the first wafer 2400 is patterned and etched to form the anchored tunable reactance mechanical structures 2430. Exposed portions of the oxide layer 2420 are removed (e.g., by wet etching) in FIG. 56J.

In FIG. 56K, photoresist 2440 is deposited (including in the trench or slot 2510 in the second wafer 2500) and patterned to expose areas on the first wafer 2400 (including the tunable reactance mechanical structures 2430) to be plated with metal. FIG. 56L shows a top view of the exposed areas of the tunable reactance device to be plated with metal and the areas of the tunable reactance device covered with photoresist 2440. Vertical reactance elements (e.g., including finger structures) 2430, posts 2450-2452 and springs 2460-2462 are exposed. In FIG. 56M, a barrier and/or seed layer 2470 (which may comprise a barrier metal or conductive material) is deposited using CVD and/or ALD. FIG. 56N shows a bulk metal 2480 such as copper plated on the barrier and/or seed layer 2470.

FIG. 56O shows an alternative to FIG. 56M, in which the barrier and/or seed layer 2475 is directionally sputtered on top of the tunable reactance mechanical structures 2430 and in the trench 2510 in the second wafer 2500. FIG. 56P shows the alternative embodiment after plating a metal (e.g., copper) layer 2485, similar to FIG. 56N. In FIG. 56Q, the photoresist 2440 and unwanted metal is removed (e.g., by a lift-off process).

FIG. 56R shows a MEMS cap wafer or CMOS circuit wafer 2600 that may include CMOS circuitry (not shown) with through silicon vias (TSVs) 2610 and 2612 and a preferably copper seal ring 2620 surrounding a central trench or depression 2630 therein. FIG. 56S shows the CMOS or MEMS cap wafer 2600 bonded to the tunable reactive device wafer 2400 using thermocompression or eutectic bonding. FIG. 56T shows an under-bump metallization (UBM) 2640, 2642 deposited on TSV bond pads and solder spheres 2650 and 2652 on the UBM 2640, 2642 to form a wafer level chip scale package including the tunable reactance devices according to embodiments of the present invention.

FIGS. 57A-B are top and perspective views of an exemplary tunable inductive transformer 2700 including multiple serpentine structures 2710-2750 according to one or more embodiments of the present invention. A vertical serpentine element 2730 is a separate electrical node that couples inductively only to adjacent tunable inductor elements 2720 and 2740. A separate electrical load (not shown) is connected to opposing ends of serpentine element 2730.

FIGS. 58A-B show top and side views of the tunable inductive transformer of FIGS. 57A-B in a low inductance or 'OFF' state. Magnetic fields from adjacent serpentine structures 2720 and 2740 face in opposite directions at separate electrical node 2730, resulting in a low net magnetic flux through the separate serpentine 2730, and low transfer of signal or power. In addition, magnetic fields from serpentines 2740 and 2750 face in opposite directions, and magnetic fields from serpentines 2710 and 2720 face in opposite directions, resulting in a low net magnetic flux through the circuit, regardless of the magnitude of the load 2770.

Figure 59B:
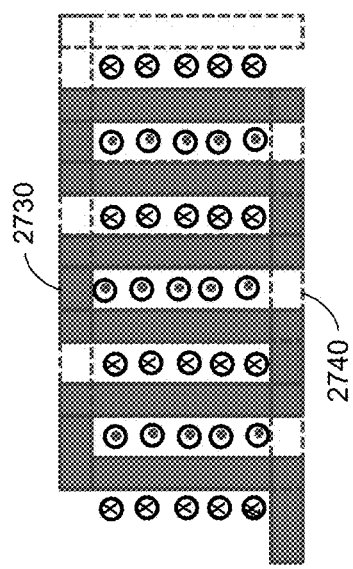
FIGS. 59A-B show top and side views of a tunable inductive transformer in a high inductance or 'ON' state.
Figure 59A:
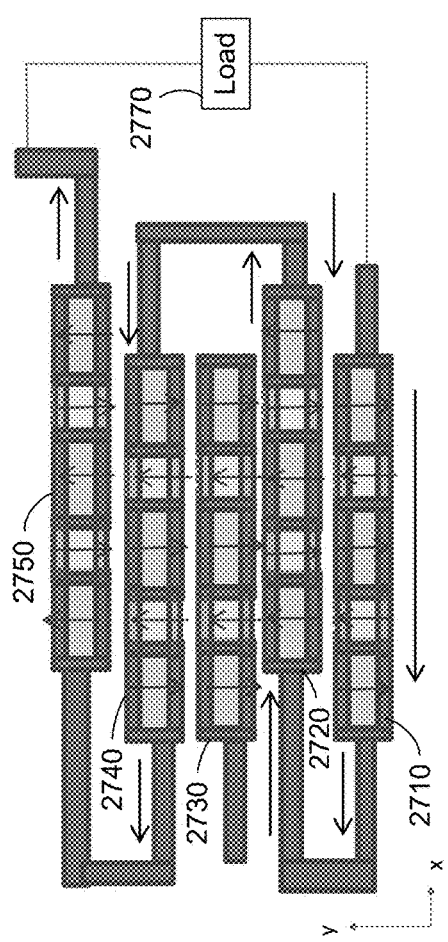

FIGS. 59A-B show top and side views of the tunable inductive transformer of FIGS. 57A-B in a high inductance or 'ON' state. Vertical serpentine elements 2720 and 2750 are displaced laterally by one half pitch, resulting in alignment of magnetic fields through the serpentines 2710-2750 as shown in FIG. 59A. Vertical serpentine elements 2720 and 2740 have aligned magnetic fields that couple constructively to separate electrical node 2730, transferring power and signal to node 2730. In addition, vertical serpentines 2740 and 2750 have magnetic fields aligned, and vertical serpentines 2710 and 2720 have magnetic fields that align, further increasing the net magnetic flux and power transfer to separate node 2730.

Figure 60:
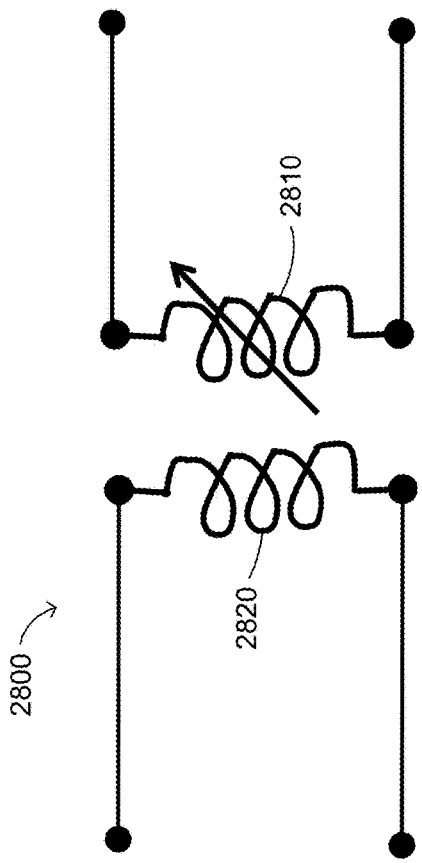
FIG. 60 shows an equivalent circuit for a tunable inductive transformer shown in FIGS. 57-59.

FIG. 60 shows an equivalent circuit 2800 for the tunable inductive transformer shown in FIGS. 57-59. Tunable inductor element 2810 changes the amount of inductive coupling between it and passive inductor element 2820, and functions as a tunable inductive transformer or A/C signal switch.

CONCLUSION/SUMMARY

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application. It is intended that the scope of the invention be defined by the claims appended hereto and their equivalents.

What is claimed is:

1. A tunable reactance device, comprising:
   a) a substrate;
   b) a first microelectromechanical (MEM) structure supported on the substrate and comprising a conductive material, wherein a first gap is between the first MEM structure and the substrate;
   c) a second microelectromechanical (MEM) structure supported on the substrate and comprising the conductive material, wherein a second gap is between the second MEM structure and the substrate; and
   d) one or more drivers configured to move the first MEM structure with respect to the substrate and the second MEM structure and maintain a third gap identical to or different from the first gap upon application of an electrostatic force to at least one of the one or more drivers, wherein:
   the first and second MEM structures are configured to function as a variable inductor, and the tunable reactance device has (i) a first reactance and a first electromagnetic field topology when the electrostatic force is applied to the at least one of the one or more drivers and (ii) a second reactance different from the first reactance and a second electromagnetic field topology different from the first electromagnetic field topology when a different electrostatic force is applied to the one or more drivers.

2. The tunable reactance device of claim 1, wherein the variable inductor has (i) a high inductance state when the electrostatic force is applied to the at least one of the one or more drivers and (ii) a low inductance state when no electrostatic force is applied to the at least one of the one or more drivers.

3. The tunable reactance device of claim 2, wherein each of the first and second MEM structures has a serpentine structure, the first and second MEM structures overlap when no electrostatic force is applied to the at least one of the one or more drivers, and the first MEM structure is offset from the second MEM structure when the electrostatic force is applied to the at least one of the one or more drivers.

4. The tunable reactance device of claim 3, wherein the one or more drivers comprise a first comb drive connected to the first MEM structure.

5. The tunable reactance device of claim 4, wherein the first comb drive has one end anchored to the substrate and does not include the conductive material.

6. The tunable reactance device of claim 4, wherein the one or more drivers further comprise a second comb drive connected to the first MEM structure.

7. The tunable reactance device of claim 1, wherein each of the first and second MEM structures comprises a moveable beam, the moveable beams are connected in series, and the one or more drivers comprise a first plurality of lever arms connected to the first MEM structure at opposed ends of the moveable beam thereof and a second plurality of lever arms connected to the second MEM structure at opposed ends of the moveable beam thereof.

8. The tunable reactance device of claim 1, wherein the first and second MEM structures overlap when the electrostatic force is applied to the at least one of the one or more drivers, and at least part of the first MEM structure is offset from at least part of the second MEM structure when no electrostatic force is applied to the at least one of the one or more drivers.

9. The tunable reactance device of claim 1, wherein the one or more drivers comprise a comb drive connected to the first MEM structure.

10. The tunable reactance device of claim 1, wherein said conductive material comprises copper, aluminum, silicon, tungsten, titanium, tantalum, tin, nickel, gold, graphene, platinum or silver.

11. The tunable reactance device of claim 1, wherein said substrate comprises single-crystal silicon.

12. An integrated circuit comprising one or more of the tunable reactance devices of claim 1, control circuitry configured to generate one or more control signals that activate and deactivate the one or more tunable reactance devices, and an antenna configured to receive a wireless signal, wherein the one or more tunable reactance devices are configured to tune or otherwise operate on the wireless signal received by the antenna.

13. The integrated circuit of claim 12, wherein the tunable reactance device comprises an array of tunable inductors and tunable capacitors, and the integrated circuit further comprises digital control signals configured to select a number, a type and/or a size of the tunable inductors and the tunable capacitors in the array to activate.

14. The tunable reactance device of claim 1, wherein each of the first and second MEM structures comprises a serpentine structure, the serpentine structures overlap in a first state, and the serpentine structures are offset from each other in a second state.

15. The tunable reactance device of claim 1, further comprising a tunable capacitor in series or in parallel with the variable inductor.

16. A tunable reactance device, comprising:
   a) a substrate;
   b) a first microelectromechanical (MEM) structure supported on the substrate and comprising a conductive material, a first main electrode and a first plurality of finger structures extending orthogonally from the first main electrode, wherein a first gap is between the first MEM structure and the substrate;
   c) a second microelectromechanical (MEM) structure supported on the substrate and comprising the conductive material, a second main electrode and a second plurality of finger structures extending orthogonally from the second main electrode, wherein a second gap is between the second MEM structure and the substrate; and
   d) one or more drivers configured to (i) move the first MEM structure with respect to the substrate and the second MEM structure and (ii) maintain a second gap identical to or different from the first gap upon application of an electrostatic force to at least one of the one or more drivers, wherein:
   the first and second MEM structures are configured to function as a variable capacitor, and the tunable reactance device has (i) a first reactance and a first electromagnetic field topology when the electrostatic force is applied to the at least one of the one or more drivers and (ii) a second reactance different from the first reactance and a second electromagnetic field topology different from the first electromagnetic field topology when a different electrostatic force is applied to the one or more drivers.

17. The tunable reactance device of claim 16, wherein the one or more drivers comprise a first comb drive connected to the first MEM structure configured to move the first MEM structure in a first direction.

18. The tunable reactance device of claim 17, wherein the one or more drivers further comprise a second comb drive connected to the first MEM structure configured to move the first MEM structure in a second direction opposite or orthogonal to the first direction.

19. A tunable reactance device, comprising:
a) a substrate including an electrode;
b) a first microelectromechanical (MEM) structure supported on the substrate and comprising a conductive material, wherein a first gap is between the first MEM structure and the substrate, the electrode underlies or overlaps with the first MEM structure, and the first MEM structure comprises a moveable beam; and
c) one or more drivers comprising a first plurality of lever arms connected to the first MEM structure at opposed ends of the moveable beam configured to move the first MEM structure with respect to the substrate and maintain a second gap identical to or different from the first gap upon application of an electrostatic force to at least one of the one or more drivers, wherein:
the tunable reactance device functions as a variable capacitor, and has (i) a first reactance and a first electromagnetic field topology when the electrostatic force is applied to the at least one of the one or more drivers and (ii) a second reactance different from the first reactance and a second electromagnetic field topology different from the first electromagnetic field topology when a different electrostatic force is applied to the one or more drivers.

20. The tunable reactance device of claim 19, further comprising a second microelectromechanical (MEM) structure supported on the substrate and comprising the conductive material, wherein a second gap is between the second MEM structure and the substrate, and the at least one of the one or more drivers is further configured to move the first MEM structure with respect to the second MEM structure upon application of the electrostatic force.

* * * * *